United States Patent
Koseoglu

(10) Patent No.: US 11,118,123 B2
(45) Date of Patent: *Sep. 14, 2021

(54) PROCESSES AND SYSTEMS FOR PETROCHEMICAL PRODUCTION INTEGRATING COKING AND DEEP HYDROGENATION OF COKING PRODUCTS

(71) Applicant: SAUDI ARABIAN OIL COMPANY, Dhahran (SA)

(72) Inventor: Omer Refa Koseoglu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/880,434

(22) Filed: May 21, 2020

(65) Prior Publication Data

US 2021/0246388 A1 Aug. 12, 2021

Related U.S. Application Data

(63) Continuation-in-part of application No. 16/787,529, filed on Feb. 11, 2020.

(51) Int. Cl.
*C10G 69/04* (2006.01)
*C10G 69/06* (2006.01)
(Continued)

(52) U.S. Cl.
CPC ............. *C10G 69/06* (2013.01); *B01J 8/24* (2013.01); *B01J 19/245* (2013.01); *C10B 55/02* (2013.01);
(Continued)

(58) Field of Classification Search
CPC .. C10G 9/005; C10G 51/06; C10G 69/04–06; C10G 45/46; C10G 45/52–54
See application file for complete search history.

(56) References Cited

U.S. PATENT DOCUMENTS 4,404,092 A * 9/1983 Audeh .................. C10G 9/005
208/106
5,314,511 A 5/1994 Liotta, Jr. et al.
(Continued)

FOREIGN PATENT DOCUMENTS

CN 103333713 A1 10/2002
CN 1162516 C 8/2004
(Continued)

OTHER PUBLICATIONS

Elsayed, H.A. et al, "Upgrading of coker distillate under variable hydrotreating operating conditions", Egyptian Journal of Petroleum (2011), 20, pp. 25-31 (Year: 2011).*
(Continued)

*Primary Examiner* — Renee Robinson
(74) *Attorney, Agent, or Firm* — Abelman, Frayne & Schwab

(57) ABSTRACT

A feedstock is processed in a coking zone unit to produce at least light gases, coker naphtha, light coker gas oil and petroleum coke. Light coker gas oil, and in certain embodiments hydrotreated light coker gas oil, is subjected to deep hydrogenation to produce a deeply hydrogenated middle distillate fraction. All or a portion of the deeply hydrogenated middle distillate fraction is used as feed to a petrochemicals production complex to produce light olefins.

21 Claims, 5 Drawing Sheets

(51) Int. Cl.
*C10G 45/52* (2006.01)
*C10G 45/54* (2006.01)
*B01J 8/24* (2006.01)
*C10B 55/02* (2006.01)
*B01J 19/24* (2006.01)

(52) U.S. Cl.
CPC ............ *C10G 45/52* (2013.01); *C10G 45/54* (2013.01); *C10G 69/04* (2013.01); *B01J 2219/0004* (2013.01); *C10G 2300/107* (2013.01); *C10G 2300/308* (2013.01); *C10G 2300/4006* (2013.01); *C10G 2300/4012* (2013.01); *C10G 2300/4018* (2013.01); *C10G 2400/02* (2013.01); *C10G 2400/20* (2013.01)

(56) References Cited

U.S. PATENT DOCUMENTS

| | | | | |
|---|---|---|---|---|
| 5,906,728 | A * | 5/1999 | Iaccino | C10G 65/00 208/107 |
| 6,210,561 | B1 * | 4/2001 | Bradow | C10G 45/08 208/130 |
| 9,315,742 | B2 | 4/2016 | Aubry et al. | |
| 10,407,630 | B2 | 9/2019 | Al-Ghamdi et al. | |
| 10,472,574 | B2 | 11/2019 | Al-Ghamdi et al. | |
| 10,472,579 | B2 | 11/2019 | Al-Ghamdi et al. | |
| 10,472,580 | B2 | 11/2019 | Al-Ghamdi et al. | |
| 10,487,275 | B2 | 11/2019 | Al-Ghamdi et al. | |
| 10,487,276 | B2 | 11/2019 | Al-Ghamdi et al. | |
| 10,619,112 | B2 | 4/2020 | Al-Ghamdi | |
| 2005/0150817 | A1 * | 7/2005 | Tallman | C10G 51/06 208/78 |
| 2007/0090018 | A1 | 4/2007 | Keusenkothen et al. | |
| 2012/0298552 | A1 * | 11/2012 | Koseoglu | C10G 55/06 208/95 |
| 2013/0213859 | A1 * | 8/2013 | Etter | C10G 9/005 208/52 R |
| 2018/0057758 | A1 | 3/2018 | Al-Ghamdi et al. | |
| 2018/0155633 | A1 * | 6/2018 | Al-Ghamdi | C10G 47/00 |
| 2018/0155642 | A1 | 6/2018 | Al-Ghamdi et al. | |
| 2018/0223197 | A1 | 8/2018 | Al-Ghamdi et al. | |

FOREIGN PATENT DOCUMENTS

| | | |
|---|---|---|
| CN | 1294239 C | 1/2007 |
| CN | 101942330 B | 6/2013 |
| CN | 105647573 B | 7/2017 |
| CN | 105273754 B | 3/2018 |
| DE | 157199 A1 | 10/1982 |
| MX | 190308 B | 11/1998 |
| WO | 2015000849 A1 | 1/2015 |
| WO | 2017133975 A1 | 8/2017 |
| WO | 2017146876 A1 | 8/2017 |
| WO | 2018094336 A1 | 5/2018 |

OTHER PUBLICATIONS

Cheng, ZM et al., "Deep removal of sulfur and aromatics from diesel through two-stage concurrently and countercurrently operated fixed-bed reactors," Chemical Engineering Science | 59 (22-23): 5465-5472 Nov.-Dec. 2004 (Abstract).

Gupta, M et al., "Nanowire catalysts for ultra-deep hydrodesulfurization and aromatic hydrogenation," Applied Catalysis B-Environmental | 180: 246-254 Jan. 2016 (Abstract).

Resasco, DE et al., "Combined deep hydrogenation and ring opening of poly-aromatic hydrocarbons for diesel quality improvement," Abstracts of Papers of the American Chemical Society | 229: U594-U594 047-PETR Part 2 Mar. 13, 2005.

International Search Report from corresponding PCT Application No. PCT/US2021/017693 dated May 3, 2021.

\* cited by examiner

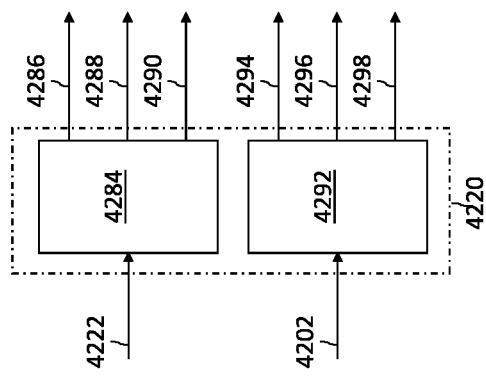
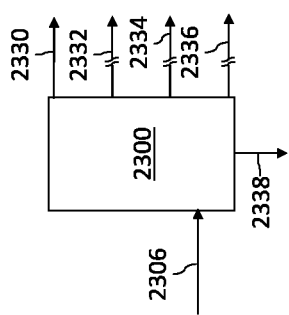
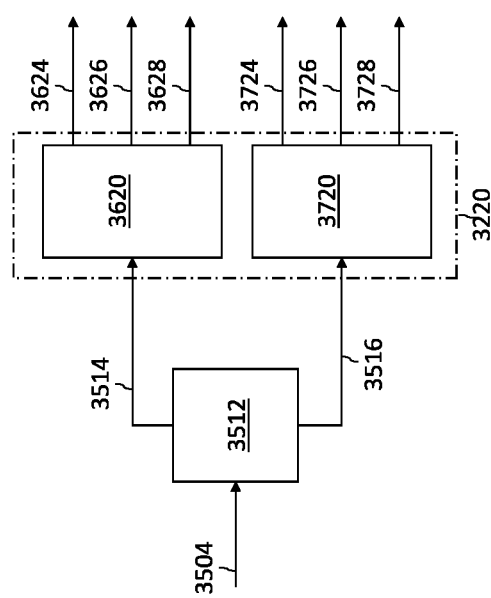
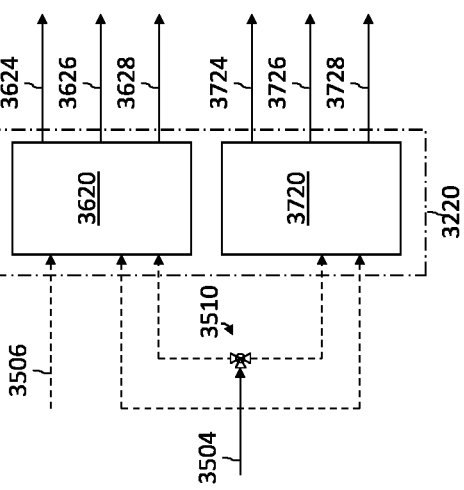

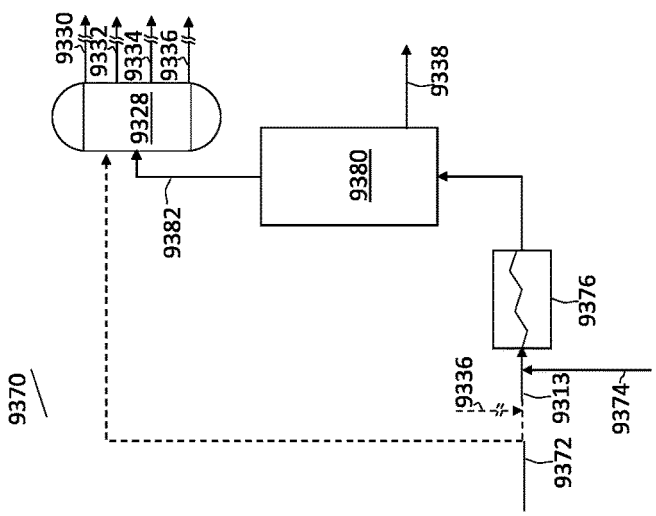
FIG. 7C
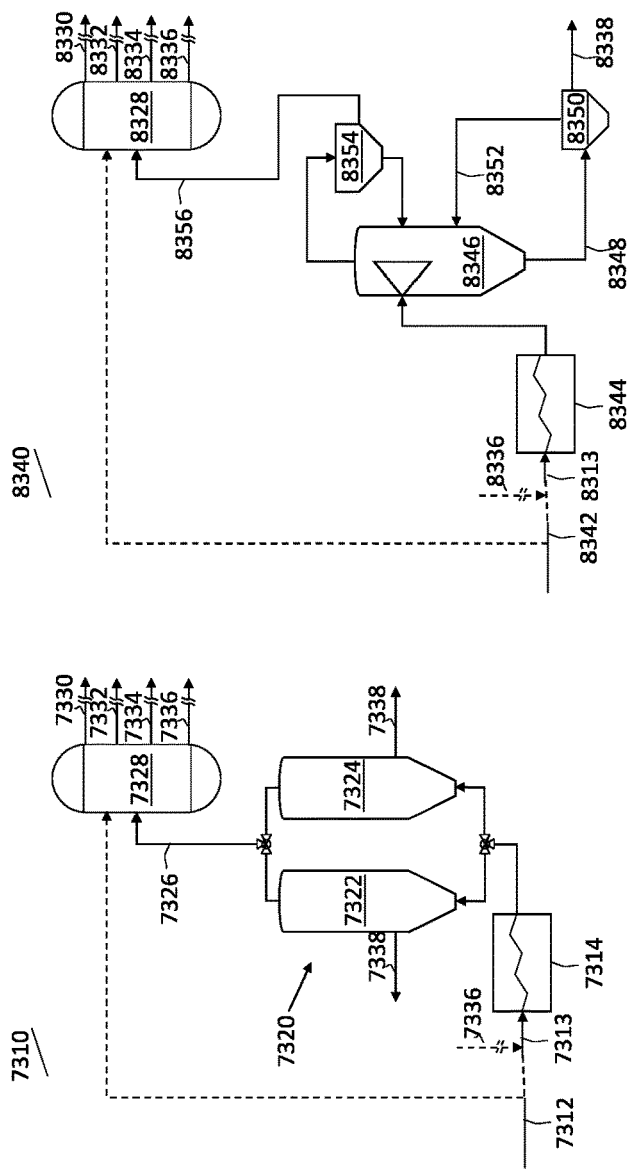
FIG. 7B
FIG. 7A

PROCESSES AND SYSTEMS FOR PETROCHEMICAL PRODUCTION INTEGRATING COKING AND DEEP HYDROGENATION OF COKING PRODUCTS

RELATED APPLICATIONS

This application is a continuation-in-part under 35 USC § 120 of U.S. patent application Ser. No. 16/787,529 filed on Feb. 11, 2020, which is incorporated by reference herein.

BACKGROUND OF THE INVENTION

Field of the Invention

The inventions disclosed herein related to petrochemical production from non-conventional feedstocks.

Description of Related Art

Processing options for crude oil fractions are typically as follows: light naphtha streams from crude oil distillation and/or from other processing units are sent to an isomerization unit to convert straight-chain paraffins into isomers which have higher octane numbers to produce gasoline blending component; heavy naphtha streams from crude oil distillation, coker, and cracking units are fed to a catalytic reformer to improve octane numbers, and products from the catalytic reformer can be blended into regular and premium gasolines for marketing; middle distillates from the crude oil distillation and other processing unit are blended into diesel fuels, jet fuels and/or furnace oils, directly or following hydrotreating to obtain ultra-low sulfur diesel; vacuum gas oil is hydrocracked to produce diesel or fluid catalytically cracked to obtain gasoline; the vacuum residue fraction can be subjected to hydroprocessing, delayed or fluid coking, thermal cracking, solvent deasphalting, gasification, or visbreaking.

Conventional refineries are designed and built to produce transportation fuels such as gasoline and diesel. With the increasing demand for light olefins such as ethylene and propylene as chemical building blocks, and increasing cost of conventional feedstocks, refiners and petrochemical producers are exploring new processing options to convert crude oil to produce light olefins and aromatics.

In refineries integrating steam cracking, one or more naphtha streams are routed to a steam cracking complex to produce light olefins. The light olefins (for instance, ethylene, propylene, butylene and butadiene) are basic intermediates which are widely used in the petrochemical and chemical industries. Thermal cracking, or steam pyrolysis, is a major type of process for forming these materials, typically in the presence of steam, and in the absence of oxygen. In such refineries, middle distillates are typically fractioned between a kerosene range fraction and a diesel range fraction to produce jet fuels and diesel/furnace oil fuels, respectively. For instance, a diesel range fraction is subjected to hydrotreating, typically followed by other hydroprocessing to produce diesel fuels and/or furnace oils.

In refineries integrating fluidized catalytic cracking ("FCC") processes, petroleum derived hydrocarbons are catalytically cracked with an acidic catalyst maintained in a fluidized state, which is regenerated on a continuous basis. The main product from such processes has generally been gasoline. Other products are also produced in smaller quantities via FCC processes such as liquid petroleum gas and cracked gas oil. Coke deposited on the catalyst is burned off at high temperatures and in the presence of air prior to recycling regenerated catalyst back to the reaction zone.

In recent years there has been a tendency to produce, in addition to gasoline, light olefins by FCC operations, which are valuable raw materials for various chemical processes. These operations have significant economic advantages, particularly with respect to oil refineries that are highly integrated with petrochemical production facilities. There are different methods to produce light olefins by FCC operations. Certain FCC operations are based on a short contact time of the feedstock with the catalyst, for example, as disclosed in U.S. Pat. Nos. 4,419,221A, 3,074,878A, and 5,462,652A, which are incorporated by reference herein. However, the short contact time between feedstock and catalyst typically results in relatively low feed conversion. Other FCC operations are based on using pentasil-type zeolite, for instance, as disclosed in U.S. Pat. No. 5,326,465A, which is incorporated by reference herein. However, the use of a pentasil-type zeolite catalyst will only enhance the yield of light fraction hydrocarbons by excessive cracking of the gasoline fraction, which is also a high value product. Additional FCC operations are based on carrying out the cracking reactions at high temperature, such as that disclosed in U.S. Pat. No. 4,980,053A, which is incorporated by reference herein. However, this method can result in relatively high levels of dry gases production.

Further FCC operations are based on cracking the feed oil at high temperature and short contact time and using a catalyst mixture of specific base cracking catalyst and an additive containing a shape-selective zeolite, as disclosed U.S. Pat. No. 6,656,346B2, which is incorporated by reference herein. Processes based on this method are also known as high severity fluidized catalytic cracking ("HS-FCC"). Features of this process include a downflow reactor, high reaction temperature, short contact time, and high catalyst to oil ratio. Downflow reactors permit higher catalyst to oil ratio, since lifting of solid catalyst particles by vaporized feed is not required, and this is particularly suitable for HS-FCC. In addition, HS-FCC processes are operated under considerably higher reaction temperatures (550° C. to 650° C.) as compared to conventional FCC processes. Under these reaction temperatures, two competing cracking reactions occur, thermal cracking and catalytic cracking. Thermal cracking contributes to the formation of lighter products, such as dry gas and coke, whereas catalytic cracking increases propylene and butylene yield. The short residence time in the downflow reactor is also favorable to minimize thermal cracking. Undesirable secondary reactions such as hydrogen-transfer reactions, which consume olefins, are suppressed. The desired short residence time is attained by mixing and dispersing catalyst particles and feed at the reactor inlet followed by immediate separation at the reactor outlet. In order to compensate for the decrease in conversion due to the short contact time, the HS-FCC process is operated at relatively high catalysts to oil ratios.

A need remains in the art for improved processes for converting crude oil to basic chemical intermediates such as light olefins. In addition, a need remains in the art for new approaches that offer higher value chemical production opportunities with greater leverage on economies of scale.

SUMMARY

Systems and processes are disclosed herein for petrochemical production from non-conventional feedstocks. Deep hydrogenation of light coker gas oil from a coking zone enables conversion into feedstocks suitable for petrochemical production, including steam cracking and/or fluidized catalytic cracking, to produce light olefins and other products. In accordance with one or more embodiments, a system and process are provided for deep hydrogenation of hydrotreated light coker gas oil to produce an effluent that is suitable as a feedstock to a petrochemicals production zone, which includes a petrochemical production FCC zone and/or a steam cracking reaction zone.

Integrated processes and systems are disclosed herein for converting crude oil to petrochemicals integrating deep hydrogenation of light coker gas oil. In accordance with one or more embodiments, the invention relates to an integrated process for producing petrochemicals. A suitable feedstock is processed in a coking unit to produce at least light gases, coker naphtha, light coker gas oil, heavy coker gas oil, and coke. Light coker gas oil, and in certain embodiments hydrotreated light coker gas oil is subjected to hydrogenation in a deep hydrogenation zone ("DHG") to produce a deeply hydrogenated middle distillate fraction. All or a portion of the deeply hydrogenated middle distillate fraction is used as feed to the petrochemicals production zone, to produce gases (including light olefins) and liquid hydrocarbon products, including light liquid hydrocarbon products from which aromatic products can be recovered, and heavy liquid hydrocarbon products. In embodiments using FCC operations for petrochemicals production, products include gases, FCC naphtha and cycle oil (light and heavy cycle oil). The gas products from the petrochemical production FCC zone include methane, ethane, ethylene, mixed C3s and mixed C4s. In embodiments using steam cracking, products include gases, pyrolysis gasoline and pyrolysis oil. The gas products from the steam cracking zone include H2, methane, ethane, ethylene, mixed C3 s and mixed C4s. From the mixed product stream(s) C3 s and the mixed C4s, petrochemicals ethylene, propylene and butylenes are recovered. Ethane and non-olefinic C3s from the FCC and/or steam cracking gas products can be recycled to other operations such as an integrated or separate steam cracking zone, and non-olefinic C4s from the gas products can be recycled to an integrated or separate steam cracking zone or to a separate processing zone for production of additional petrochemicals.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings in which the same or similar elements are referred to by the same number, and where:

FIG. 3 schematically depicts a general embodiment a coking operation that can be used in the integrated process for producing petrochemicals described herein;

FIGS. 4A-4C schematically depict embodiments of arrangements of reaction/separation zones suitable for the petrochemical production complex;

FIGS. 7A, 7B and 7C schematically depict coking operations that can be used in the integrated process for producing petrochemicals described herein.

DESCRIPTION

Figure 1:
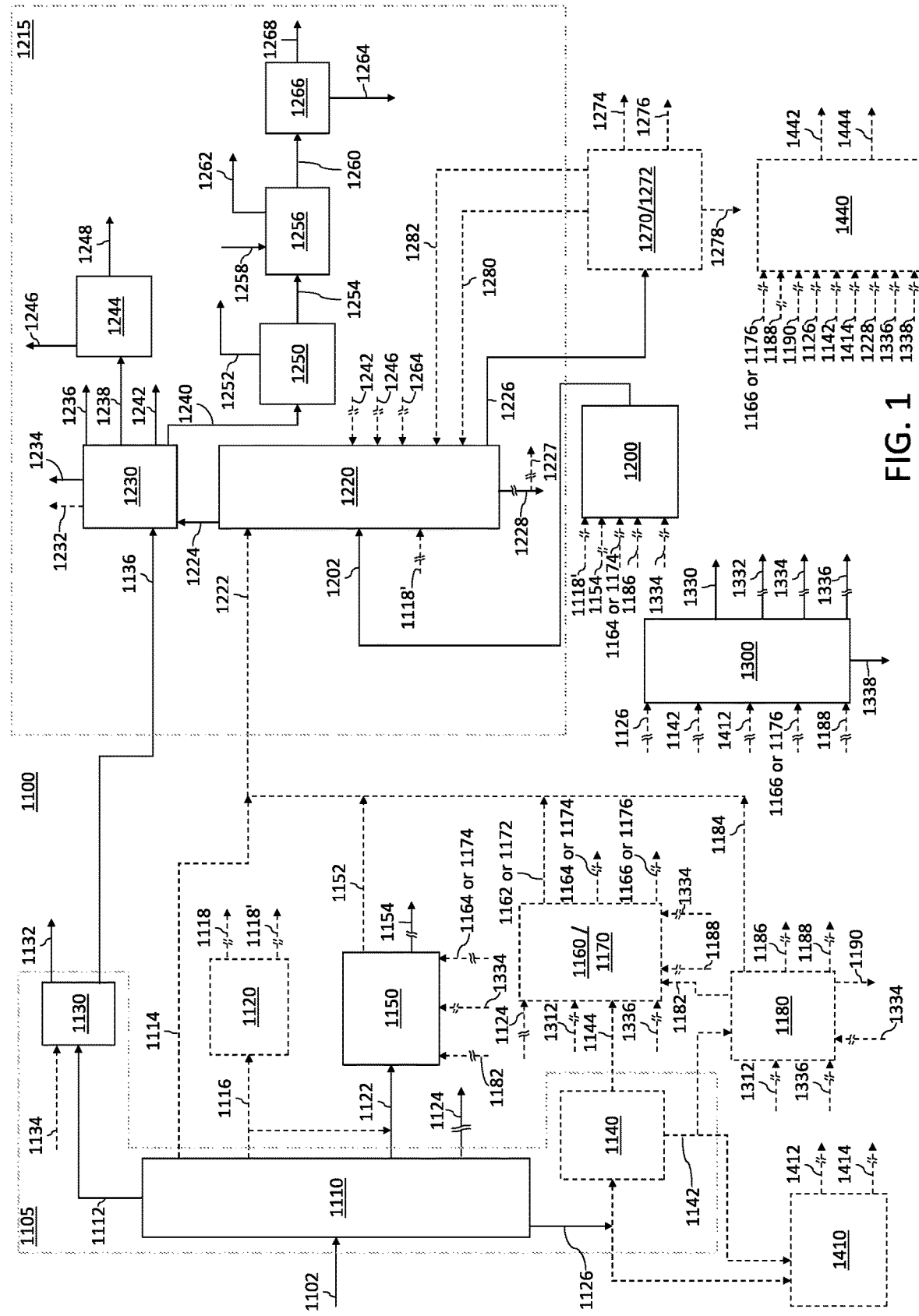
FIG. 1 schematically depicts an embodiment of a process for producing petrochemicals integrating coking of a primary feed, a petrochemical production complex and deep hydrogenation of light coker gas oil.

Process scheme configurations are disclosed that enable conversion of crude oil feeds with several processing units in an integrated manner into petrochemicals. The designs utilize minimum capital expenditures to prepare suitable feedstocks for petrochemicals production. The integrated process for converting crude oil to petrochemical products includes petrochemical production from deeply hydrogenated middle distillate fractions. The petrochemical production can be accomplished by FCC operations, steam cracking operations, or a combination of FCC and steam cracking operations. Feeds for petrochemicals production are derived from light coker gas oil obtained from a coking zone.

As used herein, the term "stream" (and variations of this term, such as hydrocarbon stream, feedstream, product stream, and the like) may include one or more of various hydrocarbon compounds, such as straight chain, branched or cyclical alkanes, alkenes, alkadienes, alkynes, alkylaromatics, alkenyl aromatics, condensed and non-condensed di-, tri- and tetra-aromatics, and gases such as hydrogen and methane, C2+ hydrocarbons and further may include various impurities.

The term "zone" refers to an area including one or more equipment, or one or more sub-zones. Equipment may include one or more reactors or reactor vessels, heaters, heat exchangers, pipes, pumps, compressors, and controllers. Additionally, an equipment, such as reactor, dryer, or vessels, further may be included in one or more zones.

Volume percent or "V %" refers to a relative value at conditions of 1 atmosphere pressure and 15° C.

The phrase "a major portion" with respect to a particular stream or plural streams means at least about 50 wt % and up to 100 wt %, or the same values of another specified unit.

The phrase "a significant portion" with respect to a particular stream or plural streams means at least about 75 wt % and up to 100 wt %, or the same values of another specified unit.

The phrase "a substantial portion" with respect to a particular stream or plural streams means at least about 90, 95, 98 or 99 wt % and up to 100 wt %, or the same values of another specified unit.

The phrase "a minor portion" with respect to a particular stream or plural streams means from about 1, 2, 4 or 10 wt %, up to about 20, 30, 40 or 50 wt %, or the same values of another specified unit.

The term "crude oil" as used herein refers to petroleum extracted from geologic formations in its unrefined form. Crude oil suitable as the source material for the processes herein include Arabian Heavy, Arabian Light, Arabian Extra Light, other Gulf crudes, Brent, North Sea crudes, North and West African crudes, Indonesian, Chinese crudes, North or South American crudes, Russian and Central Asian crudes, or mixtures thereof. The crude petroleum mixtures can be whole range crude oil or topped crude oil. As used herein, "crude oil" also refers to such mixtures that have undergone some pre-treatment such as water-oil separation; and/or gas-oil separation; and/or desalting; and/or stabilization. In certain embodiments, crude oil refers to any of such mixtures having an API gravity (ASTM D287 standard), of greater than or equal to about 20°, 30°, 32°, 34°, 36°, 38°, 40°, 42° or 44°.

The term "condensates" refers to hydrocarbons separated from natural gas stream. As used herein, "condensates" also refers to such mixtures that have undergone some pre-treatment such as water-oil separation; and/or gas-oil separation; and/or desalting; and/or stabilization. In certain embodiments, condensates refer to any of such mixtures having an API gravity (ASTM D287 standard), of greater than or equal to about 45, 50, 60, or 65°.

The acronym "LPG" as used herein refers to the well-known acronym for the term "liquefied petroleum gas," and generally is a mixture of C3-C4 hydrocarbons. In certain embodiments, these are also referred to as "light ends."

As used herein, all boiling point ranges relative to hydrocarbon fractions derived from crude oil via atmospheric and/or vacuum distillation shall refer to True Boiling Point values obtained from a crude oil assay, or a commercially acceptable equivalent.

The term "naphtha" as used herein refers to hydrocarbons having a nominal boiling range of about 20-205, 20-193, 20-190, 20-180, 20-170, 32-205, 32-193, 32-190, 32-180, 32-170, 36-205, 36-193, 36-190, 36-180 or 36-170° C.

The term "light naphtha" as used herein refers to hydrocarbons having a nominal boiling range of about 20-110, 20-100, 20-90, 20-88, 32-110, 32-100, 32-90, 32-88, 36-110, 36-100, 36-90 or 36-88° C.

The term "heavy naphtha" as used herein refers to hydrocarbons having a nominal boiling range of about 90-205, 90-193, 90-190, 90-180, 90-170, 93-205, 93-193, 93-190, 93-180, 93-170, 100-205, 100-193, 100-190, 100-180, 100-170, 110-205, 110-193, 110-190, 110-180 or 110-170° C.

In certain embodiments naphtha, light naphtha and/or heavy naphtha refer to such petroleum fractions obtained by crude oil distillation, or distillation of intermediate refinery processes as described herein.

The modifying term "straight run" is used herein having its well-known meaning, that is, describing fractions derived directly from the atmospheric distillation unit, optionally subjected to steam stripping, without other refinery treatment such as hydroprocessing, fluid catalytic cracking or steam cracking. An example of this is "straight run naphtha" and its acronym "SRN" which accordingly refers to "naphtha" defined above that is derived directly from the atmospheric distillation unit, optionally subjected to steam stripping, as is well known.

The term "kerosene" as used herein refers to hydrocarbons having a nominal boiling range of about 160-280, 160-270, 160-260, 170-280, 170-270, 170-260, 180-280, 180-270, 180-260, 190-280, 190-270, 190-260, 193-280, 193-270 or 193-260° C.

The term "light kerosene" as used herein refers to hydrocarbons having a nominal boiling range of about 160-250, 160-235, 160-230, 160-225, 170-250, 170-235, 170-230, 170-225, 180-250, 180-235, 180-230, 180-225, 190-250, 190-235, 190-230 or 190-225° C.

The term "heavy kerosene" as used herein refers to hydrocarbons having a nominal boiling range of about 225-280, 225-270, 225-260, 230-280, 230-270, 230-260, 235-280, 235-270, 235-260 or 250-280° C.

The term "atmospheric gas oil" and its acronym "AGO" as used herein refer to hydrocarbons having a nominal boiling range of about 250-400, 250-380, 250-370, 250-360, 250-340, 250-320, 260-400, 260-380, 260-370, 260-360, 260-340, 260-320, 270-400, 270-380, 270-370, 270-360, 270-340 or 270-320° C.

The term "heavy atmospheric gas oil" and its acronym "H-AGO" as used herein in certain embodiments refer to the heaviest cut of hydrocarbons in the AGO boiling range including the upper 3-30° C. range (for example, for AGO having a range of about 250-360° C., the range of H-AGO includes an initial boiling point from about 330-357° C. and an end boiling point of about 360° C.). For example, H-AGO can include hydrocarbons having a nominal boiling range of about 290-400, 290-380, 290-370, 310-400, 310-380, 310-370, 330-400, 330-380, 330-370, 340-400, 340-380, 340-370, 350-400, 350-380, 350-370, 360-370, 365-370, 290-360, 310-360, 330-360, 340-360, 350-360, 355-360, 290-340, 310-340, 330-340, 335-340, 290-320, 310-320 or 315-320° C.

The term "medium atmospheric gas oil" and its acronym "M-AGO" as used herein in certain embodiments in conjunction with H-AGO to refer to the remaining AGO after H-AGO is removed, that is, hydrocarbons in the AGO boiling range excluding the upper about 3-30° C. range (for example, for AGO having a range of about 250-360° C., the range of M-AGO includes an initial boiling point of about 250° C. and an end boiling point of from about 330-357° C.). For example, M-AGO can include hydrocarbons having a nominal boiling range of about 250-365, 250-355, 250-335, 250-315, 260-365, 260-355, 260-335, 260-315, 270-365, 270-355, 270-335 or 270-315° C.

In certain embodiments, the term "middle distillate" is used with reference to one or more straight run fractions from the atmospheric distillation unit, for instance containing hydrocarbons having a nominal boiling range of about 160-400, 160-380, 160-370, 160-360, 160-340, 170-400, 170-380, 170-370, 170-360, 170-340, 180-400, 180-380, 180-370, 180-360, 180-340, 190-400, 190-380, 190-370, 190-360, 190-340, 193-400, 193-380, 193-370, 193-360, or 193-340° C. In embodiments in which other terminology is used herein, the middle distillate fraction can also include all or a portion of AGO range hydrocarbons, all or a portion of kerosene, all or a portion of medium AGO range hydrocarbons, and/or all or a portion of heavy kerosene range hydrocarbons. In additional embodiments, term "middle distillate" is used to refer to fractions from one or more integrated operations boiling in this range.

The term "atmospheric residue" and its acronym "AR" as used herein refer to the bottom hydrocarbons having an initial boiling point corresponding to the end point of the AGO range hydrocarbons, and having an end point based on the characteristics of the crude oil feed.

The term "vacuum gas oil" and its acronym "VGO" as used herein refer to hydrocarbons having a nominal boiling range of about 370-565, 370-550, 370-540, 370-530, 370-510, 400-565, 400-550, 400-540, 400-530, 400-510, 420-565, 420-550, 420-540, 420-530 or 420-510° C.

The term "light vacuum gas oil" and its acronym "LVGO" as used herein refer to hydrocarbons having a nominal boiling range of about 370-425, 370-415, 370-405, 370-395, 380-425, 390-425 or 400-425° C.

The term "heavy vacuum gas oil" and its acronym "HVGO" as used herein refer to hydrocarbons having a nominal boiling range of about 425-565, 425-550, 425-540, 425-530, 425-510, 450-565, 450-550, 450-540, 450-530 or 450-510° C.

The term "vacuum residue" and its acronym "VR" as used herein refer to the bottom hydrocarbons having an initial boiling point corresponding to the end point of the VGO range hydrocarbons, and having an end point based on the characteristics of the crude oil feed.

The term "fuels" refers to crude oil-derived products used as energy carriers. Fuels commonly produced by oil refineries include, but are not limited to, gasoline, jet fuel, diesel fuel, fuel oil and petroleum coke. Unlike petrochemicals, which are a collection of well-defined compounds, fuels typically are complex mixtures of different hydrocarbon compounds.

The terms "kerosene fuel" or "kerosene fuel products" refer to fuel products used as energy carriers, such as jet fuel or other kerosene range fuel products (and precursors for producing such jet fuel or other kerosene range fuel products). Kerosene fuel includes but is not limited to kerosene fuel products meeting Jet A or Jet A-1 jet fuel specifications.

The terms "diesel fuel" and "diesel fuel products" refer to fuel products used as energy carriers suitable for compression-ignition engines (and precursors for producing such fuel products). Diesel fuel includes but is not limited to ultra-low sulfur diesel compliant with Euro V diesel standards.

The term "aromatic hydrocarbons" or "aromatics" is very well known in the art. Accordingly, the term "aromatic hydrocarbon" relates to cyclically conjugated hydrocarbons with a stability (due to delocalization) that is significantly greater than that of a hypothetical localized structure (for example, Kekule structure). "Aromatic hydrocarbons" or "aromatics" can refer to cyclically conjugated hydrocarbons having a single ring or multiple rings. A common method for determining aromaticity of a given hydrocarbon is the observation of diatropicity in its $^1$H NMR spectrum, for example the presence of chemical shifts in the range of from 7.2 to 7.3 ppm for benzene ring protons.

As used herein, the term "aromatic products" includes C6-C8 aromatics, such as benzene, toluene, mixed xylenes (commonly referred to as BTX), or benzene, toluene, ethylbenzene and mixed xylenes (commonly referred to as BTEX), and any combination thereof. These aromatic products (referred to in combination or in the alternative as BTX/BTEX for convenience herein) have a premium chemical value.

The term "wild naphtha" is used herein to refer to naphtha products derived from hydroprocessing units such as distillate hydrotreating units, vacuum gas oil hydroprocessing units and/or vacuum residue hydroprocessing units.

The term "unconverted oil" and its acronym "UCO," is used herein having its known meaning, and refers to a highly paraffinic and naphthenic fraction from a hydrocracker with a low nitrogen, sulfur and nickel content and including hydrocarbons having a nominal boiling range with an initial boiling point corresponding to the end point of the AGO range hydrocarbons, in certain embodiments the initial boiling point in the range of about 340-370° C., for instance about 340, 360 or 370° C., and an end point in the range of about 510-565° C., for instance about 540, 550 or 565° C. UCO is also known in the industry by other synonyms including "hydrowax."

The term "C #hydrocarbons" or "C #", is used herein having its well-known meaning, that is, wherein "#" is an integer value, and means hydrocarbons having that value of carbon atoms. The term "C #+ hydrocarbons" or "C #+" refers to hydrocarbons having that value or more carbon atoms. The term "C #−θhydrocarbons" or "C #−" refers to hydrocarbons having that value or less carbon atoms. Similarly, ranges are also set forth, for instance, C1-C3 means a mixture comprising C1, C2 and C3.

The term "petrochemicals" or "petrochemical products" refers to chemical products derived from crude oil that are not used as fuels. Petrochemical products include olefins and aromatics that are used as a basic feedstock for producing chemicals and polymers. Typical olefinic petrochemical products include, but are not limited to, ethylene, propylene, butadiene, butylene-1, isobutylene, isoprene, cyclopentadiene and styrene. Typical aromatic petrochemical products include, but are not limited to, benzene, toluene, xylene, and ethyl benzene.

The term "olefin" is used herein having its well-known meaning, that is, unsaturated hydrocarbons containing at least one carbon-carbon double bond. In plural, the term "olefins" means a mixture comprising two or more unsaturated hydrocarbons containing at least one carbon-carbon double bond. In certain embodiments, the term "olefins" relates to a mixture comprising two or more of ethylene, propylene, butadiene, butylene-1, isobutylene, isoprene and cyclopentadiene.

The term "make-up hydrogen" is used herein with reference to hydroprocessing zones to refer to hydrogen requirements of the zone that exceed recycle from conventionally integrated separation vessels; in certain embodiments as used herein all or a portion of the make-up hydrogen in any given hydroprocessing zone or reactor within a zone is from gases derived from the petrochemical production operation(s) in the integrated processes and systems.

The term "crude to chemicals conversion" as used herein refers to conversion of crude oil into petrochemicals including but not limited to light olefins such as ethylene, propylene, butylenes (including isobutylene), butadiene, MTBE, butanols, benzene, ethylbenzene, toluene, xylenes, and derivatives of the foregoing.

The term "crude to chemicals conversion ratio" as used herein refers to the ratio, on a mass basis, of the influent crude oil before desalting, to petrochemicals.

The term "crude C4" refers to the mixed C4 effluent from the petrochemical production operation(s) in the integrated processes and systems.

The term "C4 Raffinate 1" or "C4 Raff-1" refers to the mixed C4s stream leaving the butadiene extraction unit, that is, mixed C4s from the crude C4 except butadiene.

The term "C4 Raffinate 2" or "C4 Raff-2" refers to the mixed C4s stream leaving the MTBE unit, that is, mixed C4s from the crude C4 except butadiene and isobutene.

The term "C4 Raffinate 3" or "C4 Raff-3" refers to the mixed C4s stream leaving the C4 distillation unit, that is, mixed C4s from the crude C4 except butadiene, isobutene, and butane-1.

The terms "pyrolysis gasoline" and its abbreviated form "py-gas" are used herein having their well-known meaning, that is, steam cracking products in the range of C5 to C9, for instance having a nominal boiling range with an end boiling point of about 204.4° C. (400° F.), in certain embodiments up to about 148.9° C. (300° F.).

The terms "pyrolysis oil" and its abbreviated form "py-oil" are used herein having their well-known meaning, that is, a heavy oil fraction, C10+, that is derived from steam cracking.

The terms "light pyrolysis oil" and its acronym "LPO" as used herein in certain embodiments refer to pyrolysis oil having a nominal boiling range with an end boiling point of about 440, 450, 460 or 470° C.

The terms "heavy pyrolysis oil" and its acronym "HPO" as used herein in certain embodiments refer to pyrolysis oil having a nominal boiling range with an initial boiling point of about 440, 450, 460 or 470° C.

The term "coker gas oil" is used herein to refer to hydrocarbons boiling above an end point of the middle distillate range, for instance having an initial boiling point in the range of about 320-370° C., and an end boiling point in the range of about 510-565° C., which are derived from thermal cracking operations in a coker unit, for instance hydrocarbons having a nominal boiling range of about 320-565, 320-540, 320-510, 340-565, 340-540, 340-510, 370-565, 370-540, or 370-510° C.

The term "light coker gas oil" is used herein to refer to coker gas oil in the light range, for instance having an end boiling point from about 375-425° C., for instance hydrocarbons having a nominal boiling range of about 320-425, 320-400, 320-375, 340-425, 340-375, 370-425, 370-400, or 370-375° C.

The term "heavy coker gas oil" is used herein to refer to coker gas oil in the heavy range, for instance having an initial boiling point from about 375-425° C., for instance hydrocarbons having a nominal boiling range of about 375-565, 375-540, 375-510, 400-565, 400-540, 400-510, 425-565, 425-540, or 425-510° C.

The term "coker naphtha" is used herein to refer to hydrocarbons boiling in the naphtha range derived from thermal cracking operations in a coker unit.

The term "coker middle distillates" is used herein to refer to hydrocarbons boiling in the middle distillate range derived from thermal cracking operations in a coker unit.

The term "light cycle oil" and its acronym "LCO" as used herein refers to the light cycle oil produced by FCC units. The nominal boiling range for this stream is, for example, in the range of about 215-350, 216-350, 220-350, 215-343, 216-343, 220-343, 215-330, 216-330 or 220-330° C. LCO, directly from FCC separation or after hydrotreating, is conventionally used in diesel blends depending on the diesel specifications, or as a cutter to the fuel oil tanks for a reduction in the viscosity and sulfur contents.

The term "heavy cycle oil" and its acronym "HCO" as used herein refer to the heavy cycle oil which is produced by fluid catalytic cracking units. The nominal boiling range for this stream is, for example, in the range of about 330+, 343+ or 350+, for instance 330-530, 330-510, 343-530, 343-510, 350-530 or 350-510° C. HCO is conventionally used in an oil flushing system within the process. Additionally, HCO is conventionally used to partially vaporize debutanizer bottoms and for recycle as a circulating reflux to the main fractionator in the fluid catalytic cracking unit.

The term "cycle oil" is used herein to refer to a mixture of LCO and HCO.

In general, processes and systems herein relate to an integrated process for producing petrochemicals. A suitable feedstock is processed in a coking zone to produce at least light gases, coker naphtha, light coker gas oil and petroleum coke. Light coker gas oil, and in certain embodiments hydrotreated light coker gas oil, is subjected to hydrogenation to produce a deeply hydrogenated middle distillate fraction. All or a portion of the deeply hydrogenated middle distillate fraction is used as feed for petrochemical production In certain embodiments, a coking zone and a petrochemicals production complex are integrated in a refinery system to produce petrochemicals and fuel products from a feedstock such as crude oil feed. The system includes a separation zone such as an atmospheric distillation zone to separate at least a first atmospheric distillation zone fraction comprising straight run naphtha and a second atmospheric distillation zone fraction comprising at least a portion of middle distillates. In certain embodiments, heavy middle distillates such as atmospheric gas oil or heavy atmospheric gas oil are subjected to coking, a light coker gas oil product is hydrotreated, and the hydrotreated light coker gas oil is subjected to deep hydrogenation, thereby producing a hydrocarbon mixture effective as a feed for a petrochemicals production zone to obtain light olefins. Lighter atmospheric distillation zone middle distillates (optionally subjected to hydrotreating) can also be subjected to deep hydrogenation and increasing the feed for the petrochemicals production zone.

In certain embodiments, a third atmospheric distillation zone fraction comprising atmospheric residue is also separated. In certain embodiments, a vacuum distillation zone is integrated to further separate the third atmospheric distillation zone fraction into a first vacuum distillation zone fraction comprising vacuum gas oil and a second vacuum distillation zone fraction comprising vacuum residue. In the embodiments in which the second vacuum distillation zone fraction is recovered, all or a portion of that fraction can optionally be processed in a vacuum residue treatment zone. A vacuum residue treatment zone can include one or more of residue hydroprocessing, delayed coking, gasification, or solvent deasphalting. In additional embodiments, all or a portion of the third atmospheric distillation zone fraction comprising atmospheric residue is processed in an atmospheric residue treatment zone, which can include one or more of residue hydroprocessing, residual FCC (separate from the petrochemical production FCC zone in the integrated process herein), delayed coking, gasification, or solvent deasphalting.

In a distillate hydrotreating ("DHT") zone, all or a portion of the second atmospheric distillation zone fraction is processed to produce at least a first DHT fraction and a second DHT fraction. The first DHT fraction comprises naphtha and the second DHT fraction is used as a hydrotreated middle distillate feed for deep hydrogenation in the DHG zone.

In a vacuum gas oil hydroprocessing ("VGOHP") zone (which can be included for treatment of gas oil range streams, for instance atmospheric gas oil or vacuum gas oil if a vacuum distillation zone is used, or other gas oil range components obtained from other treatment of residue), all or a portion of gas oil components within the integrated process are subjected to hydrotreating, or a combination of hydrotreating and hydrocracking. The VGOHP zone generally produces at least a first VGOHP fraction and a second VGOHP fraction. The first VGOHP fraction comprises naphtha and the second VGOHP fraction comprise middle distillates, and is used as a source of hydrotreated middle distillate feed for the DHG zone. The second VGOHP fraction can be routed to the DHG zone directly, and/or subjected to further treatment to remove sulfur, nitrogen and/or other heteroatoms, for example by routing to the DHT zone. In addition, the VGOHP zone produces hydrotreated gas oil and/or unconverted oil (depending on the mode of operation). In certain embodiments, the hydrotreated gas oil and/or unconverted oil is subjected to coking, a light coker gas oil product is hydrotreated, and the hydrotreated light coker gas oil is subjected to deep hydrogenation, thereby producing a hydrocarbon mixture effective as a feed for petrochemicals production to obtain light olefins.

In certain embodiments, a vacuum residue treatment zone and/or an atmospheric residue treatment zone can include a residue hydroprocessing zone such as a residue hydrocracker. In certain embodiments a vacuum residue hydrocracking ("VRHCK") zone includes a preceding vacuum residue hydrotreating step, and/or a post hydrotreating step. The vacuum residue hydroprocessing zone generally produces distillates naphtha, middle distillates, a residue hydroprocessed VGO fraction and pitch. The residue hydroprocessing zone products can be used as conventionally known. In certain embodiments of the processes herein, all or a portion of the middle distillates range products from the vacuum residue hydroprocessing zone and/or the atmospheric residue treatment zone can be passed to the VGOHP zone (if included), the DHT zone or directly used as middle distillate feed for the DHG zone. In certain embodiments, the all or a portion of the residue hydroprocessed VGO fraction is subjected to coking, a light coker gas oil product is hydrotreated, and the hydrotreated light coker gas oil is subjected to deep hydrogenation, thereby producing a hydrocarbon mixture effective as a feed for petrochemicals production to obtain light olefins.

In certain embodiments, a vacuum residue treatment zone and/or an atmospheric residue treatment zone can include a coking zone such as delayed coking, which can be the same as the coking zone used to produce light coker gas oil as feed to the DHG zone, or a separate coking zone. All or a portion of vacuum residue (straight run vacuum residue or vacuum residue that has been subjected to treatment to remove sulfur, nitrogen and/or other heteroatoms), or all or a portion of atmospheric residue (straight run atmospheric residue or atmospheric residue that has been subjected to treatment to remove sulfur, nitrogen and/or other heteroatoms) can be subjected to coking and the coking liquid and gas products can be used as conventionally known. In certain embodiments of the processes herein, all or a portion of the middle distillates from the coking liquid and gas products, including light coker gasoil from the coking zone products is used as additional middle distillate feed for deep hydrogenation. If necessary, all or a portion of the middle distillate range coker liquid products can be subjected to treatment to remove sulfur, nitrogen and/or other heteroatoms prior to deep hydrogenation; the additional treatment of middle distillate range coker liquid products can comprise a dedicated treatment unit or step, or one or more of the units or steps within the integrated process and system such as the VGOHP zone (if included) or the DHT zone. In embodiments in which middle distillate range coker liquid products are passed to the VGOHP zone (if included) or the DHT zone, severity of the conditions in those zones may be increased to accommodate the higher concentrations of sulfur, nitrogen and/or other heteroatoms.

In certain embodiments, a solvent deasphalting zone can optionally be integrated to process all or a portion of vacuum residue (straight run vacuum residue or vacuum residue that has been subjected to treatment to remove sulfur, nitrogen and/or other heteroatoms), or all or a portion of atmospheric residue (straight run atmospheric residue or atmospheric residue that has been subjected to treatment to remove sulfur, nitrogen and/or other heteroatoms). The deasphalted oil phase and the asphalt phase can be used as conventionally known. In certain embodiments of the processes herein, all or a portion of the deasphalted oil is used as a source of additional middle distillate feed for the DHG zone. For example, all or a portion of the deasphalted oil can be subjected to treatment to remove sulfur, nitrogen and/or other heteroatoms prior to deep hydrogenation; the additional treatment of deasphalted oil can comprise a dedicated treatment unit or step, or one or more of the units or steps within the integrated process and system such as a vacuum residue treatment zone, a VGOHP zone or a DHT zone. In embodiments in which deasphalted oil is passed to a DHT zone, severity of the conditions in those zones may be increased to accommodate the higher concentrations of sulfur, nitrogen and/or other heteroatoms.

In certain embodiments, a gasification zone is integrated to process all or a portion of atmospheric residue (straight run atmospheric residue or atmospheric residue that has been subjected to treatment to remove sulfur, nitrogen and/or other heteroatoms), all or a portion of vacuum residue in embodiments in which vacuum distillation is integrated (straight run vacuum residue or vacuum residue that has been subjected to treatment to remove sulfur, nitrogen and/or other heteroatoms), heavy coker oil from the coking zone; heavy liquid hydrocarbon products (pyrolysis oil, heavy pyrolysis oil, cycle oil or heavy cycle oil) from the petrochemicals production complex; and/or all or a portion of asphalt produced in embodiments in which solvent deasphalting is integrated. The produced syngas can be used as conventionally known. In certain embodiments of the processes herein, syngas is subjected to water-gas shift reaction as is conventionally known to produce hydrogen that can be recycled to hydrogen users in the system, such as a vacuum residue treatment zone, a VGOHP zone or a DHT zone.

In certain embodiments, an atmospheric residue treatment zone comprises a residual FCC zone that is separate from the petrochemical production FCC zone in the process herein. The feed can be straight run atmospheric residue or atmospheric residue that has been subjected to treatment to remove sulfur, nitrogen and/or other heteroatoms. The products from the separate residual FCC zone can be used as conventionally known. In certain embodiments of the processes herein, all or a portion of light cycle oil from the residual FCC products is used as additional middle distillate feed for the DHG zone. If necessary, all or a portion of the light cycle oil can be subjected to treatment to remove sulfur, nitrogen and/or other heteroatoms prior to deep hydrogenation; the additional treatment of light cycle oil can comprise a dedicated treatment unit or step, or one or more of the units or steps within the integrated process and system such as the VGOHP zone or the DHT zone. In embodiments in which light cycle oil is passed to the VGOHP zone or the DHT zone, severity of the conditions in those zones may be increased to accommodate the higher concentrations of sulfur, nitrogen and/or other heteroatoms.

All or a portion of the hydrotreated middle distillates from the DHT zone are passed to the DHG zone to produce hydrogenated middle distillates. In certain embodiments, middle distillates from the VGOHP zone (if included) are subjected to deep hydrogenation, in the same DHG zone as the hydrotreated middle distillates from the DHT zone, or in a separate DHG zone. In certain embodiments, middle distillates obtained from the VR and/or AR treatment zones (if included), if necessary suitably pretreated in separate treatment units or integrated units such as the DHT zone or the VGOHP zone (if included), are subjected to deep hydrogenation, in the same DHG zone as the hydrotreated middle distillates from the DHT zone, in the same DHG zone as the middle distillates from the VGOHP zone (if included), or in a separate DHG zone.

In the process herein, all or a portion of the hydrogenated middle distillates produced in the DHG zone(s) are processed in a petrochemical production complex, which includes an FCC reaction zone, a steam cracking zone, or both an FCC reaction zone and a steam cracking zone. Products from petrochemical production include gases (including light olefins), light liquid hydrocarbon products from which aromatic products can be recovered, and heavy liquid hydrocarbon products. In embodiments using FCC operations, products include gases, FCC naphtha and cycle oil (light and heavy cycle oil), whereby light liquid hydrocarbon products from which aromatic products can be recovered include FCC naphtha, and heavy liquid hydrocarbon products include cycle oil. The gas products from an integrated FCC zone include methane, ethane, ethylene, mixed C3s and mixed C4s. In embodiments using steam cracking, products include gases, pyrolysis gasoline and pyrolysis oil, whereby light liquid hydrocarbon products from which aromatic products can be recovered include pyrolysis gasoline. The gas products from an integrated steam cracking zone include mixed product stream(s) comprising H2, methane, ethane, ethylene, mixed C3s and mixed C4s. From the mixed product stream C3s and the mixed C4s, petrochemicals ethylene, propylene and butylenes are recovered.

Figure 2:
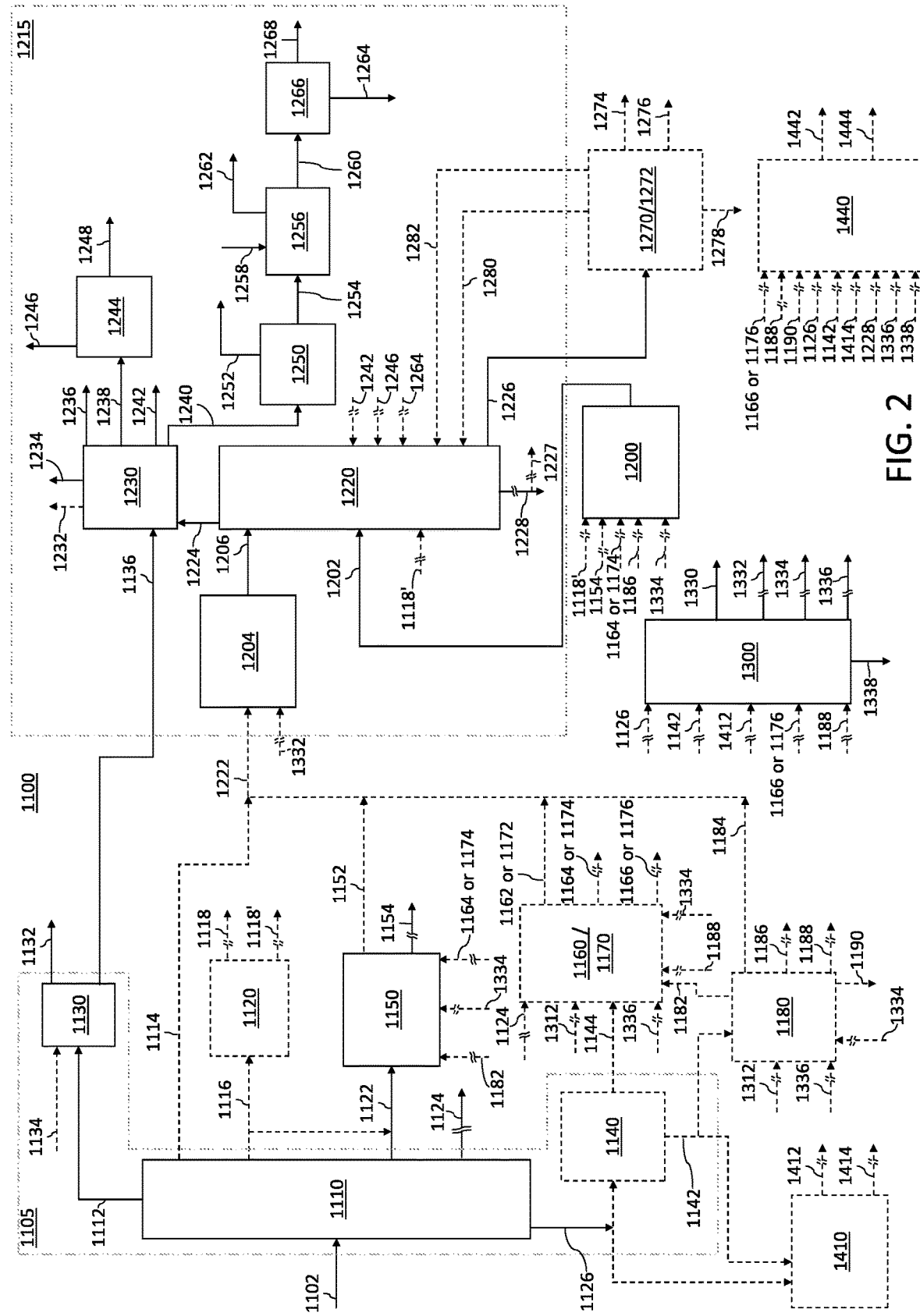
FIG. 2 schematically depicts an embodiment of a process for producing petrochemicals and fuel product integrating coking of a primary feed, a petrochemical production complex, deep hydrogenation of light coker gas oil, and deep hydrogenation of naphtha.

FIG. 1 schematically depicts an embodiment of a process and system 1100 for conversion of crude oil to petrochemicals and fuel products, integrating deep hydrogenation of middle distillates to increase feedstock for petrochemical production including ethylene, propylene and other valuable petrochemical products. Although the system 1100 is shown in FIG. 1 and FIG. 2, it is to be appreciated that these can be varied as is known in the art, and that these are shown in context of producing unconventional feeds for petrochemical production. For example, products from refineries that may typically be used for producing diesel fuel and other fuel products having nominal boiling points in the middle distillate range are conditioned according the disclosure herein to convert them into feedstocks that are effective for petrochemical production by steam cracking or FCC operations.

The system 1100 generally includes a crude complex 1105, refinery units or zones to treat certain fractions from the crude complex 1105, a DHG zone 1200, a petrochemicals production complex 1215, and a coking zone 1300. The coking zone 1300 receives one or more suitable coking feeds from within the system 1100, and produces light gases 1330, coker naphtha 1332, light coker gas oil 1334, heavy coker gas oil 1336, and coke 1338. The DHG zone 1200 receives all or a portion of the light coker gas oil 1334 and optionally one or more middle distillate streams from within the system 1100, and produces a hydrogenated middle distillate stream 1202 that is used as feed to the petrochemicals production complex 1215. The petrochemicals production complex 1215 generally includes a reaction/separation zone 1220 that can be a steam cracking zone, a petrochemical production FCC zone, or both, and products include a mixed gas products stream 1224, a light liquid hydrocarbon products stream 1226 (for instance pyrolysis gasoline and/or FCC naphtha), and a heavy liquid hydrocarbon products stream 1228 (for instance pyrolysis oil and/or FCC cycle oil). In certain embodiments, an intermediate portion liquid hydrocarbon products stream 1227, referred to herein as a light portion of the heavy liquid hydrocarbon products stream 1228, is separately recovered from the reaction/separation zone 1220 (for instance light pyrolysis oil and/or FCC light cycle oil). In embodiments in which the intermediate portion liquid hydrocarbon products stream 1227 is separately recovered, stream 1228 can represent the remainder of the heavy products, for instance, heavy pyrolysis oil and/or FCC heavy cycle oil. In certain embodiments only a portion of the initial heavy liquid hydrocarbon products are separated, so that some of the light portion is combined with the heavy portion as the stream 1228.

The crude complex 1105 typically includes an atmospheric distillation zone ("ADU") 1110, a saturated gas plant 1130 and in certain embodiments a vacuum distillation zone ("VDU") 1140 (shown in dashed lines). Refinery units or zones within the system 1100 include a DHT zone 1150, and in certain embodiments a VGOHP zone 1160/1170. The system 1100 can include an optional kerosene sweetening zone 1120 (shown in dashed lines) producing one or both of a kerosene fuel fraction 1118 as a fuel product and/or blending component, and a light range middle distillate fraction 1118' as a source feedstock for the DHG zone 1200. The DHT zone 1150 produces a hydrotreated naphtha fraction 1152 (sometimes referred to as wild naphtha) as part of the combined naphtha stream 1222, and a hydrotreated middle distillate fraction 1154 which can be used as feedstock for the DHG zone 1200. The VGOHP zone 1160/1170 (shown in dashed lines as optional) operates as a vacuum gas oil hydrocracking ("VGOHCK") zone 1160 or as a vacuum gas oil hydrotreating ("VGOHT") zone 1170, and in certain embodiments operates under conditions used in vacuum gas oil hydrotreating and/or hydrocracking. The VGOHCK zone 1160 generally produces a naphtha fraction 1162, a cracked middle distillates fraction 1164 which can be used as feedstock for the DHG zone 1200, and an unconverted oil fraction 1166 which can be used as feedstock for the coking zone 1300. The VGOHT zone 1170 generally produces a hydrotreated naphtha fraction 1172, a hydrotreated middle distillates fraction 1174 which can be used as feedstock for the DHG zone 1200, and a hydrotreated gas oil fraction 1176 which can be used as feedstock for the coking zone 1300.

In addition, the system 1100 optionally includes a vacuum residue conditioning ("VRC") zone 1180 (shown in dashed lines), for instance, a vacuum residue hydrocracking ("VRHCK") zone producing a naphtha stream 1184, a cracked middle distillates fraction 1186 which can be used as feedstock for the DHG zone 1200, a residue hydroprocessed VGO fraction 1188 which can be used as feedstock for the coking zone 1300, and pitch 1190. The residue hydroprocessed VGO fraction 1188 can optionally be routed to the VGOHP zone 1160/1170. In certain embodiments a cracked middle distillates stream 1182 (instead of the cracked middle distillates fraction 1186 or in conjunction therewith) is routed to the DHT zone 1150 and/or to the VGOHP zone 1160/1170.

In certain embodiments, a solvent deasphalting zone 1410 is integrated, alone or in combination with other optional units herein for processing residue fractions. In certain embodiments a solvent deasphalting zone 1410 receives as feedstock all or a portion of a vacuum residue stream 1142 from the vacuum distillation zone 1140, optionally in combination with a portion of an atmospheric residue stream 1126 from the atmospheric distillation zone 1110. In certain embodiments, vacuum distillation is not used and a solvent deasphalting zone 1410 receives as feedstock all or a portion of the atmospheric residue stream 1126. The solvent deasphalting zone 1410 typically produces a deasphalted oil stream 1412 and asphalt 1414. The deasphalted oil stream 1412 can be used as feed to one or more of the coking zone 1300, the VGOHP zone 1160/1170 and/or the VRC zone 1180.

In certain embodiments, a gasification zone 1440 is integrated, alone or in combination with other optional units herein for processing residue fractions, unconverted oil fractions, and/or asphalt. In certain embodiments the gasification zone 1440 receives as feedstock all or a portion of the one or more of the following streams: the heavy gas oil stream 1336 from the coking zone 1300; heavy liquid hydrocarbon products 1228 (pyrolysis oil, heavy pyrolysis oil, cycle oil or heavy cycle oil) from the petrochemicals production complex 1215; the unconverted oil fraction 1166 or the hydrotreated gas oil fraction 1176 from the VGOHP zone 1160/1170; the residue hydroprocessed VGO fraction 1188 from the VRC zone 1180; pitch 1190 from the VRC zone 1180; the vacuum residue stream 1142; the atmospheric residue stream 1126; and/or asphalt 1414 in embodiments in which solvent deasphalting is integrated. In certain embodiments, vacuum distillation is not used and the gasification zone 1440 receives as feedstock all or a portion of the atmospheric residue stream 1126 and/or asphalt 1414 in embodiments in which solvent deasphalting is integrated. The gasification zone 1440 generally produces a raw synthesis gas stream 1442 and steam 1444, which in certain embodiments can be used to produce hydrogen and electricity as is known in the art.

In certain embodiments, in addition to light coker gas oil 1334, the DHG zone 1200 receives desulfurized middle distillate fractions from within the system 1100. In certain embodiments, all, a substantial portion, a significant portion or a major portion of the middle distillate range fraction 1154 from the DHT zone 1150 is routed to the DHG zone 1200. In certain embodiments, all, a substantial portion, a significant portion or a major portion of the cracked and/or hydrotreated middle distillate range fraction 1164 or 1174 from the VGOHP zone 1160/1170 is routed to the DHG zone 1200. In certain embodiments, all, a substantial portion, a significant portion or a major portion of the middle distillate range fraction 1186 from the VRC zone 1180 is routed to the DHG zone 1200. These streams can be combined with each other and/or with light coker gas oil 1334, or the DHG zone 1200 can operate to hydrogenate one, two or all of these streams. The products from the DHG zone 1200, the hydrogenated middle distillate stream 1202, serves as feed to the petrochemicals production complex 1215, in certain embodiments combined with one or more naphtha feeds. The petrochemicals production complex 1215 shown in the present disclosure includes a reaction/separation zone 1220 and associated separation and ancillary reaction operations, including but not limited to, for example, the olefin recovery zone 1230; the MAPD zone 1244, the butadiene extraction zone 1250, the MTBE zone 1256 (and its associated selective hydrogenation unit) and the C4 separation zone 1266. As described herein the reaction/separation zone 1220 can include one or more FCC units, one or more steam cracking units, or both one or more FCC units and one or more steam cracking units.

A feed 1102 is separated into fractions in the crude complex 1105, typically including the atmospheric distillation zone ("ADU") 1110, the saturated gas plant 1130 and in certain embodiments the vacuum distillation zone ("VDU") 1140. The feed 1102 can be crude oil, or in certain embodiments the feed can be crude oil that has been subjected to hydrotreating (hydrotreated crude oil), solvent deasphalting (deasphalted oil) or coking, such as delayed coking (coker liquid and gas products). In further embodiments the feed 1102 can be a condensate stream, and the VDU is not required. The atmospheric distillation unit and vacuum distillation unit are used in well-known arrangements. The feed 1102, in certain embodiments having LPG and light naphtha removed, is separated into fractions in the atmospheric distillation zone 1110. In embodiments in which LPG and light naphtha are removed, those products can be sent to the steam cracking reaction/separation zone that is part of the petrochemicals production complex 1215, a separate steam cracking reaction/separation zone, or used for other purposes. A stream 1136 of C2-C4 hydrocarbons including ethane, propane and butanes are separated from the light ends, and LPG 1112 is separated from the atmospheric distillation zone 1110 via the saturated gas plant 1130. Optionally, other light products are routed to the saturated gas plant 1130, shown in dashed lines as stream 1134, such as light gases from refinery units within the integrated system, and in certain embodiments light gases from outside of the battery limits. The separated C2-C4 hydrocarbons 1136 can be sent to the steam cracking reaction/separation zone that is part of the petrochemicals production complex 1215, a separate steam cracking reaction/separation zone, or used for other purposes. Sweet off-gases 1132 from the saturated gas plant 1130 and off-gases 1234 from the petrochemicals production complex 1215 (via an olefin recovery train 1230) are removed and recovered as is typically known, for instance to contribute to a fuel gas ("FG") system, or in certain embodiments can be recycled to the steam cracking reaction/separation zone that is part of the petrochemicals production complex 1215, passed to a separate steam cracking reaction/separation zone, or used for other purposes. Off-gases from the fluid catalytic cracking unit, after passing through an unsaturated gas plant, can be integrated with off-gases from the saturated gas plant 1130 for common handling of the fuel gases.

Straight run naphtha 1114 from the atmospheric distillation zone 1110 can optionally be passed to the petrochemicals production complex 1215. In certain embodiments, all, a substantial portion or a significant portion of the straight run naphtha 1114 is routed to the petrochemicals production complex 1215. Remaining naphtha (if any) can be upgraded if necessary, for example to increase the octane number, and added to a gasoline pool. In addition, the straight run naphtha stream 1114 can contain naphtha from other sources as described herein and sometimes referred to as wild naphtha, for instance, naphtha range hydrocarbons from one or more of the integrated distillate, gas oil and/or residue hydroprocessing units. In additional embodiments, one or more straight run naphtha stream(s) are recovered from the atmospheric distillation zone 1110, for instance a light naphtha stream and a heavy naphtha stream. In such embodiments, all or a portion of straight run light naphtha can be routed to the petrochemicals production complex 1215, while all or a portion of heavy naphtha is subjected to hydroprocessing (hydrotreating and/or hydrogenation). In certain embodiments, all, a substantial portion or a significant portion of straight run light naphtha is routed to the petrochemicals production complex 1215, while all, a substantial portion or a significant portion of heavy naphtha is routed to hydrotreating and/or hydrogenation process units. In embodiments in which naphtha is not sent to the petrochemicals production complex 1215, it can be upgraded if necessary, for example to increase the octane number, and added to the gasoline pool.

One or more middle distillate streams from the atmospheric distillation zone 1110 can be used as feed to the DHG zone 1200. In the embodiment shown in FIG. 1, at least three different middle distillate cuts are processed. In one example using the arrangement shown in FIG. 1, a first atmospheric distillation zone middle distillate fraction 1116, in certain embodiments referred to as a kerosene fraction, contains light kerosene range hydrocarbons, a second atmospheric distillation zone middle distillate fraction 1122, in certain embodiments referred to as a diesel fraction, contains heavy kerosene range hydrocarbons and medium AGO range hydrocarbons, and a third atmospheric distillation zone middle distillate fraction 1124, in certain embodiments referred to as an atmospheric gas oil fraction, contains heavy AGO range hydrocarbons. In another example using the arrangement shown in FIG. 1, a first middle distillate fraction 1116 contains kerosene range hydrocarbons, a second middle distillate fraction 1122 contains medium AGO range hydrocarbons and a third middle distillate fraction 1124 contains heavy AGO range hydrocarbons. In another example using the arrangement shown in FIG. 1, a first middle distillate fraction 1116 contains light kerosene range hydrocarbons and a portion of heavy kerosene range hydrocarbons, a second middle distillate fraction 1122 contains a portion of heavy kerosene range hydrocarbons and a portion of medium AGO range hydrocarbons and a third middle distillate fraction 1124 contains a portion of medium AGO range hydrocarbons and heavy AGO range hydrocarbons. In certain embodiments, middle distillates are used to produce diesel and/or kerosene, and additional naphtha feed to the petrochemicals production complex 1215.

For example, a first middle distillate fraction 1116, such as a kerosene fraction or a light kerosene fraction, can optionally be processed in a kerosene sweetening process 1120 to produce one or both of a kerosene fuel product 1118, for instance, jet fuel compliant with Jet A or Jet A-1 specifications, and optionally other fuel products (not shown), and a light range middle distillate fraction 1118' as a source of additional feedstock for the DHG zone 1200 or as a source of feedstock directly to the petrochemicals production complex 1215. In certain embodiments herein, all or a portion of the first middle distillate fraction 1116 is not treated in a kerosene sweetening process 1120, but rather is used as a feed for distillate hydrotreating so as to produce additional wild naphtha that optionally can be used as feed to the petrochemicals production complex 1215. In additional embodiments, the light range middle distillate fraction 1118' is divided by weight into a heavy portion passing and a light portion, with the heavy portion passing to the DHG zone 1200 or the DHT zone 1150, and the light portion used as feed to the petrochemicals production complex 1215. In additional embodiments, the light middle distillates 1116 or a portion thereof can be combined and discharged with the medium range middle distillates 1122 (so that a light middle distillates 1116 stream is not provided).

A second middle distillate fraction 1122 is processed in the DHT zone 1150, generally to produce a hydrotreated naphtha fraction 1152 and a hydrotreated middle distillate fraction 1154. All or a portion of the hydrotreated middle distillate fraction 1154 can be used as a feed for hydrogenation. In certain embodiments, all or a portion of the middle distillate fraction 1154 can be recovered as diesel fuel or as a diesel fuel blending component. The medium range middle distillates that are passed to the DHT zone 1150 can include a middle distillate range fraction, or a fraction ranging from heavy kerosene through medium atmospheric gas oil. In further embodiments, the DHT zone 1150 can also process cracked distillate products from the VGOHP zone 1160/1170. In certain embodiments, all, a substantial portion, a significant portion or a major portion of the wild naphtha 1152 can optionally be routed to the petrochemicals production complex 1215, alone or in combination with other naphtha fractions in the integrated process. Any portion that is not passed to the petrochemicals production complex 1215 can be upgraded if necessary, for example to increase the octane number, and routed to the gasoline pool. In certain embodiments, the wild naphtha 1152 is routed through the crude complex 1105, alone, or in combination with other naphtha fractions from within the integrated process. In embodiments in which the wild naphtha 1152 is routed through the crude complex 1105, all or a portion of the LPG produced in the DHT zone 1150 can be passed with the wild naphtha fraction 1152, or can be passed directly to the gas plant 1130, or to a separate gas treatment zone. In certain optional embodiments, all, a substantial portion, a significant portion or a major portion of the wild naphtha 1152 is routed to the petrochemicals production complex 1215 (directly or through the crude complex 1105). In embodiments in which naphtha is not sent to the petrochemicals production complex 1215, it can be upgraded if necessary, for example to increase the octane number, and added to the gasoline pool.

In certain embodiments (as denoted by dashed lines), all, a substantial portion, a significant portion or a major portion of the third middle distillate fraction 1124 is routed to the VGOHP zone 1160/1170 in combination with a vacuum gas oil stream 1144; any portion that is not passed to the VGOHP zone 1160/1170 can be routed to the coking zone 1300, bypassing the VGOHP zone 1160/1170. In additional embodiments in which vacuum distillation is not used, the third middle distillate fraction 1124 is routed to the VGOHP zone 1160/1170. In further embodiments, all, a substantial portion, a significant portion or a major portion of the vacuum gas oil 1144 can be routed to the coking zone 1300, bypassing the VGOHP zone 1160/1170. In further optional embodiments, a gas oil cracking zone (not shown) can be integrated and operated under conditions effective for conversion of one or more of the third middle distillate fraction 1124, and/or one or more unconverted oil streams from within the refinery. The gas oil cracking zone can include a separate steam cracking zone and/or a separate petrochemical production FCC operation.

In certain embodiments, the first middle distillate fraction 1116 can be routed either through the kerosene sweetening zone 1120 or routed to the DHT zone 1150. During periods in which maximizing the fuel fraction 1118 or the light range middle distillate fraction 1118' is desired, the first middle distillate fraction 1116 can be routed to the kerosene sweetening zone 1120. During periods in which the naphtha range feedstock to the petrochemicals production complex 1215 is to be maximized, the first middle distillate fraction 1116 can be routed to the DHT zone 1150, so as to produce additional hydrotreated naphtha 1152. In additional alternative embodiments, the first middle distillate fraction 1116 can be divided (on a volume or weight basis, for example, with a diverter) so that a portion is passed to the DHT zone 1150 and the remaining portion is passed to the kerosene sweetening zone 1120.

In other embodiments, kerosene sweetening can be eliminated. Accordingly, a relatively light middle distillate fraction including separate or combined streams corresponding to streams 1116 and 1122 are routed to the DHT zone 1150, and a heavier middle distillate fraction 1124 is treated as described herein. In one example a relatively light middle distillate fraction 1116 and 1122 contains kerosene range hydrocarbons and medium AGO range hydrocarbons, and a heavier atmospheric distillation zone middle distillate fraction 1124 contains heavy AGO range hydrocarbons. In another example the relatively light middle distillate fraction 1116 and 1122 contains kerosene range hydrocarbons and a portion of medium AGO range hydrocarbons and the heavier middle distillate fraction 1124 contains a portion of medium AGO range hydrocarbons and heavy AGO range hydrocarbons.

In certain embodiments all or a portion of the atmospheric residue fraction 1126 is further separated in the vacuum distillation zone 1140, generally into the vacuum gas oil fraction 1144 and the vacuum residue fraction 1142. The vacuum gas oil 1144 from the vacuum distillation zone 1140 is routed to the VGOHP zone 1160/1170. In certain embodiments, a minor portion of the atmospheric residue fraction 1126 can bypass the vacuum distillation zone 1140 and is routed to the VRC zone 1180 with the vacuum residue fraction 1142. In certain embodiments, 0-100% of the atmospheric residue fraction 1126 can bypass the vacuum distillation zone 1140 and is routed to the VRC zone 1180. For instance, in certain embodiments vacuum distillation is bypassed or not used, and atmospheric residue 1126 is the feed to the VRC zone 1180.

In certain embodiments all or a portion of the atmospheric residue fraction 1126 bypasses vacuum distillation zone and is routed to the coking zone 1300. In certain embodiments, 0-100% of the atmospheric residue fraction 1126 can bypass the vacuum distillation zone 1140 and is routed to the coking zone 1300. For instance, in certain embodiments vacuum distillation is bypassed or not used, and atmospheric residue 1126 is the feed to the coking zone 1300.

In certain embodiments, all, a substantial portion, a significant portion or a major portion of the vacuum gas oil 1144, and optionally all, a substantial portion, a significant portion or a major portion or the heavier atmospheric distillation zone middle distillate fraction 1124, are routed to the VGOHP zone 1160/1170, operating as a VGOHCK zone 1160 or as a VGOHT zone 1170. In addition, the gas oil fractions from the vacuum distillation zone 1140 can include one or more VGO fractions, such as a light vacuum gas oil stream and a heavy vacuum gas oil stream. In certain optional embodiments, in addition to vacuum gas oil 1144 and optionally atmospheric gas oil 1124, the VGOHP zone 1160/1170 can also process atmospheric and/or vacuum gas oil range products 1188 from the VRC zone 1180; deasphalted oil 1412 from the optional solvent deasphalting zone 1410; and/or heavy liquid hydrocarbon products 1228 (pyrolysis oil and/or cycle oil, or heavy pyrolysis oil and/or heavy cycle oil) and/or intermediate liquid hydrocarbon products 1227 (light pyrolysis oil and/or light cycle oil) from the petrochemicals production complex 1215; and/or heavy coker gas oil 1336 from the coking zone 1300.

In certain embodiments vacuum gas oil hydroprocessing is with a VGOHCK zone 1160 that can operate under mild, moderate or severe hydrocracking conditions, and generally produces a hydrocracked naphtha fraction 1162, a cracked middle distillate range fraction 1164, and an unconverted oil fraction 1166. All or a portion of the middle distillate fraction 1164 can be passed to the DHG zone 1200. In certain embodiments all or a portion of the cracked middle distillate fraction 1164 can be recovered as diesel fuel, or as a diesel fuel blending component. All or a portion of the unconverted oil 1166, wherein a portion can comprise a diverted flow of a full range of the hydrotreated gas oil or a light portion of the unconverted oil, can be passed to the DHT zone 1150, the DHG zone 1200, an optional gas oil cracking zone or used for other purposes. In certain embodiments all, a substantial portion, a significant portion or a major portion of the unconverted oil 1166 is routed to the coking zone 1300.

In other embodiments, vacuum gas oil hydroprocessing is with a VGOHT zone 1170 that can operate under mild, moderate or severe hydrotreating conditions, and generally produces a hydrotreated gas oil fraction 1176, naphtha and some middle distillates. Naphtha range products can be separated from products within the VGOHT zone 1170 as a hydrotreated naphtha stream 1172. Middle distillates can be recovered from the VGOHT zone 1170 as a cracked distillates stream 1174 containing hydrotreated distillates (and in certain embodiments naphtha range products). All or a portion of the stream 1174 can be passed to the DHG zone 1200 or routed to DHT zone 1150 for further hydroprocessing and/or separation into DHT zone 1150 products. All or a portion of the hydrotreated gas oil 1176, wherein a portion can comprise a diverted flow of a full range of the hydrotreated gas oil or a light portion of the hydrotreated gas oil, can be passed to the DHT zone 1150, the DHG zone 1200, an optional gas oil cracking zone or used for other purposes. In certain embodiments all, a substantial portion, a significant portion or a major portion of the hydrotreated gas oil 1176 is routed to the coking zone 1300.

In certain embodiments, an additional hydrotreating reaction zone can be included between the VGOHP zone 1160/1170 and the DHG zone 1200, depending on the sulfur and nitrogen content of the cracked middle distillate fraction 1164 or the cracked distillates stream 1174, and whether this stream is processed in the DHG zone 1200 alone or in combination with other middle distillate streams that have lower sulfur and nitrogen content. In these embodiments, the catalyst used and operating conditions for hydrotreating can be similar to those of the DHT zone 1150. In certain embodiments an in-line hydrotreater can be used after the VGOHP zone 1160/1170 to utilize high hydrogen pressure present in the high pressure separator effluents as is known in the art, for example whereby the temperature and pressure variations between the VGOHP zone 1160/1170 and the hydrotreater are minimized as the effluents are passed in-line to one or more hydrotreating catalyst beds.

In certain optional embodiments, all, a substantial portion, a significant portion or a major portion of the wild naphtha fraction from the VGOHP zone 1160/1170, stream 1162/1172, is routed to the petrochemicals production complex 1215, alone, or in combination with other naphtha fractions from within the integrated process. Any portion that is not passed to the petrochemicals production complex 1215 can be upgraded if necessary, for example to increase the octane number, and routed to the gasoline pool. In certain embodiments, the wild naphtha stream 1162/1172 from the VGOHP zone 1160/1170 is routed through the crude complex 1105, alone, or in combination with other naphtha fractions from within the integrated process. In embodiments in which the wild naphtha fraction from the VGOHP zone 1160/1170 is routed through the crude complex 1105, all or a portion of the LPG produced in the VGOHP zone 1160/1170 can be passed with the wild naphtha. In embodiments in which the naphtha stream 1162/1172 is not sent to the petrochemicals production complex 1215, it can be upgraded, for example to increase the octane number, and routed to the gasoline pool.

In certain embodiments, all, a substantial portion, a significant portion or a major portion of the heavy product from the VGOHP 1160/1170, the unconverted oil fraction 1166 or the hydrotreated gas oil fraction 1176, is routed to the coking zone 1300. In certain embodiments, all or any portion of the heavy product 1166/1176 from the VGOHP 1160/1170 can be routed to the VRC zone 1180. Alternatively, any remainder of the heavy product 1166/1176 can be recycled and further processed (cracked to extinction in VGO hydrocracking) and/or bled from the system.

In accordance with the process herein, the severity of the conditions of the VGOHP zone 1160/1170 can be used to moderate the relative yield of olefin and aromatic chemicals from the overall complex and improve the economic threshold of cracking heavy feeds. This application of a VGOHP zone as a chemical yield control mechanism, is uncommon in the industry, where fuel products are typically the product objectives.

In certain embodiments, the vacuum residue fraction 1142 from the vacuum distillation zone 1140 can be recovered as a fuel oil pool component. In certain embodiments, a VRC zone 1180 can be used to treat the vacuum residue fraction 1142; in such embodiments, all, a substantial portion, a significant portion, a major portion or a minor portion of the vacuum residue fraction 1142 is passed to the VRC zone 1180, and remaining vacuum residue (if any) can be recovered as a fuel oil pool component.

In certain embodiments the VRC zone 1180 is integrated and can be a VRHCK unit operating under hydrocracking conditions, in certain embodiments severe hydrocracking conditions, effective to produce off-gas and light ends (not shown), a residue hydroprocessed VGO fraction 1188, pitch 1190, and one or more distillate streams (including one or more of a wild naphtha stream 1184 and a cracked middle distillate range fraction 1186. In certain optional embodiments, in addition to vacuum residue 1142, the VRC zone 1180 can also process: deasphalted oil 1412 from the optional solvent deasphalting zone 1410; heavy coker gas oil 1336 from the coking zone 1300; and/or heavy liquid hydrocarbon products 1228 (pyrolysis oil and/or cycle oil, or heavy pyrolysis oil and/or heavy cycle oil) and/or intermediate liquid hydrocarbon products 1227 (light pyrolysis oil and/or light cycle oil) from the petrochemicals production complex 1215. All or a portion of the middle distillate range fraction 1186 can be passed to the DHG zone 1200. In certain embodiments, an additional hydrotreating reaction zone can be included between the VRC zone 1180 and the DHG zone 1200, depending on the sulfur and nitrogen content of the middle distillate fraction 1186, and whether this stream is processed in the DHG zone 1200 alone or in combination with other middle distillate streams that have lower sulfur and nitrogen content. In these embodiments, the catalyst used and conditions within this additional hydrotreater can be similar to those of the DHT zone 1150. In certain embodiments an in-line hydrotreater can be used after the VRC zone 1180 as is known in the art, whereby the temperature and pressure variations between the VGOHP zone and the hydrotreater are minimized as the effluents are passed in-line to one or more hydrotreating catalyst beds. In certain embodiments all or a portion of the middle distillate range fraction 1186 can be recovered as diesel fuel or as a diesel fuel blending component In certain embodiments a middle distillates stream 1182 (instead of the cracked middle distillate range fraction 1186 or in conjunction therewith) is routed to the VGOHP zone 1160/1170 and/or the DHT zone 1150.

In embodiments in which a separate wild naphtha stream 1184 is recovered, all, a substantial portion, a significant portion or a major portion of the wild naphtha stream 1184 can optionally be routed to the petrochemicals production complex 1215, alone, or in combination with other naphtha fractions from within the integrated process; any portion that is not passed to the petrochemicals production complex 1215 can be upgraded if necessary, for example to increase the octane number, and routed to the gasoline pool. In certain embodiments, the wild naphtha stream 1184 is routed through the crude complex 1105, alone, or in combination with other naphtha fractions from within the integrated process. In embodiments in which the wild naphtha stream 1184 is routed through the crude complex 1105, all or a portion of the LPG produced in the VGOHP zone 1160/1170 can be passed with the wild naphtha. In certain optional embodiments, all, a substantial portion, a significant portion or a major portion of the wild naphtha 1184 is routed to the petrochemicals production complex 1215 (directly or through the crude complex 1105). In embodiments in which naphtha is not sent to the petrochemicals production complex 1215, it can be upgraded if necessary, for example to increase the octane number, and added to the gasoline pool.

In certain embodiments, all, a substantial portion, a significant portion or a major portion of the residue hydroprocessed VGO fraction 1188 is routed to the coking zone 1300. In certain optional embodiments, all or portion of the residue hydroprocessed VGO fraction 1188 is routed to the VGOHP zone 1160/1170. For instance, all, a substantial portion, a significant portion or a major portion of the residue hydroprocessed VGO fraction 1188 from the VRC zone 1180 is routed to the VGOHP zone 1160/1170. The remainder (if any) of the residue hydroprocessed VGO fraction 1188 can be processed in other units and/or bled from the system.

The coking zone 1300 is operable to receive and thermally crack its feedstream, which can be one or more of: all or a portion heavy liquid hydrocarbon products 1228 (pyrolysis oil, heavy pyrolysis oil, cycle oil or heavy cycle oil) from the petrochemicals production complex 1215; all or a portion of the atmospheric residue stream 1126; all or a portion of the vacuum residue stream 1142; all or a portion of the unconverted oil stream 1166 and/or the hydrotreated gas oil stream 1176; all or a portion of the gas oil stream 1124; all or a portion of the residue hydroprocessed VGO fraction 1188 in embodiments in which residue hydrocracking is integrated; and//or all or a portion of deasphalted oil 1412 in embodiments in which the solvent deasphalting zone 1410 is integrated. The coking zone 1300 can be operated to produce at least light gases 1330, coker naphtha 1332, light coker gas oil 1334, heavy coker gas oil 1336, and coke 1338. Off-gases from the coking zone 1300 can be integrated with the fuel gas system. In certain embodiments (not shown), certain gases, after treatment in an unsaturated gas plant, can be routed to the separation units within the petrochemicals production complex 1215, and/or LPGs can be routed to the steam cracking reaction/separation zone that is part of the petrochemicals production complex 1215, a separate steam cracking reaction/separation zone, or used for other purposes. All, a substantial portion, a significant portion or a major portion of the gases containing light olefins (a C2-stream and a C3+ stream) are routed through the unsaturated gas plant. The remainder, if any, can be routed to the petrochemicals production complex 1215 and/or the olefin recovery train 1230.

In certain embodiments, all, a substantial portion, a significant portion or a major portion of the light coker gas oil 1334 is used as feed to the DHG zone 1200, alone or in combination with other feeds as described herein. In certain embodiments, an additional hydrotreating reaction zone can be included between the coking zone 1300 and the DHG zone 1200, depending on the sulfur and nitrogen content of the light coker gas oil 1334, and whether this stream is processed in the DHG zone 1200 alone or in combination with other middle distillate streams that have lower sulfur and nitrogen content. In these embodiments, the catalyst(s), temperature and space velocity for hydrotreating can be similar to those of the DHT zone 1150 described herein, with a hydrogen partial pressure in the range of from about 50-120, 50-100, 50-90, 60-120, 60-100, 60-90, 70-120, 70-100 or 70-90.

In certain embodiments, a portion of the light coker gas oil 1334 can be routed to the DHT zone 1150, increasing the yield of the middle distillate fraction 1154 and wild naphtha 1152 that can be passed to the petrochemicals production complex 1215. In certain embodiments, a portion of the light coker gas oil 1334 is routed to the VGOHP zone 1160/1170. In certain embodiments, a portion of the light coker gas oil 1334 is routed to the VRC zone 1180.

In certain embodiments, all or a portion of the coker naphtha 1332 can be processed as to produce additional feed for the petrochemicals production complex 1215. In certain embodiments all or a portion of the coker naphtha 1332, optionally after hydrogenation (under conditions and using catalysts described herein with respect to the naphtha hydrogenation zone 1204), can be processed in a py-gas hydrotreatment and recovery center 1270/1272 to increase the quantity of raffinate as additional feed to the petrochemicals production complex 1215. In certain embodiments all or a portion of the coker naphtha 1332 can be subjected to hydrogenation (under conditions and using catalysts described herein with respect to the naphtha hydrogenation zone 1204), and hydrogenated effluent used as additional feed to the petrochemicals production complex 1215. Any portion of the coker naphtha 1332 that is not used as additional feed to the petrochemicals production complex 1215 can be hydrotreated and recovered for fuel production. For instance, in modalities in which the objective is maximum petrochemical production, all, a substantial portion, a significant portion or a major portion of the coker naphtha 1332 is used as additional feed to the petrochemicals production complex 1215; the remainder, if any, can be upgraded if necessary, for example to increase the octane number, and added to the gasoline pool.

Other products from the coking zone 1300 heavy coker gas oil 1336 and coke 1338. All or a portion of the heavy coker gas oil 1336 can be routed to VGOHP zone 1160/1170, the VRC zone 1180, the gasification zone 1440, routed to a fuel oil pool, and/or used as feedstock for production of carbon black.

Embodiments are disclosed herein for separation of products from a quenched cracked gas stream containing mixed C1-C4 paraffins and olefins, and for treatment and handling of the light liquid hydrocarbon products stream 1226 and the heavy liquid hydrocarbon products stream 1228 (and in certain embodiments the intermediate liquid hydrocarbon products stream 1227). However, it should be appreciated that other operations can be used to separate petrochemical products from the reaction/separation zone 1220 effluents. In certain embodiments as disclosed in FIG. 1, the reaction/separation zone 1220 operates in conjunction with the olefin recovery train 1230 to convert the feeds into a mixed gas products stream 1224 that is separated into products ethylene 1236, a mixed C3s stream 1238 used to produce propylene 1248, and mixed C4s stream 1240 used to produce C4 olefin products (for instance 1,3-butadiene product stream 1252 and 1-butene product stream 1268), off-gases 1234, and optionally a separate hydrogen stream 1232 (although it is to be appreciated that hydrogen may be included in the off-gases, depending on the type of reaction/separation zone 1220), typically from the olefin recovery train 1230. In certain embodiments, an unsaturated gas plant can also be integrated. The light liquid hydrocarbon products stream 1226 and the heavy liquid hydrocarbon products stream 1228 are also recovered, and in certain embodiments the intermediate liquid hydrocarbon products stream 1227 is separately recovered. The off-gases 1234 can be passed to an integrated fuel gas system. In certain modes of operation, hydrogen 1232 that is recovered from reaction effluents can be recycled to hydrogen users within the complex limits. While particular arrangements of unit operations are shown to recover the main light olefin products and recycle streams, a person having ordinary skill in the art will appreciate that other arrangements can be used.

In a typical arrangement, the mixed C4s stream 1240 containing a mixture of C4s from the olefin recovery train 1230, known as crude C4s, is routed to a butadiene extraction unit 1250 to recover a high purity 1,3-butadiene product 1252. A first raffinate 1254 ("C4-Raff-1") containing butanes and butenes is passed to a methyl tertiary butyl ether ("MTBE") unit, MTBE zone 1256, where it is mixed with high purity fresh methanol 1258 from outside battery limits to produce methyl tertiary butyl ether 1262. A selective hydrogenation unit (not shown) can be include as part of the MTBE zone 1256 (for instance upstream or downstream).

A second raffinate 1260 ("C4 Raff-2") from the MTBE zone 1256 is routed to a C4 separation zone 1266 for separation into a 1-butene product stream 1268 and an alkane stream 1264 (a third raffinate "C4 Raff-3") containing residual C4s. The alkane stream 1264 can be sent to the steam cracking reaction/separation zone that is part of the petrochemicals production complex 1215, a separate steam cracking reaction/separation zone, or used for other purposes. Separation of the ethylene 1236, propylene 1248 and the mixed C4s stream 1240 occurs in a suitable arrangement of known separation steps for separating steam cracking and/or FCC reaction effluents, including compression stage(s), depropanizer, debutanizer, demethanizer and deethanizer.

In further embodiments of processes and systems for conversion of crude oil to petrochemicals and fuel products, metathesis conversion of C4 and C5 olefins is included to produce additional propylene. The process operates as described herein upstream of the petrochemicals production complex 1215 and with respect to the coking operations. Downstream of the petrochemicals production complex 1215, the butadiene extraction train can operate in a manner similar to that above, with a mixed C4 raffinate stream ("C4 Raff 3") from the C4 distillation unit routed to a metathesis unit for metathesis conversion to additional propylene.

In further embodiments of processes and systems for conversion of crude oil to petrochemicals and fuel products, an additional step is provided to convert a mixture of butenes into mixed butanols suitable as a gasoline blending oxygenate and for octane enhancement. Suitable processes to convert a mixture of butenes into mixed butanols are described in one or more of commonly owned US Patent Publication US20150148572A1, and commonly owned U.S. Pat. Nos. 10,155,707B2, 9,732,018B2, 9,447,346B2, 9,393,540B2, 9,187,388B2, 8,999,013B2, 8,629,080B2 and 8,558,036B2, all of which are incorporated by reference herein in their entireties. In certain embodiments, a particularly effective conversion process known as "SuperButol™" technology is integrated, which is a one-step process that converts a mixture of butenes into mixed butanol liquids. Downstream of the reaction/separation zone 1220, the butadiene extraction train can operate in a manner similar to that above, with a mixed C4 raffinate stream ("C4 Raff 3") from the C4 distillation unit that is routed to a mixed butanols production zone to convert the mixture of butenes into mixed butanol liquids. Alkanes can be sent to the steam cracking reaction/separation zone that is part of the petrochemicals production complex 1215, a separate steam cracking reaction/separation zone, or used for other purposes.

The crude complex 1105 is schematically depicted. Components of the crude complex not shown but which are well-known can include feed/product and pump-around heat exchangers, crude charge heaters, crude tower(s), product strippers, cooling systems, hot and cold overhead drum systems including re-contactors and off-gas compressors, and units for water washing of overhead condensing systems. The atmospheric distillation zone 1110 can include well-known design features. In certain embodiments, all or portions of the naphtha and middle distillate (for instance kerosene and atmospheric gas oil products) from the atmospheric distillation column 1110 are steam-stripped in side strippers, and atmospheric residue can be steam-stripped in a reduced-size can section inside the bottom of the atmospheric distillation column. The vacuum distillation zone 1140, can include well-known design features, such as operation at reduced pressure levels (mm Hg absolute pressure), for instance, in the range of about 10-40, which can be maintained by steam ejectors or mechanical vacuum pumps. A desalting unit (not shown) is typically included upstream of the distillation zone 1110. A substantial amount of the water required for desalting can be obtained from a sour water stripper within the integrated process and system. The total feed to the atmospheric distillation zone 1110 is primarily the feed 1102, although it shall be appreciated that wild naphtha, LPGs and off-gas streams from the DHT zone 1150 and in certain embodiments from the VGOHP zone 1160/1170 and/or the VRC zone 1180 can be routed to the atmospheric distillation zone 1110 where they are fractionated together with the initial feed 1102.

The saturated gas plant 1130 generally comprises a series of operations including fractionation and in certain systems absorption and fractionation, as is well known, with an objective to process light ends to separate fuel gas range components from LPG range components. The light ends that are processed in one or more saturated gas plants within embodiments of the integrated system and process herein are derived from the crude distillation, such as light ends and LPG. In addition, other light products can optionally be routed to the saturated gas plant 1130, shown in dashed lines as stream 1134, such as light gases from refinery units within the integrated system, and in certain embodiments light gases from outside of the battery limits. For instance, stream 1134 can contain off-gases and light ends from the DHT zone 1150, the VGOHP zone 1160/1170, and/or the VRC zone 1180. The products from the saturated gas plant 1130 include: an off-gas stream 1132 containing C1-C2 alkanes that is passed to the fuel gas system; and a light ends stream 1136, containing C2+, that is passed to the olefin recovery train 1230.

In certain embodiments, a suitable saturated gas plant 1130 includes amine and caustic washing of liquid feed, and amine treatment of vapor feed, before subsequent steps. The crude tower overhead vapor is compressed and recontacted with naphtha before entering an amine scrubber for H2S removal and is then routed to the olefin recovery train 1230. Recontact naphtha is debutanized to remove LPGs which are amine washed and routed to the olefin recovery train 1230. Off-gases from the absorber/debutanizer is compressed and sent to a refinery fuel gas system. In certain embodiments, for instance including a steam cracking mode of operation, debutanized naphtha can be routed separately from the heavy naphtha the steam cracking reaction zone. As is known, light naphtha absorbs C4+ hydrocarbons from the vapor as it travels upward through an absorber/debutanizer. A debutanizer bottoms stream can be sent to the petrochemicals production complex 1215 as an additional source of feed.

As shown, the first middle distillate fraction 1116 is processed in a kerosene sweetening zone 1120 to remove unwanted sulfur compounds, as is well-known. Treated kerosene is recovered as one or both of the kerosene fuel product 1118, and a light range middle distillate fraction 1118' as a source of additional feedstock for the DHG zone 1200. In certain embodiments, all or a portion of the first middle distillate fraction 1116 is not used for fuel production, but rather is used as a feed for distillate hydrotreating so as to produce additional feed for the reaction/separation zone 1220. For instance, a kerosene sweetening zone 1120 operates as is well-established commercially, and appropriate operating conditions are well known to produce products 1118 and/or and 1118', and disulfide oils as by-products. In certain kerosene sweetening processes, impregnated carbon is utilized as catalyst to promote conversion to disulfide oil.

For example, one arrangement of a kerosene sweetening zone includes caustic wash of the kerosene feed for residual H2S removal. A reactor vessel containing an effective quantity of activated carbon catalyst utilizes air in conjunction with the caustic solution to affect the oxidation of mercaptans to disulfides. Caustic is separated from treated kerosene in the bottom section of the reactor. After water washing, kerosene product passes upwards through one of two parallel salt filters to remove free water and some soluble water. The kerosene product passes downward through one of two parallel clay filters for removal of solids, moisture, emulsions and surfactants, so as to ensure that the kerosene product meets haze, color stability and water separation specifications, for instance, compliant with Jet A specifications.

The second middle distillate fraction 1122 is processed in the DHT zone 1150 in the presence of an effective amount of hydrogen obtained from recycle within the DHT zone 1150 and make-up hydrogen (not shown). In certain modes of operation including steam cracking, hydrogen that is recovered from petrochemical production complex 1215, such as a hydrogen stream 1232 from the olefin recovery train 1230, or hydrogen from another integrated steam cracking unit (not shown), can provide all or a portion of the make-up hydrogen for the DHT zone 1150. The DHT zone 1150 operates under conditions effective for removal of a significant amount of the sulfur and other known contaminants, for instance, to meet necessary sulfur specifications for a diesel fuel blending component that can be compliant with Euro V diesel standards. This stream, the hydrotreated middle distillate fraction 1154, can be used as a feed for hydrogenation and/or as a diesel blending component. In addition, the hydrotreated naphtha fraction 1152 is recovered from the DHT zone 1150, and can further processed or utilized as described above. Effluent off-gases are recovered from the DHT zone 1150 and are passed to the olefin recovery train, the saturated gas plant as part of the other gases stream 1134, and/or directly to a fuel gas system. LPG can be recovered from the DHT zone 1150 and routed to the steam cracking reaction/separation zone that is part of the petrochemicals production complex 1215, a separate steam cracking reaction/separation zone, the olefin recovery train, the saturated gas plant and/or used for other purposes.

The DHT zone 1150 can optionally process other fractions from within the complex. In embodiments in which a kerosene sweetening zone 1120 is used, all or a portion of the disulfide oil can be additional feed to the DHT zone 1150 (not shown). Further, all or a portion of the first middle distillate fraction 1116 can be additional feed to the DHT zone 1150. Additionally, all or a portion of the distillates 1164/1174 from the VGOHP zone 1160/1170, and/or all or a portion of the distillates 1182 from the VRC zone 1180, can be routed to the DHT zone 1150. Any portion of distillates not routed to the DHT zone 1150 can be passed to the crude complex 1105 or routed to the DHG zone 1200. In certain embodiments, the DHT zone 1150 also processes at least a portion of the light coker gas oil 1334 from the coking zone 1300. Any portion of the light coker gas oil 1334 not routed to the DHT zone 1150 or the DHG zone 1200 can optionally be passed to a fuel oil pool and/or processed in the integrated gas oil hydroprocessing zone. For example, in certain embodiments 0-30, 0-25, 0-20, 5-30, 5-25, 5-20, 10-30, 10-25, or 10-20 wt % of the total coker gas oil 1334 from the coking zone 1300 can be routed to the DHT zone 1150.

The DHT zone 1150 can contain one or more fixed-bed, ebullated-bed, slurry-bed, moving bed, continuous stirred tank (CSTR) or tubular reactors, in series and/or parallel arrangement, and is operated under conditions effective for hydrotreating of the diesel feed 1122, the particular type of reactor, the feed characteristics, the desired product slate and the catalyst selection. In certain embodiments, the DHT zone 1150 contains a layered bed reactor with three catalyst beds and having inter-bed quench gas, and employs a layered catalyst system with the layer of hydrodewaxing catalyst positioned between beds of hydrotreating catalyst. Additional equipment, including exchangers, furnaces, feed pumps, quench pumps, and compressors to feed the reactor(s) and maintain proper operating conditions, are well known and are considered part of the DHT zone 1150. In addition, equipment including pumps, compressors, high temperature separation vessels, low temperature separation vessels and the like to separate reaction products and provide hydrogen recycle within the DHT zone 1150, are well known and are considered part of the DHT zone 1150.

In certain embodiments, the DHT zone 1150 operating conditions include:

a reactor temperature (° C.) in the range of from about 270-430, 300-430, 320-430, 340-430, 270-420, 300-420, 320-420, 340-420, 270-400, 300-400, 320-400, 340-400, 270-380, 300-380, 320-380, 340-360, 270-360, 300-360, 320-360 or 340-360;

a hydrogen partial pressure (barg) in the range of from about 30-80, 30-70, 30-60, 35-80, 35-70, 35-60, 40-80, 40-70 or 40-60;

a hydrogen gas feed rate (standard liters per liter of hydrocarbon feed, SLt/Lt) of up to about 1000, 700 or 500, in certain embodiments from about 200-1000, 200-700, 200-500, 250-1000, 250-700, 250-500, 300-1000, 300-700 or 300-500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.5-10.0, 0.5-5.0, 0.5-2.0, 0.8-10.0, 0.8-6.0, 0.8-5.0, 0.8-4.0, 0.8-2.0, 1.0-10.0, 1.0-6.0, 1.0-5.0, 1.0-4.0 or 1.0-2.0.

An effective quantity of hydrotreating catalyst is provided in the DHT zone 1150, including those possessing hydrotreating functionality, including hydrodesulfurization and/or hydrodenitrification, to remove sulfur, nitrogen and other contaminants. Suitable hydrotreating catalysts (sometimes referred to in the industry as "pretreat catalyst") contain one or more active metal component(s) of metals or metal compounds (oxides or sulfides) selected from the Periodic Table of the Elements IUPAC Groups 6, 7, 8, 9 and 10. One or more active metal component(s) are typically deposited or otherwise incorporated on a support, which can include alumina, silica alumina, silica, titania, titania-silica, titania-silicates or combinations including at least one of the foregoing support materials. In certain embodiments, the active metal or metal compound is one or more of Co, Ni, W and Mo, including combinations such as one or more active metals or metal compounds selected from Co/Mo, Ni/Mo, Ni/W, and Co/Ni/Mo. Combinations of one or more of Co/Mo, Ni/Mo, Ni/W and Co/Ni/Mo can also be used, for instance, in plural beds or separate reactors in series. The combinations can be composed of different particles containing a single active metal species, or particles containing multiple active species. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units. The active metal(s) or metal compound(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10.

In certain embodiments, an effective quantity of a grading material is added to remove contaminants such as iron sulfide or other contaminant particulate matters. In certain embodiments, an effective quantity of hydrodewaxing catalyst is also added to improve cloud point and pour point, generally by conversion of normal paraffins into isoparaffins. In such embodiments, effective hydrodewaxing catalysts include those typically used for isomerizing and cracking paraffinic hydrocarbon feeds to improve cold flow properties, such as catalysts comprising Ni, W, Mo or molecular sieves or combinations thereof. Catalyst comprising Ni/W and/or NiMo on zeolite with medium or large pore sizes are suitable, along with catalyst comprising aluminosilicate molecular sieves such as zeolites with medium or large pore sizes. Effective commercial zeolites include for instance ZSM-5, ZSM-11, ZSM-12, ZSM-22, ZSM-23, ZSM 35, and zeolites of type beta and Y. Hydrodewaxing catalyst is typically supported on an oxide support such as Al2O3, SiO2, ZrO2, zeolites, zeolite-alumina, alumina-silica, alumina-silica-zeolite, activated carbon, and mixtures thereof. Effective liquid hourly space velocity values ($h^{-1}$), on a fresh feed basis relative to the hydrodewaxing catalyst, are in the range of from about 0.1-12.0, 0.1-8.0, 0.1-4.0, 0.5-12.0, 0.5-8.0, 0.5-4.0, 1.0-12.0, 1.0-8.0, 1.0-4.0 or 1.6-2.4.

The vacuum gas oil stream 1144 (or separate light and heavy VGO streams, not shown) can be processed in the VGOHP zone 1160/1170, in the presence of an effective amount of hydrogen obtained from recycle within the VGOHP zone and make-up hydrogen. In certain modes of operation including steam cracking, hydrogen that is recovered from petrochemical production complex 1215, such as a hydrogen stream 1232 from the olefin recovery train 1230, or hydrogen from another integrated steam cracking unit (not shown), can provide all or a portion of the make-up hydrogen for the VGOHP zone 1160/1170. In certain embodiments, all or a portion of the heavy middle distillate fraction, such as a portion of the third middle distillate fraction 1124, for example, atmospheric gas oil from the atmospheric distillation zone 1110, can also be treated in the VGOHP zone 1160/1170. The heavy middle distillate fraction can include a full range atmospheric gas oil, or a fraction thereof such as heavy atmospheric gas oil, and any portion not treated in the VGOHP zone 1160/1170 is separately treated. Further, a portion of the third middle distillate fraction 1124 can be routed to the VGOHP zone 1160/1170, while the remainder is routed to coking zone 1300, without passing through the VGOHP zone 1160/1170. In certain embodiments, all, a substantial portion, a significant portion or a major portion of the vacuum gas oil stream 1144 is routed to the VGOHP zone 1160/1170, and any remainder of the vacuum gas oil can be separately treated. In combination, or alternatively with the straight run vacuum gas oil stream 1144, the feed to the VGOHP zone 1160/1170 can include a wide range of initial feedstocks obtained from various sources, such as one or more of treated vacuum gas oil, demetallized oil from solvent demetallizing operations, deasphalted oil from solvent deasphalting operations, coker gas oils from coker operations, cycle oils from fluid catalytic cracking operations that are integrated in the system 1100 or separate therefrom including heavy cycle oil, and visbroken oils from visbreaking operations. In certain embodiments in which residue treatment is integrated, all, a substantial portion, a significant portion or a major portion of the residue hydroprocessed VGO fraction 1188, can be routed to the VGOHP zone 1160/1170, and any remainder can be separately treated. The feedstream to the VGOHP zone 1160/1170 generally has a boiling point range within about 350-800, 350-700, 350-600 or 350-565° C.

In a hydrocracking mode of operation for treatment of the vacuum gas oil, the feed is converted in the VGOHCK zone 1160 by reaction under suitable hydrocracking conditions. Hydrocracking processes are used commercially in a large number of petroleum refineries. They are used to process a variety of feeds boiling above the atmospheric gas oil range (for example, in the range of about 370 to 520° C.) in conventional hydrocracking units and boiling above the vacuum gas oil range (for example, above about 520° C.) in residue hydrocracking units. In general, hydrocracking processes split the molecules of the feed into smaller, that is, lighter, molecules having higher average volatility and economic value. Additionally, hydrocracking processes typically improve the quality of the hydrocarbon feedstock by increasing the hydrogen-to-carbon ratio and by removing organosulfur and organonitrogen compounds. The significant economic benefit derived from hydrocracking processes has resulted in substantial development of process improvements and more active catalysts.

Three major hydrocracking process schemes include single-stage once through hydrocracking, series-flow hydrocracking with or without recycle, and two-stage recycle hydrocracking. Single-stage once through hydrocracking is the simplest of the hydrocracker configuration and typically occurs at operating conditions that are more severe than hydrotreating processes, and less severe than conventional high pressure hydrocracking processes. It uses one or more reactors for both treating steps and cracking reaction, so the catalyst must be capable of both hydrotreating and hydrocracking. This configuration is cost effective, but typically results in relatively low product yields (for example, a maximum conversion rate of about 50 wt %). Single stage hydrocracking is often designed to maximize mid-distillate yield over a single or dual catalyst systems. Dual catalyst systems can be used in a stacked-bed configuration or in two different reactors. The effluents are passed to a fractionator column to separate the $H_2S$, $NH_3$, light gases (C1-C4), naphtha and diesel products, boiling in the temperature range including and below atmospheric gas oil range fractions (for instance in the temperature range of 36-370° C.). The hydrocarbons boiling above the atmospheric gas oil range (for instance 370° C.) are typically unconverted oils.

The VGOHCK zone 1160 operates under mild, moderate or severe hydrocracking conditions, and generally produces off-gas and light ends (not shown), the wild naphtha stream 1162, the cracked middle distillate fraction 1164, and the unconverted oil fraction 1166. Effluent off-gases are recovered from the VGOHCK zone 1160 and are passed to the olefin recovery train, the saturated gas plant as part of the other gases stream 1134, and/or directly to a fuel gas system. LPG can be recovered from the VGOHCK zone 1160 and routed to the steam cracking reaction/separation zone that is part of the petrochemicals production complex 1215, a separate steam cracking reaction/separation zone, the olefin recovery train, the saturated gas plant and/or used for other purposes. The naphtha fraction 1162 can optionally be further processed or utilized as described above. In certain embodiments all, a substantial portion, a significant portion, or a major portion of the unconverted oil fraction 1166 is routed to the coking zone 1300. The cracked middle distillate fraction 1164 can be passed to the DHG zone 1200 and/or recovered as fuel.

The VGOHCK zone 1160 can operate under mild, moderate or severe conditions, depending on factors including the feedstock and the desired degree of conversion. Such conditions are effective for removal of a significant amount of the sulfur and other known contaminants, and for conversion of the feed(s) into a major proportion of hydrocracked products and minor proportions of off-gases, light ends and unconverted product. A suitable VGOHCK zone 1160 can include, but is not limited to, systems based on technology commercially available from Saudi Arabian Oil Company, SA/JGC Catalysts and Chemicals, JP; Honeywell UOP, US; Chevron Lummus Global LLC (CLG), US; Axens, FR; Shell Catalysts & Technologies, US, or Haldor Topsoe, DK.

The VGOHCK zone 1160 can contain one or more fixed-bed, ebullated-bed, slurry-bed, moving bed, continuous stirred tank (CSTR) or tubular reactors, in series and/or parallel arrangement, and is operated under conditions effective for vacuum gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the VGOHCK zone 1160. In addition, equipment, including pumps, compressors, high temperature separation vessels, low temperature separation vessels and the like to separate reaction products and provide hydrogen recycle within the VGOHCK zone 1160, are well known and are considered part of the VGOHCK zone 1160.

Series-flow hydrocracking with or without recycle is one of the most commonly used configurations. It uses one reactor (containing both treating and cracking catalysts) or two or more reactors for both treating and cracking reaction steps. In a series-flow configuration the entire hydrocracked product stream from the first reaction zone, including light gases (typically C1-C4, $H_2S$, $NH_3$) and all remaining hydrocarbons, are sent to the second reaction zone. Unconverted bottoms from the fractionator column are recycled back into the first reactor for further cracking. This configuration converts heavy crude oil fractions such as vacuum gas oil, into light products and has the potential to maximize the yield of naphtha, kerosene and/or middle distillate range hydrocarbons, depending on the recycle cut point used in the distillation section.

Two-stage recycle hydrocracking uses two reactors and unconverted bottoms from the fractionation column are passed to the second reactor for further cracking. Since the first reactor accomplishes both hydrotreating and hydrocracking, the feed to the second reactor is virtually free of ammonia and hydrogen sulfide. This permits the use of high performance zeolite catalysts which are susceptible to poisoning by sulfur or nitrogen compounds.

Effective hydrocracking catalyst generally contain one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Mo, W, Co or Ni. The active metal component(s) is/are typically deposited or otherwise incorporated on a support, such as amorphous alumina, amorphous silica alumina, zeolites, or combinations thereof. In certain embodiments, alone or in combination with the above metals, Pt group metals such as Pt and/or Pd, may be present as a hydrogenation component, generally in an amount of about 0.1-2 wt % based on the weight of the catalyst. For example, effective hydrocracking catalysts include one or more of an active metal component selected from the group consisting of Mo, W, Co or Ni (oxides or sulfides), incorporated on acidic alumina, silica alumina, zeolite or a combination thereof. In embodiments in which zeolites are used, they are conventionally formed with one or more binder components such as alumina, silica, silica-alumina and mixtures thereof. In certain embodiments in which an objective is hydrodenitrification, the supports are acidic alumina, silica alumina or a combination thereof. In embodiments in which the objective is hydrodenitrification increases hydrocarbon conversion, the supports are silica alumina, or a combination thereof. Silica alumina is useful for difficult feedstocks for stability and enhanced cracking. In certain embodiments, the catalyst particles have a pore volume in the range of about (cc/gm) 0.15-1.70, 0.15-1.50, 0.30-1.50 or 0.30-1.70; a specific surface area in the range of about (m$^2$/g) 100-900, 100-500, 100-450, 180-900, 180-500, 180-450, 200-900, 200-500 or 200-450; and an average pore diameter of at least about 45, 50, 100, 200, 500 or 1000 angstrom units. The active metal component(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10. In certain embodiments, the active metal component(s) include one or more of Mo, W, Co or Ni, and effective concentrations are based on all the mass of active metal components on an oxide basis. In certain embodiments, one or more beds are provided in series in a single reactor or in a series of reactors. For instance, a first catalyst bed containing active metals on silica alumina support is provided for hydrodenitrogenation, hydrodesulfurization and hydrocracking functionalities, followed by a catalyst bed containing active metals on zeolite support for hydrocracking functionality. Furthermore, depending on the level of conversion desired, the acidity of the catalyst is adjusted based on the zeolite levels. For example, when the desired product slate favors naphtha production, a strong acidity level is used by including about 30-80 wt % zeolite in the catalyst mixture. When the product slate favors middle distillates, a mild acidity level is used by including 0-30 wt % zeolite in the catalyst mixture, where acidic silica-alumina type catalysts can be used.

Exemplary products from the VGOHCK zone 1160 include 27-99, 27-90, 27-82, 27-80, 27-75, 27-52, 27-48, 30-99, 30-90, 30-82, 30-80, 30-75, 30-52, 30-48, 48-99, 48-90, 48-82, 48-80, 48-75, 48-52, 78-99, 78-90, 78-85, 80-90 or 80-99 wt % of effluent (relative to the feed to the VGOHCK zone 1160) boiling at or below the atmospheric residue end boiling point, such as 370° C., including LPG, kerosene, naphtha, and atmospheric gas oil range components. The remaining bottoms fraction is the unconverted oil fraction, all or a portion of which can be effectively integrated as feed to the coking zone 1300 as described herein.

In certain embodiments, a VGOHCK zone 1160 operates as a once-through single reactor hydrocracking system, and typically includes a reaction zone and a fractionating zone, which can serve as a mild conversion or partial conversion hydrocracker. A reaction zone in a once-through single reactor system generally includes one or more inlets in fluid communication with the feedstock 1144 and optionally all or any portion of stream 1124, and a source of hydrogen gas. One or more outlets of reaction zone that discharge an effluent stream are in fluid communication with one or more inlets of the fractionating zone (typically including one or more high pressure and/or low pressure separation stages therebetween for recovery of recycle hydrogen). The fractionating zone typically includes one or more outlets for discharging gases, typically H2, H2S, NH3, and light hydrocarbons (C1-C4); one or more outlets for recovering products, such as naphtha 1162 and middle distillate range products 1164, and one or more outlets for discharging bottoms 1166 including hydrocarbons boiling above the atmospheric gas oil range (for instance 370° C.) which is then routed to the coking zone 1300. In certain embodiments, the temperature cut point for the bottoms stream (and correspondingly the end point for the products) is a range corresponding to the upper temperature limit of the middle distillate range products 1164.

In operation of a VGOHCK zone 1160 configured as a once-through single reactor hydrocracking system, the feedstock and hydrogen are charged to the reaction zone. The hydrogen is provided in an effective quantity to support the requisite degree of hydrocracking, feed type, and other factors, and can be any combination including recycle hydrogen from optional gas separation subsystems associated with reaction zone, hydrogen derived from the fractionator gas stream, and/or make-up hydrogen, if necessary. In certain modes of operation including steam cracking, hydrogen that is recovered from petrochemical production complex 1215, such as a hydrogen stream 1232 from the olefin recovery train 1230, or hydrogen from another integrated steam cracking unit (not shown), can provide all or a portion of the make-up hydrogen for the VGOHCK zone 1160. In certain embodiments, a reaction zone can contain multiple catalyst beds and can receive one or more quench hydrogen streams between the beds.

The reaction effluent stream contains converted, partially converted and unconverted hydrocarbons. Reaction effluents are passed to the fractionating zone (optionally after one or more high pressure and low pressure separation stages to recover recycle hydrogen), generally to recover gas and liquid products and by-products, and separate a bottoms fraction.

The gas stream, typically containing H2, H2S, NH3, and light hydrocarbons (C1-C4), is discharged and recovered, and can be further processed, for instance, in the olefin recovery train, the saturated gas plant as part of the other gases stream 1134, and/or integrated directly in a fuel gas system. LPG can be recovered and routed to the steam cracking reaction/separation zone that is part of the petrochemicals production complex 1215, a separate steam cracking reaction/separation zone, the olefin recovery train, the saturated gas plant and/or used for other purposes. One or more cracked product streams are discharged via appropriate outlets of the fractionator as the naphtha 1162 and middle distillate range products 1164. In certain embodiments, a fractionating zone can operate as a flash vessel to separate heavy components at a suitable cut point, for example, a range corresponding to the upper temperature range of the middle distillate range products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

The reactor arrangement in the VGOHCK zone 1160 operating as a once-through single reactor hydrocracking system can contain one or more fixed-bed, ebullated-bed, slurry-bed, moving bed, continuous stirred tank (CSTR), or tubular reactors, which can be in parallel arrangement, and is operated under conditions effective for vacuum gas oil hydrocracking, the particular type of reactor, the feed characteristics, the desired product slate and the catalyst selection. The once-through single reactor hydrocracking system can operate in a mild hydrocracking mode of operation or a partial conversion mode of operation. Additional equipment, including exchangers, furnaces, feed pumps, quench pumps, and compressors to feed the reactor(s) and maintain proper operating conditions, are well known and are considered part of the once-through single reactor hydrocracking system. In addition, equipment, including pumps, compressors, high temperature separation vessels, low temperature separation vessels and the like to separate reaction products and provide hydrogen recycle within the once-through single reactor hydrocracking system, are well known and are considered part of the once-through single reactor hydrocracking system.

In certain embodiments, operating conditions for the reactor(s) in a VGOHCK zone 1160 using a once-through (single stage without recycle) configuration and operating in a mild hydrocracking mode include:

a reactor temperature (° C.) in the range of from about 300-450, 300-440, 300-420, 330-450, 330-440 or 330-420;

a hydrogen partial pressure (barg) in the range of from about 15-100, 15-70, 15-60, 15-50, 20-100, 20-70, 20-60, 20-50, 30-100, 30-70, 30-60 or 30-50;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from the VGOHCK zone 1160 operating as a once-through single reactor system, and operating in a mild hydrocracking mode of operation, include 27-52, 27-48, 30-50 or 30-52 wt % of effluent (relative to the feed to the VGOHCK zone 1160) boiling at or below the atmospheric residue end boiling point, such as 370° C., including LPG and distillate product components (naphtha 1162 and middle distillate range products 1164). The remaining bottoms fraction is the unconverted oil fraction, all or a portion of which can be effectively integrated as feed to the coking zone 1300 as described herein.

In certain embodiments, operating conditions for the reactor(s) in a VGOHCK zone 1160 using a once-through (single stage without recycle) configuration and operating in a partial conversion mode include:

a reactor temperature (° C.) in the range of from about 300-500, 300-475, 300-450, 330-500, 330-475 or 330-450;

a hydrogen partial pressure (barg) in the range of from about 50-120, 50-100, 50-90, 60-120, 60-100, 60-90, 70-120, 70-100 or 70-90;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from the VGOHCK zone 1160 operating as a once-through single reactor system, and operating as a partial conversion hydrocracker, include 48-82, 50-80, 48-75, or 50-75 wt % of effluent (relative to the feed to the VGOHCK zone 1160) boiling at or below the atmospheric residue end boiling point, such as 370° C., including LPG and distillate product components (naphtha 1162 and middle distillate range products 1164). The remaining bottoms fraction is the unconverted oil fraction, all or a portion of which can be effectively integrated as feed to the coking zone 1300 as described herein.

In certain embodiments, a VGOHCK zone 1160 operates as a series-flow hydrocracking system with recycle to the first reactor zone, the second reactor zone, or both the first and second reactor zones. In general, a series flow hydrocracking zone includes a first reaction zone, a second reaction zone and a fractionating zone. The first reaction zone generally includes one or more inlets in fluid communication with the feedstock 1144 and optionally all or any portion of stream 1124, a source of hydrogen gas, in certain embodiments a recycle stream comprising all or a portion of the fractionating zone bottoms stream (and optionally a portion of the fractionating zone products). One or more outlets of the first reaction zone that discharge an effluent stream is in fluid communication with one or more inlets of the second reaction zone. In certain embodiments, the effluents are passed to the second reaction zone without separation of any excess hydrogen and light gases. In optional embodiments, one or more high pressure and low pressure separation stages are provided between the first and second reaction zones for recovery of recycle hydrogen. The second reaction zone generally includes one or more inlets in fluid communication with one or more outlets of the first reaction zone, optionally a source of additional hydrogen gas, and in certain embodiments a recycle stream comprising all or a portion of the fractionating zone bottoms stream, and optionally a portion of the fractionating zone products. One or more outlets of the second reaction zone that discharge an effluent stream is in fluid communication with one or more inlets of the fractionating zone (optionally having one or more high pressure and low pressure separation stages in between the second reaction zone and the fractionating zone for recovery of recycle hydrogen). The fractionating zone includes one or more outlets for discharging gases, typically H2, H2S, NH3, and light hydrocarbons (C1-C4); one or more outlets for recovering distillate products, such as naphtha 1162 and cracked middle distillate products 1164; and one or more outlets for discharging bottoms 1166 including hydrocarbons boiling above the atmospheric gas oil range (for instance about 370° C.), all or a portion of which can be effectively integrated as feed to the coking zone 1300 as described herein. In certain embodiments a bleed stream can be discharged in processes that do not operate with 100% recycle. In certain embodiments, the temperature cut point for the bottoms stream (and correspondingly the end point for the products) is a range corresponding to the upper temperature limit of the cracked middle distillate products 1164.

In operation of a VGOHCK zone 1160 configured as a series flow hydrocracking system with recycle, the feedstock and hydrogen are charged to the first reaction zone. The hydrogen is provided in an effective quantity to support the requisite degree of hydrocracking, feed type, and other factors, and can be any combination including recycle hydrogen from optional gas separation subsystems associated with one or both of the reaction zones, derived from the fractionator gas stream, and/or make-up hydrogen. In certain modes of operation including steam cracking, hydrogen that is recovered from petrochemical production complex 1215, such as a hydrogen stream 1232 from the olefin recovery train 1230, or hydrogen from another integrated steam cracking unit (not shown), can provide all or a portion of the make-up hydrogen for the VGOHCK zone 1160. In certain embodiments, one or both of the reaction zones can contain multiple catalyst beds and can receive one or more quench hydrogen streams between the beds.

The first reaction zone operates under effective conditions for production of a reaction effluent stream which is passed to the second reaction zone (optionally after one or more high pressure and low pressure separation stages to recover recycle hydrogen), optionally along with an additional hydrogen stream. The second reaction zone operates under conditions effective for production of the second reaction effluent stream, which contains converted, partially converted and unconverted hydrocarbons. The second reaction effluent stream is passed to the fractionating zone, generally to recover gas and liquid products and by-products, and separate a bottoms fraction. The gas stream, typically containing H2, H2S, NH3, and light hydrocarbons (C1-C4), is discharged and recovered, and can be further processed, for instance, in the olefin recovery train, the saturated gas plant as part of the other gases stream 1134, and/or integrated directly in a fuel gas system. LPG can be recovered and routed to the steam cracking reaction/separation zone that is part of the petrochemicals production complex 1215, a separate steam cracking reaction/separation zone, the olefin recovery train, the saturated gas plant and/or used for other purposes. One or more cracked product streams are discharged via appropriate outlets of the fractionator as the naphtha 1162 and cracked middle distillate products 1164. In certain embodiments, a portion of the middle distillate range products 1164 can be integrated with the recycle streams to the reactors, for instance, to maximize naphtha feed to the petrochemicals production complex 1215. In certain embodiments, a fractionating zone can operate as a flash vessel to separate heavy components at a suitable cut point, for example, a range corresponding to the upper temperature range of the middle distillate range products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

In certain embodiments at least a portion of the fractionator bottoms stream from the reaction effluent is recycled to the first or second reaction zones. In certain embodiments, a portion of the fractionator bottoms from the reaction effluent is removed as bleed stream, which can be about 0-10 vol %, 1-10 vol %, 1-5 vol % or 1-3 vol % of the fractionator bottoms. For instance, a recycle stream to the first reaction zone can comprise 0 to 100 vol %, 0 to about 80 vol %, or 0 to about 50 vol % of the fractionator bottoms stream, and a recycle stream to the second reaction zone can comprise 0 to 100 vol %, 0 to about 80 vol %, or 0 to about 50 vol % of the fractionator bottoms stream. In certain embodiments, in which the recycle is at or approaches 100 vol %, recycle of the unconverted oil increases the yield of products suitable as feed to the DHG zone 1200 or the petrochemicals production complex 1215.

The reactor arrangement in the VGOHCK zone 1160 configured as a series flow hydrocracking system with recycle can contain one or more fixed-bed, ebullated-bed, slurry-bed, moving bed, continuous stirred tank (CSTR), or tubular reactors, which can be in parallel arrangement, and are operated under conditions effective for vacuum gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the series flow hydrocracking system. In addition, equipment, including pumps, compressors, high temperature separation vessels, low temperature separation vessels and the like to separate reaction products and provide hydrogen recycle within the series flow hydrocracking system, are well known and are considered part of the series flow hydrocracking system.

In certain embodiments, operating conditions for the first reactor(s) in a VGOHCK zone 1160 using a once-through series configuration (with recycle) operating in a partial conversion mode of operation include:

a reactor temperature (° C.) in the range of from about 300-450, 300-440, 300-420, 330-450, 330-440 or 330-420;

a hydrogen partial pressure (barg) in the range of from about 50-150, 50-120, 50-100, 50-90, 60-150, 60-120, 60-100, 60-90, 60-80, 70-150, 70-120 or 70-100;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

In certain embodiments, operating conditions for the second reactor(s) in a VGOHCK zone 1160 using a once-through series configuration (with recycle) operating in a partial conversion mode of operation include:

a reactor temperature (° C.) in the range of from about 300-450, 300-440, 300-420, 330-450, 330-440 or 330-420;

a hydrogen partial pressure (barg) in the range of from about 50-150, 50-120, 50-100, 50-90, 60-150, 60-120, 60-100, 60-90, 60-80, 70-150, 70-120 or 70-100;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from a VGOHCK zone 1160 using a series-flow configuration (with recycle) and operating as a partial conversion hydrocracker include 48-99, 48-82, 48-75, 50-99, 50-80 or 50-75 wt % of effluent (relative to the feed to the hydrocracking zone 1160) boiling at or below the atmospheric residue end boiling point, such as 370° C., including LPG and distillate product components (naphtha 1162 and middle distillate range products 1164). The remaining bottoms fraction is the unconverted oil fraction, all or a portion of which can be effectively integrated as feed to the coking zone 1300 as described herein.

In certain embodiments, a VGOHCK zone 1160 operates as a two-stage hydrocracking system with recycle, and typically includes a first reaction zone, a second reaction zone and a fractionating zone. The first reaction zone generally includes one or more inlets in fluid communication with the feedstock 1144 and optionally all or any portion of stream 1124, and a source of hydrogen gas. One or more outlets of the first reaction zone that discharge an effluent stream is in fluid communication with one or more inlets of the fractionating zone (optionally having one or more high pressure and low pressure separation stages therebetween for recovery of recycle hydrogen. The fractionating zone includes one or more outlets for discharging gases, typically H2S, NH3, and light hydrocarbons (C1-C4); one or more outlets for recovering distillate product, such as naphtha 1162 and the cracked middle distillate fraction 1164; and one or more outlets for discharging bottoms 1166 including hydrocarbons boiling above the atmospheric gas oil range (for instance about 370° C.), all or a portion of which can be effectively integrated as feed to the coking zone 1300 as described herein. In certain embodiments, a bleed stream can be discharged in processes that do not operate with 100% recycle. In certain embodiments, the temperature cut point for the bottoms stream (and correspondingly the end point for the products) is a range corresponding to the upper temperature limit of the cracked middle distillate products 1164. The fractionating zone bottoms outlet is in fluid communication with the one or more inlets of the second reaction zone for receiving a recycle stream, which is all or a portion of the bottoms stream. In certain optional embodiments, a portion of the bottoms stream is in fluid communication with one or more inlets of the first reaction zone. The second reaction zone generally includes one or more inlets in fluid communication with the fractionating zone bottoms outlet portion and a source of hydrogen gas. One or more outlets of the second reaction zone that discharge effluent stream are in fluid communication with one or more inlets of the fractionating zone (optionally having one or more high pressure and low pressure separation stages therebetween for recovery of recycle hydrogen).

In operation of a VGOHCK zone 1160 configured as a two-stage hydrocracking system with recycle, the feedstock and hydrogen are charged to the first reaction zone. The hydrogen is provided in an effective quantity to support the requisite degree of hydrocracking, feed type, and other factors, and can be any combination including recycle hydrogen from optional gas separation subsystems associated with the reaction zones, derived from the fractionator gas stream, and/or make-up hydrogen, if necessary. In certain modes of operation including steam cracking, hydrogen that is recovered from petrochemical production complex 1215, such as a hydrogen stream 1232 from the olefin recovery train 1230, or hydrogen from another integrated steam cracking unit (not shown), can provide all or a portion of the make-up hydrogen for the VGOHCK zone 1160. In certain embodiments, a reaction zone can contain multiple catalyst beds and can receive one or more quench hydrogen streams between the beds.

The first reaction zone operates under effective conditions for production of a reaction effluent stream which is passed to the fractionating zone (optionally after one or more high pressure and low pressure separation stages to recover recycle hydrogen) generally to recover gas and liquid products and by-products, and separate a bottoms fraction. The gas stream, typically containing H2, H2S, NH3, and light hydrocarbons (C1-C4), is discharged and recovered, and can be further processed, for instance, in the olefin recovery train, the saturated gas plant as part of the other gases stream 1134, and/or integrated directly in a fuel gas system. LPG can be recovered and routed to the steam cracking reaction/separation zone that is part of the petrochemicals production complex 1215, a separate steam cracking reaction/separation zone, the olefin recovery train, the saturated gas plant and/or used for other purposes. One or more cracked product streams are discharged via appropriate outlets of the fractionator as the naphtha 1162 and cracked middle distillate range products 1164. In certain embodiments, a portion of the middle distillate products 1164 can be integrated with the feed to the second stage reactor, for instance, to maximize naphtha feed to the petrochemicals production complex 1215. In certain embodiments, a fractionating zone can operate as a flash vessel to separate heavy components at a suitable cut point, for example, a range corresponding to the upper temperature range of the middle distillate products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

In certain embodiments at least a portion of the fractionator bottoms stream from the reaction effluent is recycled to the first or second reaction zones. In certain embodiments, a portion of the fractionator bottoms from the reaction effluent is removed as bleed stream, which can be about 0-10 vol %, 1-10 vol %, 1-5 vol % or 1-3 vol % of the fractionator bottoms. In certain embodiments, all or a portion of the bottoms stream is recycled to the second reaction zone, the first reaction zone, or both the first and second reaction zones. For instance, a recycle stream to the first reaction zone can comprise 0 to 100 vol %, 0 to about 80 vol %, or 0 to about 50 vol % of the fractionator bottoms stream, and a recycle stream to the second reaction zone can comprise 0 to 100 vol %, 0 to about 80 vol %, or 0 to about 50 vol % of the fractionator bottoms stream. In certain embodiments, in which the recycle is at or approaches 100 vol %, recycle of the unconverted oil increases the yield of products suitable as feed to the DHG zone 1200 or the petrochemicals production complex 1215.

The second reaction zone operates under conditions effective for production of the reaction effluent stream, which contains converted, partially converted and unconverted hydrocarbons. The second stage reaction effluent is passed to the fractionating zone, optionally through one or more gas separators to recover recycle hydrogen and remove certain light gases.

The reactor arrangement in the VGOHCK zone 1160 operating as a two-stage hydrocracking system with recycle can contain one or more fixed-bed, ebullated-bed, slurry-bed, moving bed, continuous stirred tank (CSTR), or tubular reactors, which can be in parallel arrangement, and are operated under conditions effective for vacuum gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the two-stage hydrocracking system. In addition, equipment, including pumps, compressors, high temperature separation vessels, low temperature separation vessels and the like to separate reaction products and provide hydrogen recycle within the two-stage hydrocracking system, are well known and are considered part of the two-stage hydrocracking system.

In certain embodiments, operating conditions for the first stage reactor(s) in a VGOHCK zone 1160 using a two-stage (with recycle) configuration operating in a full conversion mode of operation include:

a reactor temperature (° C.) in the range of from about 300-450, 300-440, 300-420, 330-450, 330-440 or 330-420;

a hydrogen partial pressure (barg) in the range of from about 80-170, 80-150, 80-140, 80-130, 90-170, 90-150, 90-140, 90-130, 100-170, 100-150, 100-140, 100-130, 110-170, 110-150, 110-140, or 110-130;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

In certain embodiments, operating conditions for the second stage reactor(s) in a VGOHCK zone 1160 using a two-stage (with recycle) configuration operating in a full conversion mode of operation include:

a reactor temperature (° C.) in the range of from about 300-450, 300-440, 300-420, 330-450, 330-440 or 330-420;

a hydrogen partial pressure (barg) in the range of from about 80-170, 80-150, 80-140, 80-130, 90-170, 90-150, 90-140, 90-130, 100-170, 100-150, 100-140, 100-130, 110-170, 110-150, 110-140, or 110-130;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from a VGOHCK zone 1160 using a two-stage hydrocracker (with recycle) configuration in a full conversion mode include 78-100, 78-99, 78-90, 78-85, 80-100, 80-99 or 80-90 wt % of effluent (relative to the feed to the VGOHCK zone 1160 boiling at or below the atmospheric residue end boiling point, such as 370° C., including LPG, and distillate product components (naphtha 1162 and middle distillate range products 1164). The remaining bottoms fraction is the unconverted oil fraction, all or a portion of which can be effectively integrated as feed to the coking zone 1300 as described herein.

In a hydrotreating mode of operation for treatment of the vacuum gas oil, denoted as VGOHT zone 1170, the feed is converted by reaction under suitable hydrotreating conditions, and generally produces off-gas and light ends (not shown), a wild naphtha stream 1172, a middle distillates stream 1174, and hydrotreated gas oil stream 1176. Effluent off-gases are recovered from the VGOHT zone 1170 and are passed to the olefin recovery train, the saturated gas plant as part of the other gases stream 1134, and/or directly to a fuel gas system. LPG can be recovered from the VGOHT zone 1170 and routed to the steam cracking reaction/separation zone that is part of the petrochemicals production complex 1215, a separate steam cracking reaction/separation zone, the olefin recovery train, the saturated gas plant and/or used for other purposes. The naphtha fraction 1172 can be routed to the petrochemicals production complex 1215. In certain embodiments, the hydrotreated naphtha fraction 1172 can optionally be further processed or utilized as described above. All or a portion of the hydrotreated gas oil 1176 can be effectively integrated as feed to the coking zone 1300 as described herein. In certain embodiments, in addition to or in conjunction with the hydrotreated naphtha fraction 1172, all or a portion of the hydrotreated distillates and naphtha from the VGOHT zone 1170 are passed to the DHT zone 1150. In additional embodiments, all or a portion of the stream 1174 can be passed to the DHG zone 1200 or routed to DHT zone 1150 for further hydroprocessing and/or separation into DHT zone 1150 products, or used as a diesel fuel blending component.

The VGOHT zone 1170 can operate under mild, moderate or severe conditions, depending on factors including the feedstock and the desired degree of conversion. Such conditions are effective for removal of a significant amount of the sulfur and other known contaminants, and for conversion of the feed(s) into a major proportion of hydrotreated gas oil 1176, all or a portion of which can be effectively integrated as feed to the coking zone 1300 as described herein, and minor proportions of off-gases, light ends, and hydrotreated naphtha 1172. In certain embodiments hydrotreated naphtha 1172 is routed to the petrochemicals production complex 1215 (optionally via the crude complex 1105). The hydrotreated gas oil fraction 1176 generally contains the portion of the VGOHT zone 1170 effluent that is at or above the AGO, H-AGO or VGO range.

The VGOHT zone 1170 can contain one or more fixed-bed, ebullated-bed, slurry-bed, moving bed, continuous stirred tank (CSTR) or tubular reactors, in series and/or parallel arrangement, and is operated under conditions effective for gas oil hydrotreating, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the VGOHT zone 1170. In addition, equipment, including pumps, compressors, high temperature separation vessels, low temperature separation vessels and the like to separate reaction products and provide hydrogen recycle within the VGOHT zone 1170, are well known and are considered part of the VGOHT zone 1170.

An effective quantity of catalyst is provided in the VGOHT zone 1170, including those possessing hydrotreating functionality, for hydrodesulfurization and hydrodenitrification. Such catalysts generally contain an effective amount, such as about 5-40 wt % based on the weight of the catalyst, of one or more active metal component(s) of metals or metal compounds (oxides or sulfides) selected from the Periodic Table of the Elements IUPAC Groups 6, 7, 8, 9 and 10. In certain embodiments, the active metal component (s) is/are one or more of Co, Ni, W and Mo. The active metal component(s) is/are typically deposited or otherwise incorporated on a support, such as amorphous alumina, amorphous silica alumina, zeolites, or combinations thereof. In certain embodiments, the catalyst used in the VGOHT zone 1170 includes one or more beds selected from Co/Mo, Ni/Mo, Ni/W, and Co/Ni/Mo. Combinations of one or more beds of Co/Mo, Ni/Mo, Ni/W and Co/Ni/Mo can also be used. The combinations can be composed of different particles containing a single active metal species, or particles containing multiple active species. In certain embodiments, a combination of Co/Mo catalyst and Ni/Mo catalyst are effective for hydrodesulfurization and hydrodenitrification. One or more series of reactors can be provided, with different catalysts in the different reactors of each series. For instance, a first reactor includes Co/Mo catalyst and a second reactor includes Ni/Mo catalyst. In certain embodiments, zeolite materials, are also used as support materials, for example about 0-30 wt %, when additional distillate production is desired. In additional embodiments zeolite can be used in one reactor or bed, for example, following a first reactor or bed with alumina based catalysts for hydrotreating, whereby the second bed provides further hydrotreating and mild hydrocracking functionality.

In additional embodiments, an effective quantity of hydrodemetallization catalyst also can be added. Such catalysts generally contain an effective amount, such as about 5-40 wt % based on the weight of the catalyst, of one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Ni and Mo. The active metal component(s) is/are typically deposited or otherwise incorporated on a support such as gamma alumina.

In certain embodiments, the VGOHT zone 1170 operating conditions include:

a reactor temperature (° C.) in the range of from about 300-440, 300-400, 300-390, 310-440, 310-400, 310-390, 320-440, 320-400 or 320-390;

a hydrogen partial pressure (barg) in the range of from about 30-100, 30-80, 30-60, 40-100, 40-80, 40-60, 50-100, 50-80 or 50-60;

a hydrogen gas feed rate (standard liters per liter of hydrocarbon feed, SLt/Lt) of up to about 1000, 750 or 500, in certain embodiments from about 100-1000, 100-750, 100-500, 200-1000, 200-750, 200-500, 300-1000, 300-750 or 300-500; and a liquid hourly space velocity (h$^{-1}$), on a fresh feed basis relative to the hydrotreating catalysts, in the range of from about 0.5-10.0, 0.5-5.0, 0.5-4.0, 1.0-10.0, 1.0-5.0, 1.0-4.0, 2.0-10.0, 2.0-5.0 or 2.0-4.0.

Under the above conditions and catalyst selections, exemplary products from the VGOHT zone 1170 include 1-60, 5-60, 2-60, 1-30, 5-30, 2-30, 1-27, 2-27 or 5-27 wt % of effluent (relative to the feed to the VGOHT zone 1170) boiling at or below the atmospheric residue end boiling point, such as 370° C., including LPG, kerosene, naphtha, and atmospheric gas oil range components. The remaining bottoms fraction is the hydrotreated gas oil fraction.

In additional embodiments, the VGOHT zone 1170 can operate under conditions effective for feed conditioning to the DHG zone 1200, and to maximize targeted conversion to petrochemicals in the petrochemicals production complex 1215. Accordingly, in certain embodiments severity conditions are selected that achieve objectives differing from those used for conventional refinery operations. That is, while typical VGO hydrotreating operates with less emphasis on conservation of liquid product yield, in the present embodiment VGO hydrotreating operates to produce a higher yield of lighter products which are intentionally recovered to maximize chemicals yield. In embodiments to maximize conversion to petrochemicals, the VGOHT zone 1170 operating conditions include:

a reactor temperature (° C.) in the range of from about 320-440, 320-420, 320-410, 330-440, 330-420, 330-410, 330-400, 340-440, 340-420, 340-410 or 340-400;

a hydrogen partial pressure (barg) in the range of from about 40-100, 40-90, 40-80, 45-100, 45-90, 45-80, 50-100, 50-90 or 50-80;

a hydrogen gas feed rate (standard liters per liter of hydrocarbon feed, SLt/Lt) of up to about 1000, 900 or 800, in certain embodiments from about 300-1000, 300-900, 300-800, 400-1000, 400-900, 400-800, 500-1000, 500-900 or 500-800; and a liquid hourly space velocity (h$^{-1}$), on a fresh feed basis relative to the hydrotreating catalysts, in the range of from about 0.2-4.0, 0.2-3.0, 0.2-2.0, 0.5-4.0, 0.5-3.0, 0.5-2.0, 1.0-4.0, 1.0-3.0 or 1.0-2.0.

Under the above conditions and catalyst selections, exemplary products from the VGOHT zone 1170 operating under conditions effective for feed conditioning to the DHG zone 1200, and to maximize targeted conversion to petrochemicals in the petrochemicals production complex 1215 include 20-60, 20-40, or 20-30 wt % of effluent (relative to the feed to the VGOHT zone 1170) boiling at or below the atmospheric residue end boiling point, such as 370° C., including LPG, kerosene, naphtha, and atmospheric gas oil range components. The remaining bottoms fraction is the hydrotreated gas oil fraction.

In certain embodiments, the VGOHT zone 1170 contains one or more trains of reactors, with a first reactor having two catalyst beds with two quench streams including an inter-bed quench stream, and a second reactor (lag reactor) having one catalyst bed with a quench stream. In high capacity operations, two or more parallel trains of reactors are utilized. In such embodiments, the flow in the VGOHT zone 1170 is split after the feed pump into parallel trains, wherein each train contains feed/effluent heat exchangers, feed heater, a reactor and the hot separator. The trains recombine after the hot separators. Tops from the hot separators are combined and passed to a cold separator. Bottoms from the hot separators are passed to a hot flash drum. Bottoms from the cold separator and tops from the hot flash drum are passed to a low pressure flash drum to remove off-gases. Hot flash liquid bottoms and low pressure flash bottoms are passed to a stripper to recover hydrotreated gas oil and wild naphtha. Tops from the cold separator are subjected to absorption and amine scrubbing. Recycle hydrogen is recovered and passed (along with make-up hydrogen) to the reaction zone as treat gas and quench gas. In certain modes of operation including steam cracking, hydrogen that is recovered from petrochemical production complex 1215, such as a hydrogen stream 1232 from the olefin recovery train 1230, or hydrogen from another integrated steam cracking unit (not shown), can provide all or a portion of the make-up hydrogen for the VGOHT zone 1170.

In certain embodiments, as shown in the system 1100, a vacuum distillation zone is integrated to further separate the atmospheric residue fraction into vacuum gas oil and vacuum residue. In the embodiments in which the vacuum residue is recovered, all or a portion of that fraction can optionally be processed in a vacuum residue treatment zone. A vacuum residue treatment zone can include one or more of residue hydroprocessing, delayed coking, gasification, or solvent deasphalting. In additional embodiments, all or a portion of the atmospheric residue can be processed in an atmospheric residue treatment zone, which can include one or more of residue hydroprocessing, fluid catalytic cracking, delayed coking, gasification, or solvent deasphalting.

In certain embodiments in the system 1100, 0-100 wt % of the vacuum residue stream 1142 can be processed in a residue treatment center. In additional embodiments, 0-100 wt % of the heavy liquid hydrocarbon products stream 1228 (pyrolysis oil, heavy pyrolysis oil, cycle oil or heavy cycle oil) from the petrochemicals production complex 1215 and/or coker gas oil (heavy coker gas oil and/or or light coker gas oil) from the coking zone 1300 can be routed to the residue treatment center.

Embodiments of systems and processes incorporating certain vacuum residue hydroprocessing zones are disclosed in U.S. Pat. No. 10,487,276B2 entitled "Process and System for Conversion of Crude Oil to Petrochemicals and Fuel Products Integrating Vacuum Residue Hydroprocessing," and U.S. Pat. No. 10,487,275B2 entitled "Process and System for Conversion of Crude Oil to Petrochemicals and Fuel Products Integrating Vacuum Residue Conditioning and Base Oil Production," which are commonly owned and are incorporated by reference herein in their entireties. Embodiments of systems and processes incorporating solvent deasphalting are disclosed in U.S. Pat. No. 10,407, 630B2 entitled "Process and System for Conversion of Crude Oil to Petrochemicals and Fuel Products Integrating Solvent Deasphalting of Vacuum Residue," which is commonly owned and is incorporated by reference herein in its entirety. Embodiments of systems and processes incorporating thermal coking are disclosed in U.S. Pat. No. 10,472, 574B2 entitled "Process and System for Conversion of Crude Oil to Petrochemicals and Fuel Products Integrating Delayed Coking of Vacuum Residue," which is commonly owned and is incorporated by reference herein in its entirety.

In the system 1100, the vacuum residue treatment is shown with catalytic hydroprocessing. The vacuum residue stream 1142 is optionally processed in a VRC zone 1180 operating as a VRHCK unit in the presence of an effective amount of hydrogen obtained from recycle within the VRHCK unit and from make-up hydrogen. In certain modes of operation including steam cracking, hydrogen that is recovered from the petrochemical production complex 1215, such as a hydrogen stream 1232 from the olefin recovery train 1230, or hydrogen from another integrated steam cracking unit (not shown), can provide all or a portion of the make-up hydrogen for the VRC zone 1180.

A VRHCK unit of the VRC zone 1180 operates under severe hydrocracking conditions, and generally produces off-gas and light ends (not shown), pitch 1190, and one or more of a wild naphtha stream 1184, a diesel fraction 1186, a residue hydroprocessed VGO fraction 1188, and a middle distillates stream 1182 that is routed to the VGOHP zone 1160/170 and/or the DHT zone 1150. Effluent off-gases are recovered from the VRC zone 1180 and are passed to the olefin recovery train, the saturated gas plant as part of the other gases stream 1134, and/or directly to a fuel gas system. LPG can be recovered from the VRC zone 1180 and routed to the steam cracking reaction/separation zone that is part of the petrochemicals production complex 1215, a separate steam cracking reaction/separation zone, the olefin recovery train, the saturated gas plant and/or used for other purposes. In embodiments in which a naphtha fraction 1184 is recovered, it can be further processed or utilized as described above. All or a portion of the residue hydroprocessed VGO fraction 1188 all or a portion of which can be effectively integrated as feed to the coking zone 1300 as described herein. The cracked middle distillate fraction 1186 is can be used as feed to the DHG zone 1200, recovered as diesel fuel or as a diesel fuel blending component.

A VRHCK unit of the VRC zone 1180 can operate under severe conditions, depending on factors including the feedstock and the desired degree of conversion. Such conditions are effective for removal of a significant amount of the sulfur and other known contaminants, and for conversion of the vacuum residue 1142 feed into a major proportion of hydrocracked products and a residue hydroprocessed VGO fraction 1188, and a minor portion of off-gases, light ends and pitch 1190 that is passed to the fuel oil pool. The hydrocracked products are recovered as feed to the DHG zone (optionally after hydrotreating), recovered as diesel fuel or as feed to the DHG zone (optionally after hydrotreating), recovered as diesel fuel or as a diesel fuel blending component, and/or routed to one or more of the other hydroprocessing zones in the integrated process and system (the VGOHP zone 1160/1170 and/or the DHT zone 1150). All or a portion of the unconverted oil 1188 can be effectively integrated as feed to the coking zone 1300 as described herein.

A VRHCK unit of the VRC zone 1180 can include one or more ebullated-beds, slurry-beds, fixed-beds or moving beds, in series and/or parallel arrangement. Additional equipment, including exchangers, furnaces, feed pumps, quench pumps, and compressors to feed the reactor(s) and maintain proper operating conditions, are well known and are considered part of the VRC zone 1180. In addition, equipment including pumps, compressors, high temperature separation vessels, low temperature separation vessels and the like to separate reaction products and provide hydrogen recycle within the VRC zone 1180 are well known and are considered part of the VRC zone 1180.

Furthermore, the VRC zone 1180 can include a hydrotreating reaction zone and a hydrocracking reaction zone. For example, the vacuum residue 1142 from the vacuum distillation unit 1140 can be routed to a hydrotreating reaction zone for initial removal of heteroatom-containing compounds, such as those containing metals (in particular Ni and vanadium), sulfur and nitrogen. In certain embodiments, the Ni+V content is reduced by at least about 30, 45, 77, 95 or 100 wt %, the sulfur content is reduced by at least about 70, 80, 92 or 100 wt %, and the nitrogen content is reduced by at least about 70, 80, 92 or 100 wt %.

A VRHCK unit of the VRC zone 1180 generally includes a reaction zone and a fractionating zone. The reaction zone generally includes one or more inlets in fluid communication with a source of the initial feedstock 1142 and a source of hydrogen gas. One or more outlets of the reaction zone that discharge an effluent stream is in fluid communication with one or more inlets of the fractionating zone (typically including one or more high pressure and/or low pressure separation stages therebetween for recovery of recycle hydrogen, not shown, and typically including a vacuum distillation unit). The fractionating zone, which can include one or more flash and/or distillation vessels, generally includes one or more outlets for discharging gases, typically H2, H2S, NH3, and light hydrocarbons (C1-C4); one or more outlets for discharging a wild naphtha stream 1184 that is optionally routed to the petrochemicals production complex 1215, one or more outlets for discharging either or both of (a) a diesel fraction 1186 that is recovered as DHG feed, a diesel fuel blending component, or used as diesel fuel compliant with Euro V standards, and/or (b) a middle distillates stream 1182 that is routed to the VGOHP zone 1160/1170 and/or the DHT zone 1150; and one or more outlets for routing heavy oils 1188 typically including unconverted oils and other hydrocarbons boiling above the atmospheric gas oil range (for instance about 370° C.), a residue hydroprocessed VGO fraction 1188, all or a portion of which can be passed to the coking zone 1300 as described herein; and one or more outlets for discharging pitch 1190, sometimes referred to as unconverted vacuum residue.

In operation of the VRHCK unit of the VRC zone 1180, the feedstock stream 1142 and hydrogen are introduced into one or more reactors. The quantity of hydrogen is effective to support the requisite degree of hydrocracking, feed type, and other factors, and can be any combination including, recycle hydrogen from optional gas separation subsystems associated with the vacuum residue reaction zone, derived from vacuum residue fractionator gas stream, and/or make-up hydrogen, if necessary. In certain embodiments, a reaction zone can contain multiple catalyst beds and can receive one or more quench hydrogen streams between the beds (not shown). The reaction effluent stream contains converted, partially converted and unconverted hydrocarbons, and is passed to the fractionating zone (optionally after one or more high pressure and low pressure separation stages to recover recycle hydrogen), generally to recover gas and liquid products and by-products, including one or more of a wild naphtha stream 1184, a diesel fraction 1186, and a middle distillates stream 1182 (that is routed to the VGOHP zone 1160/170 and/or the DHT zone 1150). All or a portion of the residue hydroprocessed VGO fraction 1188 can be routed to the coking zone 1300 as described herein. Pitch 1190 is also recovered. The gas stream, typically containing H2, H2S, NH3, and light hydrocarbons (C1-C4), is discharged and recovered and can be further processed. Effluent off-gases are passed to the olefin recovery train, the saturated gas plant as part of the other gases stream 1134, and/or directly to a fuel gas system. LPG can be recovered and routed to the steam cracking reaction/separation zone that is part of the petrochemicals production complex 1215, a separate steam cracking reaction/separation zone, the olefin recovery train, the saturated gas plant and/or used for other purposes.

In certain embodiments, a VRC zone 1180, can include an initial vacuum residue hydrotreating zone, generally having a vacuum residue hydrotreating reaction zone, and the vacuum residue hydrocracking reaction zone and the fractionating zone as described above. The vacuum residue hydrotreating zone generally includes one or more inlets in fluid communication with a source of the initial feedstock 1142 and a source of hydrogen gas (including recycle and make-up hydrogen). In certain modes of operation including steam cracking, hydrogen that is recovered from petrochemical production complex 1215, such as a hydrogen stream 1232 from the olefin recovery train 1230, or hydrogen from another integrated steam cracking unit (not shown), can provide all or a portion of the make-up hydrogen for the vacuum residue hydrotreating zone. One or more outlets of the hydrotreating reaction zone that discharge hydrotreated effluent stream is in fluid communication with one or more inlets of the hydrocracking reaction zone. In certain embodiments, the hydrotreated effluents are passed to the second reaction zone without separation of any excess hydrogen and light gases. In optional embodiments, one or more high pressure and low pressure separation stages are provided between the hydrotreating and hydrocracking reaction zones for recovery of recycle hydrogen (not shown). The hydrocracking reaction zone and the fractionation zone generally function as described above.

The feedstock stream 1142 and a hydrogen stream are charged to the hydrotreating reaction zone. The hydrogen stream contains an effective quantity of hydrogen to support the requisite degree of hydrotreating, feed type, and other factors, and can be any combination including, recycle hydrogen from optional gas separation subsystems (not shown) associated with hydrotreating reaction zone and hydrocracking reaction zone, and/or derived from the vacuum residue fractionator gas stream, and make-up hydrogen if necessary. In certain embodiments, a reaction zone can contain multiple catalyst beds and can receive one or more quench hydrogen streams between the beds (not shown).

The hydrotreating reaction zone operates under effective conditions for production of hydrotreated effluent stream which is passed to the hydrocracking reaction zone (optionally after one or more high pressure and low pressure separation stages to recover recycle hydrogen), optionally along with a make-up hydrogen stream. The hydrotreating reaction zone for treatment of the vacuum residue 1142, prior to residue hydrocracking, can contain one or more fixed-bed, ebullated-bed, slurry-bed, moving bed, continuous stirred tank (CSTR) or tubular reactors, in series and/or parallel arrangement, and is operated under conditions effective for vacuum residue hydrocracking, the particular type of reactor, the feed characteristics, the desired product slate and the catalyst selection. In certain embodiments, the operating conditions for hydrotreatment of the vacuum residue 1142, prior to residue hydrocracking, include:

a reactor temperature (° C.) in the range of from about 370-450, 370-440, 370-430, 380-450, 380-440, 380-430, 390-450, 390-440 or 390-430;

a hydrogen partial pressure (barg) in the range of from about 80-250, 80-200, 80-150, 90-250, 90-200, 90-150, 100-250, 100-200 or 100-150;

a hydrogen gas feed rate (standard liters per liter of hydrocarbon feed, SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500; and a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0.

An effective quantity of catalyst is provided for hydrotreatment of the vacuum residue 1142, prior to residue hydrocracking, including those possessing hydrotreating functionality, for hydrodemetallization, hydrodesulfurization and hydrodenitrification. Such catalysts generally contain an effective amount, such as about 5-40 wt % based on the weight of the catalyst, of one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Co, Ni, W and Mo. The active metal component(s) is/are typically deposited or otherwise incorporated on a support, such as amorphous alumina, amorphous silica alumina, zeolites, or combinations thereof. In certain embodiments, the catalyst used for hydrotreatment of the vacuum residue 1142, prior to residue hydrocracking, includes one or more beds selected from Co/Mo, Ni/Mo, Ni/W, and Co/Ni/Mo. Combinations of one or more beds of Co/Mo, Ni/Mo, Ni/W and Co/Ni/Mo can also be used. The combinations can be composed of different particles containing a single active metal species, or particles containing multiple active species. In certain embodiments, a combination of Co/Mo catalyst and Ni/Mo catalyst are effective for hydrodemetallization, hydrodesulfurization and hydrodenitrification. One or more series of reactors can be provided, with different catalysts in the different reactors of each series.

For example, in one embodiment a vacuum residue hydrocracking reactor is an ebullated bed reactor. In the ebullated bed reactor liquid is recycled internally with a recycle downflow conduit. A reaction zone includes an ebullated-bed reactor and an associated ebullating pump. An ebullated-bed reactor includes an inlet for receiving a mixture of hydrogen gas and feedstock, and an outlet for discharging product effluent. The ebullating pump is in fluid communication with the ebullated-bed reactor and includes an inlet for receiving effluent recycled from the ebullated-bed reactor and an outlet for discharging the recycled effluent at an increased pressure. In the reaction zone, a mixture of hydrogen gas and feedstock is introduced into the ebullated-bed reactor for reaction that includes conversion of the feedstock into lower molecular weight hydrocarbons.

Liquid reaction effluent continuously flows down in the downflow conduit located inside ebullated-bed reactor, and is recycled back to the ebullated-bed reactor at elevated pressure using the ebullating pump. Product effluent is recovered via a reactor outlet. Alternatively, the recycle liquid can be obtained from a vapor separator located downstream of the reactor or obtained from an atmospheric stripper bottoms stream. The recycling of liquid serves to ebullate and stabilize the catalyst bed, and maintain temperature uniformity through the reactor.

In embodiments with an ebullated bed reactor for vacuum residue hydrocracking in the VRC zone 1180, the catalyst is in an ebullated, or suspended state with random movement throughout the reactor vessel. A recirculating pump expands the catalytic bed and maintains the catalyst in suspension. The fluidized nature of the catalyst also permits on-line catalyst replacement of a small portion of the bed to produce a high net bed activity that remains relatively constant over time. In an ebullated bed reactor, highly contaminated feeds can be treated because of the continuous replacement of catalyst.

In certain embodiments, a VRHCK unit of the VRC zone 1180 includes a hydrocracking ebullated bed reactor operating under the following conditions:

a reactor temperature (° C.) in the range of from about 370-450, 370-440, 370-430, 380-450, 380-440, 380-430, 390-450, 390-440 or 390-430;

a hydrogen partial pressure (barg) in the range of from about 80-250, 80-200, 80-150, 90-250, 90-200, 90-150, 100-250, 100-200 or 100-150;

a hydrogen gas feed rate (standard liters per liter of hydrocarbon feed, SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500;

a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0; and annualized relative catalyst consumption (RCC) rate in the range of about 1.0-3.0, 1.0-2.2, 1.0-2.0, 1.0-1.8, 1.0-1.4, 1.2-3.0, 1.2-2.2, 1.2-1.4, 1.4-3.0, 1.4-2.2, 1.4-1.8, 1.4-1.6, 1.6-1.8, 1.8-2.0, or 2.0-2.2.

Effective hydrocracking catalyst for an ebullated bed reactor in a VRHCK unit of the VRC zone 1180 include those possessing hydrotreating functionality. Such catalysts generally contain an effective amount, such as about 5-40 wt % based on the weight of the catalyst, of one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Co, Ni, and Mo. The active metal component(s) is/are typically deposited or otherwise incorporated on a support, such as amorphous alumina, amorphous silica alumina, zeolites, or combinations thereof. One or more series of reactors can be provided, with different catalysts in the different reactors of each series.

Under the above conditions and catalyst selections, exemplary products from an ebullated bed reactor in the VRHCK unit include LPG in the range of 3-6 wt %, middle distillates in the range of about 25-40 wt %, naphtha in the range of about 10-20 wt %, pitch in the range of about 10-20 wt %, and hydroprocessed gas oil in the range of about 20-30 wt %. All or a portion of the middle distillates from the VRHCK unit can be combined with the VGO and routed to the VGOHP zone 1160/1170, or routed to the DHT zone 1150.

In embodiments with a slurry bed reactor for vacuum residue hydrocracking in the VRC zone 1180, the catalyst particles have a very small average dimension that can be uniformly dispersed and maintained in the medium in order for efficient and immediate hydrogenation processes throughout the volume of the reactor. In general, in a slurry bed reactor, the catalyst is suspended in a liquid through which a gas is bubbled. The mechanism in a slurry bed reactor is a thermal cracking process and is based on free radical formation. The free radicals formed are stabilized with hydrogen in the presence of catalysts, thereby preventing the coke formation.

In certain embodiments, a VRHCK unit of the VRC zone 1180 includes a hydrocracking slurry bed reactor operating under the following conditions:

a reactor temperature (° C.) in the range of from about 370-450, 370-440, 370-430, 380-450, 380-440, 380-430, 390-450, 390-440 or 390-430;

a hydrogen partial pressure (barg) in the range of from about 80-250, 80-200, 80-150, 90-250, 90-200, 90-150, 100-250, 100-200 or 100-150;

a hydrogen gas feed rate (standard liters per liter of hydrocarbon feed, SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500;

a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0; and annualized relative catalyst consumption (RCC) rate in the range of about 1.0-3.0, 1.0-2.2, 1.0-2.0, 1.0-1.8, 1.0-1.4, 1.2-3.0, 1.2-2.2, 1.2-1.4, 1.4-3.0, 1.4-2.2, 1.4-1.8, 1.4-1.6, 1.6-1.8, 1.8-2.0, or 2.0-2.2.

Effective hydrocracking catalyst for a slurry bed reactor in a VRHCK unit of the VRC zone 1180 include those possessing hydrotreating and hydrogenation functionality. Such catalysts generally contain one or more active transition metal component of metals or metal compounds (oxides or sulfides) selected from the Periodic Table of the Elements IUPAC Groups 6, 7, 8, 9 and 10. In certain embodiments the active metal component(s) is/are unsupported. The catalyst is generally in the form of a sulfide of the metal that is formed during the reaction or in a pretreatment step. The metals that make up the dispersed catalysts can be selected from Mo, W, Ni, Co and/or Ru. Mo and W are especially preferred since their performance is superior to vanadium or iron, which in turn are preferred over Ni, Co or Ru. In certain embodiments the active metal component(s) is/are typically deposited or otherwise incorporated on a support, such as amorphous alumina, amorphous silica alumina, zeolites, or combinations thereof. The catalysts can be used at a low concentration, for example, a few hundred parts per million (ppm), in a once-through arrangement, but are not especially effective in upgrading of the heavier products under those conditions. To obtain better product quality, catalysts are used at higher concentration, and it is necessary to recycle the catalyst in order to make the process economically feasible. The catalysts can be recovered using methods such as settling, centrifugation or filtration. One or more series of reactors can be provided, with different catalysts in the different reactors of each series.

Under the above conditions and catalyst selections, exemplary products from a slurry bed reactor in the VRHCK unit include LPG in the range of 3-6 wt %, middle distillates in the range of about 23-55 wt %, naphtha in the range of about 10-20 wt %, pitch in the range of about 10-20 wt %, and hydroprocessed gas oil in the range of about 15-30 wt %. All or a portion of the middle distillates from the VRHCK unit can be used as DHG feed (optionally after hydrotreating), combined with the VGO and routed to the VGOHP zone 1160/1170, or routed to the DHT zone 1150.

In embodiments with a fixed bed reactor for vacuum residue hydrocracking in the VRC zone 1180, catalyst particles are stationary and do not move with respect to a fixed reference frame. In conventional fixed-bed reactors, the hydroprocessing catalysts are replaced regularly in order to maintain the desired level of catalyst activity and throughput.

In certain embodiments, a VRHCK unit of the VRC zone 1180 includes a hydrocracking fixed bed reactor operating under the following conditions:

a reactor temperature (° C.) in the range of from about 370-470, 370-450, 380-470, 380-450, 390-470 or 390-450;

a hydrogen partial pressure (barg) in the range of from about 80-250, 80-200, 80-150, 90-250, 90-200, 90-150, 100-250, 100-200 or 100-150;

a hydrogen gas feed rate (standard liters per liter of hydrocarbon feed, SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500; and a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0.

Effective hydrocracking catalyst for a fixed bed reactor in a VRHCK unit of the VRC zone 1180 include those possessing hydrotreating functionality. Such catalysts generally contain an effective amount, such as about 5-40 wt % based on the weight of the catalyst, of one or more active metal component(s) of metals or metal compounds (oxides or sulfides) selected from the Periodic Table of the Elements IUPAC Groups 6, 7, 8, 9 and 10. In certain embodiments, the active metal component(s) is/are one or more of Co, Ni, and Mo. The active metal component(s) is/are typically deposited or otherwise incorporated on a support, such as amorphous alumina, amorphous silica alumina, zeolites, or combinations thereof. One or more series of reactors can be provided, with different catalysts in the different reactors of each series. Effective liquid hourly space velocity values ($h^{-1}$), on a fresh feed basis relative to the hydrotreating catalysts, are in the range of from about 0.1-0.5, 0.1-0.2, 0.2-0.3, 0.3-0.4, 0.4-0.5, 0.1-0.3 or 0.3-0.5.

In embodiments with a moving bed reactor for vacuum residue hydrocracking in a VRHCK unit of the VRC zone 1180, catalyst can be replaced without interrupting the unit's operation. Moving bed reactors combine certain advantages of fixed bed operations and the relatively easy catalyst replacement of ebullated bed technology. During catalyst replacement, catalyst movement is slow compared to the linear velocity of the feed. The frequency of catalyst replacement depends on the rate of catalyst deactivation. Catalyst addition and withdrawal are performed, for instance, via a sluice system at the top and bottom of the reactor. In certain embodiments, the moving bed reactor is operated in a counter current mode. In the counter current mode, spent catalyst already saturated by contaminates is located at the bottom of the reactor and meets the fresh feed entering from the bottom. This allows for fresh catalyst located at the top of the reactor to react with an already demetallized feed.

In certain embodiments, a VRHCK unit of the VRC zone 1180 includes a hydrocracking moving bed reactor operating under the conditions stated above for a fixed bed reactor. Catalyst material in a moving bed reactor is continuously replaced in an annualized relative catalyst consumption (RCC) rate in the range of about 0.4-0.8, 0.4-0.6, 0.6-0.8, 0.4-0.5, 0.5-0.6, 0.6-0.7 and 0.7-0.8. Under the above conditions and catalyst selections, exemplary products from a fixed bed reactor or moving bed reactor in the VRHCK unit include LPG in the range of 3-6 wt %, middle distillates in the range of about 5-30 wt %, naphtha in the range of about 1-20 wt %, pitch in the range of about 30-60 wt %, and hydroprocessed gas oil in the range of about 20-40 wt %. All or a portion of the middle distillates from the VRHCK unit can be combined with the VGO and routed to the VGOHP zone 1160/1170, or routed to the DHT zone 1150.

In the embodiment of FIG. 2, the system similar to that of FIG. 1 is schematically depicted, further integrating a naphtha hydrogenation zone 1204. One or more naphtha streams within the system 1100 are passed to the hydrogenation zone 1204 for hydrogenation of naphtha to produce a hydrogenated naphtha stream 1206 as additional feed to the petrochemicals production complex 1215. In FIG. 2, any of the naphtha streams (streams 1114, 1152, 1162/1172 or 1184), or a combined naphtha stream 1222 of two or more of the naphtha streams, are/is processed in a naphtha hydrogenation zone 1204. In additional embodiments, all or a portion of the coker naphtha stream 1332 can be subjected to naphtha hydrogenation in the naphtha hydrogenation zone 1204. In further embodiments, all or a portion of the light liquid hydrocarbon stream 1226 (pyrolysis gasoline and/or FCC naphtha) can be subjected to naphtha hydrogenation in the naphtha hydrogenation zone 1204. In other embodiments (not shown), one or more other naphtha streams are processed in the naphtha hydrogenation zone 1204.

In certain embodiments, all, a substantial portion, a significant portion or a major portion of the hydrogenated naphtha stream 1206 is routed to the petrochemicals production complex 1215, alone or in combination with other naphtha fractions in the integrated process. Any portion that is not passed to the petrochemicals production complex 1215 can be upgraded if necessary, for example to increase the octane number by catalytic reforming, and routed to a gasoline pool. In certain embodiments, the hydrogenated naphtha stream 1206 is routed through the crude complex 1105, alone, or in combination with wild naphtha fractions from within the integrated process, and can be routed to the petrochemicals production complex 1215 with straight run naphtha 1114 that is not subjected to naphtha hydrogenation. In embodiments in which the hydrogenated naphtha stream 1206 is routed through the crude complex 1105, all or a portion of the LPG produced in the naphtha hydrogenation zone 1204 can be passed with the hydrogenated naphtha stream 1206, or can be passed directly to the gas plant 1130, or to a separate gas treatment zone. In certain optional embodiments, all, a substantial portion, a significant portion or a major portion of the hydrogenated naphtha stream 1206 is routed to the petrochemicals production complex 1215 (directly or through the crude complex 1105). In embodiments in which hydrogenated naphtha 1206 is not sent to the petrochemicals production complex 1215, it can be upgraded if necessary, for example to increase the octane number by catalytic reforming, and added to a gasoline pool.

The DHG zone 1200 operates under conditions effective for deep hydrogenation of light coke gas oil (and in certain embodiments middle distillates from one or more other sources within the system) for conversion of aromatics into cycloalkanes and other non-aromatic compounds and to produce the hydrogenated middle distillate stream 1202. The sources include the light coker gas oil stream 1334, 4334, 5334, and 6334. In certain embodiments, other sources can be provided. For instance, in the embodiments of FIG. 1 and FIG. 2, one or more additional sources can be selected from the middle distillate fraction 1154 from the DHT zone 1150, the middle distillate range fraction 1164 or 1174 from the VGOHP zone 1160/1170, the middle distillate range fraction 1186 from the VRC zone 1180, or the light range middle distillate fraction 1118' from the kerosene sweetening zone 1120. In certain embodiments as noted above the light coker gas oil, the middle distillate fraction 1164 or 1174 and/or the middle distillate fraction 1186 can be subjected to hydrotreating depending on the sulfur and nitrogen content of the middle distillate fractions, and whether they are processed in the DHG zone 1200 alone or in combination with other middle distillate streams that have lower sulfur and nitrogen content.

The selection of catalysts, conditions and the like for deep hydrogenation are dependent on the feed, the aromatic content, and the types of aromatics in the middle distillate range stream. The effluent stream contains the hydrogenated middle distillate range compounds, and lighter fractions, that are passed to the reaction/separation zone 1220. In certain embodiments, the selection of catalysts and conditions are suitable to reduce aromatic content in a middle distillate range feedstream from a range of about 10-40 wt % or greater, to a hydrogenated distillate range intermediate product having an aromatic content of less than about 5-0.5, 5-1, 2.5-0.5, 2.5-1, or 1-0.5 wt %.

In certain embodiments, a naphtha fraction is obtained from the DHG zone 1200, which can be combined with other naphtha streams, or passed together with the hydrogenated middle distillate stream 1202 to the reaction/separation zone 1220. Effluent off-gases can also be passed with the hydrogenated middle distillate stream 1202, or recovered from the DHG zone 1200 and passed to the olefin recovery train, the saturated gas plant as part of the other gases stream 1134, and/or directly to a fuel gas system. LPG can be recovered from the DHG zone 1200 and routed to the steam cracking reaction/separation zone that is part of the petrochemicals production complex 1215, a separate steam cracking reaction/separation zone, the olefin recovery train, the saturated gas plant and/or used for other purposes. In certain embodiments, any recovered naphtha is routed through the crude complex 1105, alone, or in combination with other wild naphtha fractions from within the integrated process. In embodiments in which any recovered naphtha is routed through the crude complex 1105, all or a portion of the LPG produced in the DHG zone 1200 can be passed with naphtha fraction, or can be passed directly to the gas plant 1130 or a separate gas treatment zone. In certain embodiments, all, a substantial portion or a significant portion of any naphtha produced in the DHG zone 1200 is routed to the petrochemicals production complex 1215 (directly or through the crude complex 1105).

The DHG zone 1200 can contain one or more fixed-bed, ebullated-bed, slurry-bed, moving bed, continuous stirred tank (CSTR) or tubular reactors, in series and/or parallel arrangement. In certain embodiments, multiple reactors can be provided in parallel in DHG zone 1200 to facilitate catalyst replacement and/or regeneration. The reactor(s) are operated under conditions effective for hydrogenation of the reduced organosulfur and reduced organonitrogen middle distillate feed, and such conditions can vary based on, for instance, the particular type of reactor, the feed characteristics, and the catalyst selection. Additional equipment, including exchangers, furnaces, feed pumps, quench pumps, and compressors to feed the reactor(s) and maintain proper operating conditions, are well known and are considered part of the DHG zone 1200. In addition, equipment including pumps, compressors, high temperature separation vessels, low temperature separation vessels and the like to separate reaction products and provide hydrogen recycle within the DHG zone 1200, are well known and are considered part of the DHG zone 1200.

In certain embodiments, the DHG zone 1200 operating conditions include:

a reaction temperature (° C.) in the range of from about 250-320, 250-315, 250-310, 280-320, 280-315, 280-310, 285-320, 285-315, 285-310, 290-320, 290-315, or 290-310;

a hydrogen partial pressure (barg) in the range of from about 20-100, 20-85, 20-70, 30-100, 30-85, 30-40, 40-100, 40-85 or 40-70;

a hydrogen to oil feed ratio (SLt/Lt) up to about 3000, 2000 or 1500, in certain embodiments from about 500-3000, 500-2000, 500-1500, 1000-3000, 1000-2000 or 1000-1500; and a liquid hourly space velocity values ($h^{-1}$), on a fresh feed basis relative to the hydrogenation catalysts, in the range of from about 0.1-5.0, 0.1-3.0, 0.1-2.0, 0.5-5.0, 0.5-3.0, 0.5-2.0, 1.0-5.0, 1.0-5.0 or 1.0-2.0.

An effective quantity of hydrogenation catalyst is provided in the DHG zone 1200 that is effective for deep hydrogenation. Suitable hydrogenation catalysts generally contain an effective amount of one or more active metal component(s) of metals or metal compounds (oxides or sulfides) selected from the Periodic Table of the Elements IUPAC Groups 7, 8, 9 and 10. In certain embodiments the active metal component(s) is/are selected from the group consisting of Pt, Pd, Ti, Rh, Re, Ir, Ru, and Ni, or a combination thereof. In certain embodiments the active metal component(s) comprises a noble metal selected from the group consisting of Pt, Pd, Rh, Re, Ir, and Ru, or a combination thereof. The combinations can be composed of different particles containing a single active metal species, or particles containing multiple active species. Such noble metals can be provided in the range of (wt % based on the mass of the metal relative to the total mass of the catalyst) 0.01-5, 0.01-2, 0.05-5, 0.05-2, 0.1-5, 0.1-2, 0.5-5, or 0.5-2. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units.

The active metal component(s) is/are typically deposited or otherwise incorporated on a support such as amorphous alumina, and in certain embodiments non-acidic amorphous alumina. In certain embodiments the support comprises non-acidic amorphous alumina containing about 0.1-20, 0.1-15, 0.1-10, 0.1-5, 0.5-20, 0.5-15, 0.5-10, 0.5-5, 1-20, 1-15, 1-10, 2.5-20, 2.5-15, or 2.5-10 wt %, of zeolite, including USY zeolite. Non-acidic catalysts are selected for deep hydrogenation catalyst so as to favor hydrogenation reactions over hydrocracking reactions. Particularly effective deep hydrogenation catalyst to promote hydrogenation reactions include noble metal active catalyst components on non-acidic supports, such as Pt, Pd or combinations thereof on non-acidic supports. In certain embodiments a suitable deep hydrogenation catalyst includes a non-acidic support such as alumina having Pt as the active metal component in an amount of about 0.1-0.5 wt % based on the mass of the metal relative to the total mass of the catalyst, with relatively small amounts of zeolite such as USY zeolite, for instance 0.1-5 wt %.

In certain embodiments, the catalyst and/or the catalyst support is prepared in accordance with U.S. Pat. Nos. 9,221,036B2 and 10,081,009B2, which are incorporated herein by reference in their entireties. Such catalyst and/or catalyst support includes a modified USY zeolite support having one or more of Ti, Zr and/or Hf substituting the aluminum atoms constituting the zeolite framework thereof. For instance, the catalyst effective for deep hydrogenation include active metal component(s) carried on a support containing an ultra-stable Y-type zeolite, wherein the above ultra-stable Y-type zeolite is a framework-substituted zeolite (referred to as a framework-substituted zeolite) in which a part of aluminum atoms constituting a zeolite framework thereof is substituted with 0.1-5 mass % zirconium atoms and 0.1-5 mass % Ti ions calculated on an oxide basis.

Catalyst using noble metal active catalyst components are effective at relatively lower temperatures. As will be appreciated by those having ordinary skill in the art, aromatic hydrogenation reactions are more favorable at lower temperatures, whereas high temperatures are required for cracking. The delta temperature for cracking as compared to hydrogenation can be in the range of about 30-80° C.

In certain embodiments, the feedstock to the reactor within the DHG zone (a single reactor with one bed, a single reactor with multiple beds, or multiple reactors) is mixed with an excess of hydrogen gas in a mixing zone. A portion of the hydrogen gas is mixed with the feedstock to produce a hydrogen-enriched liquid hydrocarbon feedstock. This hydrogen-enriched liquid hydrocarbon feedstock and undissolved hydrogen is supplied to a flashing zone in which at least a portion of undissolved hydrogen is flashed, and the hydrogen is recovered and recycled. The hydrogen-enriched liquid hydrocarbon feedstock from the flashing zone is supplied as a feed stream to the reactor(s) of the DHG zone.

The naphtha hydrogenation zone 1204 can contain one or more fixed-bed, ebullated-bed, slurry-bed, moving bed, continuous stirred tank (CSTR) or tubular reactors, in series and/or parallel arrangement. In certain embodiments, multiple reactors can be provided in parallel in the naphtha hydrogenation zone 1204 to facilitate catalyst replacement and/or regeneration. The reactor(s) are operated under conditions effective for hydrogenation of the naphtha feed, the particular type of reactor, the feed characteristics, and the catalyst selection. Additional equipment, including exchangers, furnaces, feed pumps, quench pumps, and compressors to feed the reactor(s) and maintain proper operating conditions, are well known and are considered part of the naphtha hydrogenation zone 1204. In addition, equipment including pumps, compressors, high temperature separation vessels, low temperature separation vessels and the like to separate reaction products and provide hydrogen recycle within the naphtha hydrogenation zone 1204, are well known and are considered part of the naphtha hydrogenation zone 1204.

In certain embodiments, the naphtha hydrogenation zone 1204 operating conditions include:

a reaction temperature (° C.) in the range of from about 250-320, 250-315, 250-310, 280-320, 280-315, 280-310, 285-320, 285-315, 285-310, 290-320, 290-315, or 290-310;

a hydrogen partial pressure (barg) in the range of from about 20-85, 20-70, 20-60, 30-85, 40-85 or 40-70;

a hydrogen to oil feed ratio (SLt/Lt) up to about 3000, 2000 or 1500, in certain embodiments from about 500-3000, 500-2000, 500-1500, 1000-3000, 1000-2000 or 1000-1500; and a liquid hourly space velocity values ($h^{-1}$), on a fresh feed basis relative to the hydrogenation catalysts, in the range of from about 0.1-5.0, 0.1-3.0, 0.1-2.0, 0.5-5.0, 0.5-3.0, 0.5-2.0, 1.0-5.0, 1.0-5.0 or 1.0-2.0.

An effective quantity of hydrogenation catalyst is provided in the naphtha hydrogenation zone 1204 that is effective for hydrogenation of naphtha from the one or more naphtha sources. Suitable hydrogenation catalysts generally contain an effective amount of one or more active metal component(s) of metals or metal compounds (oxides or sulfides) selected from the Periodic Table of the Elements IUPAC Groups 7, 8, 9 and 10. In certain embodiments the active metal component(s) is/are selected from the group consisting of Pt, Pd, Ti, Rh, Re, Ir, Ru, and Ni, or a combination thereof. In certain embodiments the active metal component(s) comprises a noble metal selected from the group consisting of Pt, Pd, Rh, Re, Ir, and Ru, or a combination thereof. The combinations can be composed of different particles containing a single active metal species, or particles containing multiple active species. Such noble metals can be provided in the range of (wt % based on the mass of the metal relative to the total mass of the catalyst) 0.01-5, 0.01-2, 0.05-5, 0.05-2, 0.1-5, 0.1-2, 0.5-5, or 0.5-2. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units.

The active metal component(s) is/are typically deposited or otherwise incorporated on a support such as amorphous alumina, and in certain embodiments non-acidic amorphous alumina. In certain embodiments the support comprises non-acidic amorphous alumina containing about 0.1-20, 0.1-15, 0.1-10, 0.1-5, 0.5-20, 0.5-15, 0.5-10, 0.5-5, 1-20, 1-15, 1-10, 2.5-20, 2.5-15, or 2.5-10 wt %, of zeolite, including USY zeolite. Non-acidic catalysts are selected for deep hydrogenation catalyst so as to favor hydrogenation reactions over hydrocracking reactions. Particularly effective hydrogenation catalyst to promote hydrogenation reactions include noble metal active catalyst components on non-acidic supports, such as Pt, Pd or combinations thereof on non-acidic supports. In certain embodiments a suitable hydrogenation catalyst includes a non-acidic support such as alumina having Pt as the active metal component in an amount of about 0.1-0.5 wt % based on the mass of the metal relative to the total mass of the catalyst, with relatively small amounts of zeolite such as USY zeolite, for instance 0.1-5 wt %.

In certain embodiments, the hydrogenation catalyst and/or the catalyst support is prepared in accordance with U.S. Pat.

Nos. 9,221,036B2 and 10,081,009B2, which are incorporated herein by reference in their entireties. Such catalyst and/or catalyst support includes a modified USY zeolite support having one or more of Ti, Zr and/or Hf substituting the aluminum atoms constituting the zeolite framework thereof. For instance, the catalyst effective for deep hydrogenation include active metal component(s) carried on a support containing an ultra-stable Y-type zeolite, wherein the above ultra-stable Y-type zeolite is a framework-substituted zeolite (referred to as a framework-substituted zeolite) in which a part of aluminum atoms constituting a zeolite framework thereof is substituted with 0.1-5 mass % zirconium atoms and 0.1-5 mass % Ti ions calculated on an oxide basis.

Hydrogenation catalysts using noble metal active catalyst components are effective at relatively lower temperatures. As will be appreciated by those having ordinary skill in the art, aromatic hydrogenation reactions are more favorable at lower temperatures, whereas high temperatures are required for cracking. The delta temperature for cracking as compared to hydrogenation can be in the range of about 30-80° C.

In certain embodiments, any suitable feedstock, stream 2306 in FIG. 3, can be processed in a coking zone 2300 to produce typical coking zone liquid and gas products, including light gases, coker naphtha and light coker gas oil as feed to a deep hydrogenation zone disclosed herein for conditioning as steam cracking feed. FIG. 3 schematically depicts an embodiment of a coking zone for use in a system integrating deep hydrogenation of light coker gas oil with a petrochemicals production complex. The coker feedstock 2306 can be a heavy oil feedstock selected from the group consisting of atmospheric residue, vacuum residue, deasphalted oil, demetallized oil, other heavy oil fractions, and combinations thereof, and can be derived from crude oil, bitumens, oil sand, shale oil, coal oils or biomass oils. In certain embodiments a heavy oil can have an initial boiling point corresponding to that of VGO described herein, an end point based on the characteristics of the heavy oil fraction. In further embodiments an additional feedstock can have a nominal boiling range with an initial boiling point of about 425-565, 450-565, 425-540, 450-540, 425-530, 450-530, 425-510 or 450-510° C., in certain embodiments about 425, 450 or 475° C., and an end point based on the characteristics of the heavy oil fraction.

The coking zone 2300 is operated receive the coker feed 2306 for conversion into at least light gases 2330, coker naphtha 2332, light coker gas oil 2334, heavy coker gas oil 2336 and petroleum coke 2338. Light gases 2330 can be integrated with the fuel gas system. In certain embodiments (not shown), gases 2330 can be routed to the separation units within the petrochemicals production complex, and/or LPGs can be routed to the steam cracking zone that is part of the petrochemicals production complex.

In certain embodiments, all or a portion of the coker naphtha 2332 can be processed as described herein in a py-gas hydrotreatment and recovery center, to increase the quantity of raffinate as additional feed to the petrochemicals production complex. Any portion of the coker naphtha 2332 that is not routed to a py-gas hydrotreatment and recovery center can be hydrotreated and recovered for fuel production. For instance, in modalities in which the objective is maximum petrochemical production, all, a substantial portion, a significant portion or a major portion of the coker naphtha 2332 is routed to a py-gas hydrotreatment and recovery center; the remainder, if any, is recovered for fuel production and incorporation into a gasoline pool. In additional embodiments, all or a portion of the coker naphtha 2332 is hydrotreated and recovered for fuel production and incorporation into a gasoline pool. Optionally, a portion of the coker naphtha 2332 that is not recovered for fuel production can be processed in a py-gas hydrotreatment and recovery center, as shown in dashed lines, to increase the quantity of raffinate as additional feed to the petrochemicals production complex.

Other products from the coker zone 2300 include light coker gas oil 2336 and petroleum coke 2338. In certain embodiments, all, a substantial portion, a significant portion or a major portion of the light coker gas oil 2336 is used as feed to the deep hydrogenation zone, alone or in combination with other feeds as described herein.

In certain embodiments, an additional hydrotreating reaction zone can be included between the coking zone 2300 and the DHG zone, depending on the sulfur and nitrogen content of the coker gas oil 2332, and whether this stream is processed in the DHG zone 2200 alone or in combination with other middle distillate streams that have lower sulfur and nitrogen content. In these embodiments, the catalyst(s), temperature and space velocity for hydrotreating can be similar to those of the DHT zone 1150 described herein, with a hydrogen partial pressure in the range of from about 50-120, 50-100, 50-90, 60-120, 60-100, 60-90, 70-120, 70-100 or 70-90.

The petrochemicals production complex 1215 in the system 1100 described in conjunction with FIG. 1 and FIG. 2 integrates the reaction/separation zone 1220, which can include one or more steam cracking units, one or more petrochemical production FCC units, or both one or more steam cracking units and one or more petrochemical production FCC units. In the description herein, both the reaction/separation zone 1220 and the product separation systems associated therewith are collectively referred to as the "petrochemicals production complex" 1215, although a person having ordinary skill in the art will appreciate that the downstream operations can vary, or include further units. In addition, the reaction/separation zone 1220 referred to herein includes the requisite reactors and associated components, and in certain embodiments at least part of the product separation units, for instance for separation of one or more liquid fractions and one or more gas streams, where gases are further processed as disclosed or as otherwise known. For instance, in embodiments in which the reaction/separation zone 1220 is (or includes) one or more petrochemical production FCC units, one or more liquid fractions include FCC naphtha and cycle oil, where cycle oil can be a combined stream or separate streams of light cycle oil and heavy cycle oil. In embodiments in which the reaction/separation zone 1220 is or includes one or more steam cracking units, one or more liquid fractions include pyrolysis gasoline naphtha and pyrolysis oil, where pyrolysis oil can be a combined stream or separate streams of light pyrolysis oil and heavy pyrolysis oil.

The reaction/separation zone 1220 can contain two or more different reactors, with certain products from each of said different reactors combined or separately treated for further downstream operations. The one or more petrochemical production FCC reactors and one or more steam cracking reactors are included in certain embodiments to provide flexibility to the operator. In certain embodiments the petrochemicals production complex 1215 includes a combination one or more petrochemical production FCC reactors and one or more steam cracking reactors. In certain embodiments the different types of reactors are configured and operated to receive and crack feeds having similar composition and/or having similar nominal boiling ranges. In further embodiments the different types of reactors are configured and operated to receive and crack feeds having dissimilar composition and/or having dissimilar nominal boiling ranges.

In certain embodiments, the determination of whether to direct feed to steam cracking operations or to petrochemical production FCC operations can depend on the desired product slate. For example, in modes of operation of the petrochemicals production complex 1215 in which ethylene production is favored, feed(s) are directed to the steam cracking operations(s), and in modes of operation in which propylene production is favored, feed(s) are directed to the petrochemical production FCC operation(s). Accordingly, an operator can change the ratio of ethylene to propylene based on selection of the type of reactor within the petrochemical production complex 1215.

In certain embodiments, the determination of whether to direct feed to steam cracking operations or to petrochemical production FCC operations can depend on feed characteristics. For example, in certain embodiments feed(s) to the reaction/separation zone 1220 that are rich in paraffins can be directed to the steam cracking operation(s), and feed(s) to the reaction/separation zone 1220 that are rich in naphthenes can be directed to the petrochemical production FCC operation(s). In certain embodiments the feed to the reaction/separation zone 1220 can be separated into a portion that is rich in paraffins and a portion that is rich in naphthenes. In certain embodiments the feed to the reaction/separation zone 1220 can be separated based on boiling point, for example where a portion that has a relatively lower nominal boiling point range is directed to one type of reactor and a portion that has a relatively higher nominal boiling point range is directed to the other type of reactor. For example, the portion that has a relatively lower nominal boiling point range can be directed to the steam cracking operation(s) and the portion that has a relatively higher nominal boiling point range can be directed to the petrochemical production FCC operation(s).

FIG. 4A and FIG. 4B schematically depict embodiments of a reaction/separation zone 3220 that can be integrated in the petrochemicals production complex 1215 described herein with respect to FIG. 1 and FIG. 2. The reaction/separation zone 3220 includes a steam cracking reaction/separation zone 3620, and a petrochemical production FCC reaction/separation zone 3720. The feed to the reaction/separation zone 3220, a feedstream 3504 can include any one or more of the feeds described herein to the petrochemicals production complex 1215, including but not limited to: the hydrogenated middle distillate stream 1202; the light range middle distillate fraction 1118' from the optional kerosene sweetening zone 1120; one or more of the individual naphtha streams 1152, 1162/1172, or 1184; the combined naphtha stream 1222; or the hydrogenated naphtha stream 1206. In addition, recycle streams can optionally also contribute to the feedstream 3504, including one or both of the C5 raffinate stream 1282 and the non-aromatics stream 1280 from an aromatics extraction zone 1272. In certain embodiments one or both of the C5 raffinate stream 1282 and the non-aromatics stream 1280 are paraffin rich streams that are directed to the steam cracking reaction/separation zone 3620. Other recycle streams, for instance gases from within the integrated system, can optionally also be passed to the steam cracking reaction/separation zone 3620, which are shown as stream 3506, and can include, for example, one or more of a recycle ethane stream 1242, a recycle propane stream 1246 and a C4 raffinate stream 1264.

As depicted in FIG. 4A and FIG. 4B, products from the reaction/separation zone 3220 include products from the steam cracking reaction/separation zone 3620 (a mixed gas products stream 3624, pyrolysis gasoline as a light liquid hydrocarbon products stream 3626 and pyrolysis oil as a heavy liquid hydrocarbon products stream 3628, with light pyrolysis oil optionally separated as an intermediate stream, not shown) and products from the petrochemical production FCC reaction/separation zone 3720 (a mixed gas products stream 3724, FCC naphtha as a light liquid hydrocarbon products stream 3726 and cycle oil or heavy cycle oil as a heavy liquid hydrocarbon products stream 3728, with light cycle oil optionally separated as an intermediate stream, with light pyrolysis oil optionally separated as an intermediate stream, not shown). These product streams can be collected separately or via common lines, depending on the further treatment. For example, gas products can be commonly processed in the olefin recovery train 1230. In other embodiments, gas products 3724 from the petrochemical production FCC reaction/separation zone 3720 are directed to an unsaturated gas plant before separation into olefin products. In certain embodiments pyrolysis gasoline and FCC naphtha are commonly processed downstream of the reaction/separation zone 3220, for instance in the aromatics extraction zone 1272, in certain embodiments following hydrotreating and/or hydrocracking. In certain embodiments pyrolysis oil or heavy pyrolysis oil, and cycle oil or heavy cycle oil, are commonly processed downstream of the reaction/separation zone 3220. In certain embodiments pyrolysis gasoline and FCC naphtha are processed separately downstream of the reaction/separation zone 3220. In certain embodiments pyrolysis oil or heavy pyrolysis oil, and cycle oil or heavy cycle oil, are processed separately downstream of the reaction/separation zone 3220. In certain embodiments any one or more of the pyrolysis oil, heavy pyrolysis oil, cycle oil and/or heavy cycle oil streams can be processed with gas oil in a hydrocracking unit and/or with residue in a residue hydrocracker.

Referring to FIG. 4A, in certain embodiments the feedstream 3504 is in fluid communication with the reaction/separation zone 3220 in a manner that enables it to be directed to either the steam cracking reaction/separation zone 3620 or the petrochemical production FCC reaction/separation zone 3720. The feed can be directed by a suitable valve or other diverter device 3510, and is controlled by an operator and/or can be automated based on instructions to a controller associated with the valve or other diverter device. In such modes of operation, all, a substantial portion, a significant portion or a major portion can be directed to one of the steam cracking reaction/separation zone 3620 or the petrochemical production FCC reaction/separation zone 3720, and the remainder can be directed to the other type of reaction/separation zone or used for other purposes.

In certain embodiments, different operational modes of the arrangement of FIG. 4A are based on the paraffinic or naphthenic content of the feed. For instance, in certain modes of operation in which the feedstream 3504 is rich in paraffins, all, a substantial portion, a significant portion or a major portion of the feed is directed to the steam cracking reaction/separation zone 3620; in modes of operation in which the feedstream 3504 is rich in naphthenes, all, a substantial portion, a significant portion or a major portion of the feed can be directed to the petrochemical production FCC reaction/separation zone 3720.

In certain embodiments, different operational modes of the arrangement of FIG. 4A are based on the desired product slate for the light olefins. For instance, in certain modes of operation in which the desired product slate favors ethylene over propylene, all, a substantial portion, a significant portion or a major portion of the feedstream 3504 is directed to the steam cracking reaction/separation zone 3620; in modes of operation in which the desired product slate favors propylene over ethylene, all, a substantial portion, a significant portion or a major portion of the feedstream 3504 can be directed to the petrochemical production FCC reaction/separation zone 3720.

Referring to FIG. 4B, in certain embodiments the feedstream 3504 is in fluid communication with the reaction/separation zone 3220 via a separation zone 3512, whereby a first stream 3514 is directed to the steam cracking reaction/separation zone 3620 and a second stream 3516 is directed the petrochemical production FCC reaction/separation zone 3720. In certain embodiments, the feedstream 3504 is separated based on boiling point, for instance by distillation or flash separation, wherein the first stream 3514 includes a lighter fraction of the feedstream 3504 and the second stream 3516 includes a heavier fraction of the feedstream 3504.

In another embodiment based on the schematic depiction in FIG. 4B, the separation zone 2512 includes one or more operations effective to separate a feedstream 3504 based on the types of compounds. For example, a feedstream 3504 containing a mixture of paraffins and naphthenes is separated into a paraffin-rich stream and a naphthene-rich stream. In one embodiment using the first stream 3514 is a paraffin-rich stream and the second stream 3516 is a naphthene-rich stream.

FIG. 4C schematically depicts an embodiment of a reaction/separation zone 4220 that can be integrated in the petrochemicals production complex 1215 described herein with respect to FIG. 1 and FIG. 2. The reaction/separation zone 4220 includes one or more reactors each configured to receive a particular range of feeds. For example, in certain embodiments one or more reactors can be configured and operated to received and crack deeply hydrogenated middle distillates, and one or more reactors can be configured and operated to receive and crack lighter feeds such as naphtha and LPG. In certain embodiments one or more reactors can be configured and operated to received and crack deeply hydrogenated middle distillates, one or more reactors can be configured and operated to receive and crack naphtha range products, and one or more reactors can be configured to receive and crack LPG. In certain embodiments one or more reactors can be configured and operated to received and crack deeply hydrogenated middle distillates, and one or more reactors can be configured and operated to receive and crack heavier oils from the integrated system.

The reaction/separation zone 4220 includes multiple units for processing feedstocks having different boiling point characteristics. For instance, in certain embodiments reaction/separation zone 4220 includes a reaction/separation zone 4284 suitable for conversion of naphtha-range hydrocarbons to petrochemicals, and a reaction/separation zone 4292 suitable for conversion of middle distillate-range hydrocarbons to petrochemicals. In certain embodiments, one or more additional reaction/separation zones can also be integrated (not shown), for instance for conversion of one or more heavier streams to petrochemicals, such as a gas oil steam cracking unit or an FCC unit suitable for processing vacuum gas oil.

The naphtha reaction/separation zone 4284 is operated under conditions effective for conversion of a naphtha feed 4222 into light olefins, light liquid hydrocarbon products, and heavy liquid hydrocarbon products. The naphtha feed 4222 can be a combined naphtha stream 1222 or a hydrogenated combined naphtha stream 1206. The naphtha reaction/separation zone 4284 can operate as a petrochemical production FCC unit, a steam cracking unit, or can include both types of units, for instance operating as described with respect to FIG. 4A and FIG. 4B. Products from the naphtha reaction/separation zone 4284 include a quenched cracked gas stream 4286 containing mixed C1-C4 paraffins and olefins that is routed to the olefin recovery zone, an light liquid hydrocarbon products stream 4288, and a heavy liquid hydrocarbon products stream 4290, which can be handled as described herein with respect to the streams 1224, 1226 and 1228 (optionally with an intermediate liquid hydrocarbon stream) described in conjunction with FIG. 1 and FIG. 2.

The middle distillate reaction/separation zone 4292 is operated under conditions effective for conversion of the feed, hydrogenated middle distillate stream 1202, into light olefins, light liquid hydrocarbon products, and heavy liquid hydrocarbon products. The feed 4202 can comprise or consist of the hydrogenated middle distillate stream 1222 from the DHG zone 1200, and in certain embodiments also including all or a portion of the light range middle distillate fraction 1118' from the kerosene sweetening zone 1120. The middle distillate reaction/separation zone 4292 can operate as a petrochemical production FCC unit, a steam cracking unit, or can include both types of units, for instance operating as described with respect to FIG. 4A and FIG. 4B. Products from the middle distillate reaction section 4292 include a quenched cracked gas stream 4294 containing mixed C1-C4 paraffins and olefins that is routed to the olefin recovery zone, a light liquid hydrocarbon products stream 4296, and a heavy liquid hydrocarbon products stream 4298, which can be handled as described herein with respect to the streams 1224, 1226 and 1228 (optionally with an intermediate liquid hydrocarbon stream) described in conjunction with FIG. 1 and FIG. 2.

In certain embodiments, steam cracking in a middle distillate steam cracking section 4292 is carried out using the following conditions: a temperature (° C.) in the convection section in the range of about 300-450 or 300-400; a pressure (barg) in the convection section in the range of about 7.2-9.7, 7.2-8.5, 7.2-7.7, 7.7-8.5, 7.7-9.7 or 8.5-9.7; a temperature (° C.) in the pyrolysis section in the range of about 700-850, 700-800, 700-820, 750-850, 750-800 or 750-820; a pressure (barg) in the pyrolysis section in the range of about 0.9-1.2, 0.9-1.4, 0.9-1.6, 1.2-1.4, 1.2-1.6 or 1.4-1.6; a steam-to-hydrocarbon ratio in the convection section in the range of about 0.75:1-2:1, 0.75:1-1.5:1, 0.85:1-2:1, 0.9:1-1.5:1, 0.9:1-2:1, 1:1-2:1 or 1:1-1.5:1; and a residence time (seconds) in the pyrolysis section in the range of about 0.02-1, 0.02-0.08, 0.02-0.5, 0.1-1, 0.1-0.5, 0.2-0.5, 0.2-1, or 0.5-1.

In certain embodiments, the quenched cracked gas streams 4286 and 4294 are combined and treated in a common olefin recovery zone as described herein with respect to the gas stream 1224. In additional embodiments the gas streams 4286 and 4294 are treated separately, or subject to different initial treatment steps and combined further downstream. The light liquid hydrocarbon products streams 4288 and 4296 can be treated separately, or the fraction derived from middle distillate steam cracking can be pretreated before combining for a common treatment, for instance as described herein with respect to the light liquid hydrocarbon products stream 1226. The heavy liquid hydrocarbon products streams 4290 and 4298 can be treated separately, or the fraction derived from middle distillate steam cracking can be pretreated before combining for a common treatment, for instance as described herein with respect to the heavy liquid hydrocarbon products stream 1228 (optionally with an intermediate liquid hydrocarbon stream). In other embodiments the heavy liquid hydrocarbon products stream 4290 obtained from the naphtha reaction/separation zone 4284 can be further separated into a heavy fraction and light fraction (for instance corresponding to heavy cycle oil and light cycle oil, and/or heavy pyrolysis oil and light pyrolysis oil) and where the heavy fraction of the heavy liquid hydrocarbon products stream 4290 from the naphtha reaction/separation zone 4284 is combined with the heavy liquid hydrocarbon products stream 4297 from the middle distillate reaction/separation zone 4292.

In certain optional embodiments, a gas oil cracking zone (not shown, which can operate as an petrochemical production FCC unit, a steam cracking unit, or can include both types of units, for instance operating as described with respect to FIG. 4A and FIG. 4B) can be integrated and operated under conditions effective for conversion of certain feeds into light olefins, pyrolysis gasoline and pyrolysis oil. Suitable feeds for a gas oil cracking zone include one or more streams obtained from all or a portion of unconverted oil 1166 from the VGOHCK zone 1160, hydrotreated gas oil 1176 from the VGOHT zone 1170, a residue hydroprocessed VGO fraction 1188 from the VRC zone 1180, and/or the third middle distillate stream 1124.

In embodiments that utilize steam cracking zone as the reaction/separation zone 1220 or as a unit within the reaction/separation zone 1220 (including the embodiments of FIG. 4A, FIG. 4B and FIG. 4C), the steam cracking zone operates as a high severity or a low severity thermal cracking process and converts the feedstock(s) including the hydrogenated middle distillate stream 1222 from the DHG zone 1200 and other feeds as described herein into a mixed product stream containing mixed C1-C4 paraffins and olefins, pyrolysis gasoline and pyrolysis oil. Other feeds to steam cracking, as disclosed herein, include straight-run liquids from the crude unit such as straight run naphtha, hydrogenated naphtha obtained from straight run naphtha, wild naphtha, hydrogenated naphtha obtained from wild naphtha, ethane and/or propane (from atmospheric distillation, recycled form within the system, and/or from outside battery limits) and various other recycle streams from chemical production and recovery areas within the integrated process and system.

The steam cracking zone 1220 operates under parameters effective to crack the feed into desired products including ethylene, propylene, butadiene, and mixed butenes. Pyrolysis gasoline and pyrolysis oil are also recovered. In certain embodiments, the steam cracking furnace(s) are operated at conditions effective to produce an effluent having a propylene-to-ethylene weight ratio of from about 0.3-0.8, 0.3-0.6, 0.4-0.8 or 0.4-0.6. The steam cracking zone 1220 generally comprises one or more trains of furnaces. For instance, a typical arrangement includes reactors that can operate based on well-known steam pyrolysis methods, that is, charging the thermal cracking feed to a convection section in the presence of steam to raise the temperature of the feedstock, and passing the heated feed to the pyrolysis reactor containing furnace tubes for cracking. In the convection section, the mixture is heated to a predetermined temperature, for example, using one or more waste heat streams or other suitable heating arrangement(s).

Figure 5:
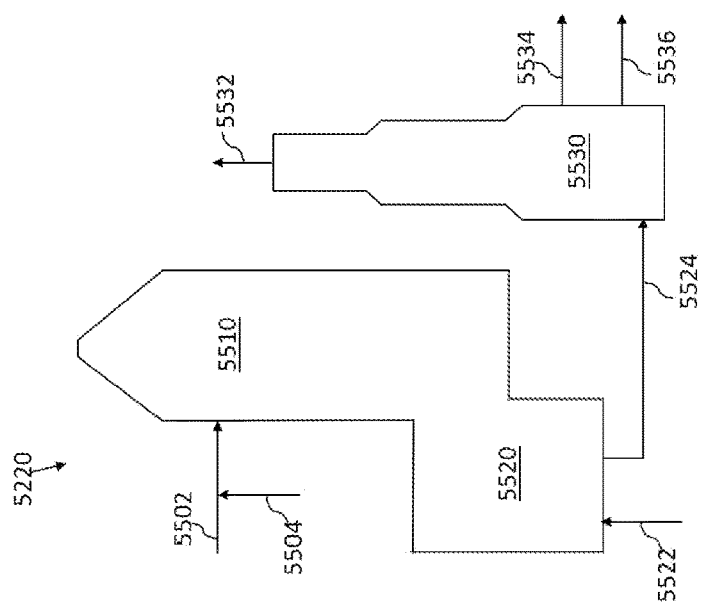
FIG. 5 schematically depicts a stream cracking operation for petrochemicals production.

FIG. 5 is a schematic diagram of an example of a steam cracking/separation zone 5220 that can serve as the reaction/separation zone 1220 or as a unit within the reaction/separation zone 1220. The steam cracking zone 5220 includes a convection section 5510, a pyrolysis section 5520, and a primary fractionator 5530. A feed mixture 5502 and steam 5504 is heated to a high temperature in a convection section 5510 and material with a boiling point below a predetermined temperature is vaporized. The heated mixture (in certain embodiments along with additional steam) is passed to the pyrolysis section 5530 operating at a further elevated temperature for short residence times, such as 1-2 seconds or less, effectuating pyrolysis to produce a mixed product stream 5524. A fuel gas stream 5522 is also depicted which is used to generate the necessary energy for steam cracking. This fuel gas stream can be derived from one or more internal sources, such as the gas stream 1234 from the olefin recovery train 1230, or fuel gas created during additional processes, such as an integrated gasification process. Effluent from the cracking furnaces 5524 is quenched, for instance, using transfer line exchangers, and passed to a quench tower (not shown). In certain embodiments separate convection and radiant sections are used for different incoming feeds to the steam cracking zone with conditions in each optimized for the particular feed. The light products, for example the quenched cracked gas stream, are routed to the olefin recovery zone 1230. Heavier products are separated in a hot distillation section. A raw pyrolysis gasoline stream 5534 is recovered in the quench system. Pyrolysis oil 5536 is separated at a primary fractionator tower before the quench tower. For example, quenched gases are stripped with steam in the primary fractionator 5530. Lighter gases are recovered as a product 5532 (for instance corresponding to stream 1224 in FIG. 1 and FIG. 2); a side-draw stream contains pyrolysis fuel oil. The primary fractionator bottoms product is pyrolysis tar, which is cooled and sent to product storage. Pyrolysis fuel oil from the primary fractionator is stripped with steam in the pyrolysis fuel oil stripper, which separates pyrolysis gasoline 5534 as the overhead and pyrolysis fuel oil 5536 as the bottoms product. Gasoline in the primary fractionator overhead is condensed and combined with gasoline from the pyrolysis fuel oil stripper before being sent to a gasoline stabilizer. The gasoline stabilizer removes light products in the overhead, while the stabilizer bottoms are sent to the pyrolysis gasoline hydrotreater. C4 and lighter gases in the primary fractionator overhead are compressed, for instance, in two stages of compression, before entering an absorber, depropanizer and debutanizer.

In embodiments in which steam cracking is used to convert hydrogenated middle distillates, the feed mixture 5502 includes the hydrogenated middle distillate stream 1222 from the DHG zone 1200. In other embodiments all or a portion of hydrogenated middle distillates are passed to an FCC unit that is a unit within the reaction/separation zone 1220, and steam cracking can be used to convert one or more other feeds. Such one or more other feeds can form the feed mixture 5502 and include: one or more of light ends 1136 and naphtha 1114 from the crude complex 1105; a recycle ethane stream 1242 from the olefin recovery zone 1230; a recycle propane stream 1246 from a methylacetylene/propadiene (MAPD) saturation and propylene recovery zone 1244 described below; C4 raffinate 1264 from the C4 separation zone 1266 described below; wild naphtha 1152 from a DHT zone 1150 described above; wild naphtha 1162 from a VGOHCK zone 1160, wild naphtha 1172 from a VGOHT zone 1170, described above; a naphtha fraction 1184 from the VRC zone 1180; or the hydrogenated naphtha stream 1206 from the naphtha hydrogenation zone 1204. The products from a steam cracking zone as the reaction/separation zone 1220 or as a unit within the reaction/separation zone 1220 include: a quenched cracked gas stream containing mixed C1-C4 paraffins and olefins that is routed to the olefin recovery zone 1230; a pyrolysis gasoline stream 1226 that is treated separately; and a pyrolysis fuel oil stream 1228 that is treated separately (optionally with an intermediate liquid hydrocarbon stream).

In certain embodiments, steam cracking is carried out using the following conditions: a temperature (° C.) in the convection section in the range of about 300-600, 300-550, 300-500, 300-450, 300-400, 400-600, 400-550, 400-500, 400-450, 450-600, 450-550, 450-500, or 500-600; a pressure (barg) in the convection section in the range of about 4.3-9.7, 4.3-8.5, 4.3-7.7, 4.3-5, 4.5-9.7, 4.5-8.5, 4.5-7.7, 4.5-5, 7.2-9.7, 7.2-8.5, 7.2-7.7, 7.7-8.5, 7.7-9.7 or 8.5-9.7; a temperature (° C.) in the pyrolysis section in the range of about 700-950, 700-900, 700-850, 750-950, 750-900 or 750-850; a pressure (barg) in the pyrolysis section in the range of about 1-4, 1-2 or 1-1.4; a steam-to-hydrocarbon ratio in the convection section in the range of about 0.3:1-2:1, 0.3:1-1.5:1, 0.5:1-2:1, 0.5:1-1.5:1, 0.7:1-2:1, 0.7:1-1.5:1, 1:1-2:1 or 1:1-1.5:1; and a residence time (seconds) in the pyrolysis section in the range of about 0.05-1.2, 0.05-1, 0.1-1.2, 0.1-1, 0.2-1.2, 0.2-1, 0.5-1.2 or 0.5-1.

In operation of one embodiment of the steam cracking zone 5220, the feedstocks are mixed with dilution steam to reduce hydrocarbon partial pressure and then are preheated. The preheated feeds are fed to tubular reactors mounted in the radiant sections of the cracking furnaces. The hydrocarbons undergo free-radical pyrolysis reactions to form light olefins ethylene and propylene, and other by-products. In certain embodiments, dedicated cracking furnaces are provided with cracking tube geometries optimized for each of the main feedstock types, including ethane, propane, and butanes/naphtha. Less valuable hydrocarbons, such as ethane, propane, C4 raffinate, and aromatics raffinate, produced within the integrated system and process, are recycled to extinction in the steam cracking zone 5220.

In certain embodiments, cracked gas from the furnaces is cooled in transfer line exchangers (quench coolers), for example, producing 1800 psig steam suitable as dilution steam. Quenched cracked gas enters the primary fractionator for removal of pyrolysis fuel oil bottoms from lighter components. The primary fractionator enables efficient recovery of pyrolysis fuel oil. Pyrolysis fuel oil is stripped with steam in a fuel oil stripper to control product vapor pressure, and cooled. In addition, secondary quench can be carried out by direct injection of pyrolysis fuel oil as quench oil into liquid furnace effluents. The stripped and cooled pyrolysis fuel oil can be sent to a fuel oil pool or product storage. The primary fractionator overhead is sent to a quench water tower; condensed dilution steam for process water treating, and raw pyrolysis gasoline, are recovered. Quench water tower overhead is sent to the olefin recovery zone 1230, particularly the first compression stage. Raw pyrolysis gasoline is sent to a gasoline stabilizer to remove any light ends and to control vapor pressure in downstream pyrolysis gasoline processing. A closed-loop dilution steam/process water system is enabled, in which dilution steam is generated using heat recovery from the primary fractionator quench pumparound loops. The primary fractionator enables efficient recovery of pyrolysis fuel oil due to energy integration and pyrolysis fuel oil content in the light fraction stream.

In certain optional embodiments, a gas oil cracking zone can be integrated as part of the petrochemical production complex 1215, including a gas oil steam cracking zone operating under parameters effective to crack the feed into desired products including ethylene, propylene, butadiene, and mixed butenes. Pyrolysis gasoline and pyrolysis oil are also recovered. In certain embodiments, the steam cracking furnace(s) in the gas oil steam cracking zone are operated at conditions effective to produce an effluent having a propylene-to-ethylene weight ratio of from about 0.3-0.8, 0.3-0.6, 0.4-0.8 or 0.4-0.6. In one embodiment of a gas oil steam cracking zone, suitable feedstock includes include one or more streams obtained from all or a portion of unconverted oil 1166 from the VGOHCK zone 1160, hydrotreated gas oil 1176 from the VGOHT zone 1170, a residue hydroprocessed VGO fraction 1188 from the VRC zone 1180, and/or the third middle distillate stream 1124. The feedstock is preheated and mixed with a dilution steam to reduce hydrocarbon partial pressure in a convection section. The steam-hydrocarbon mixture is heated further and fed to tubular reactors mounted in the radiant sections of the cracking furnaces. The hydrocarbons undergo free-radical pyrolysis reactions to form light olefins, ethylene and propylene, and other by-products. In certain embodiments, steam cracking in a gas oil steam cracking zone is carried out using the following conditions: a temperature (° C.) in the convection section in the range of about 300-450 or 300-400; a pressure (barg) in the convection section in the range of about 7.2-9.7, 7.2-8.5, 7.2-7.7, 7.7-8.5, 7.7-9.7 or 8.5-9.7; a temperature (° C.) in the pyrolysis section in the range of about 700-850, 700-800, 700-820, 750-850, 750-800 or 750-820; a pressure (barg) in the pyrolysis section in the range of about 0.9-1.2, 0.9-1.4, 0.9-1.6, 1.2-1.4, 1.2-1.6 or 1.4-1.6; a steam-to-hydrocarbon ratio in the convection section in the range of about 0.75:1-2:1, 0.75:1-1.5:1, 0.85:1-2:1, 0.9:1-1.5:1, 0.9:1-2:1, 1:1-2:1 or 1:1-1.5:1; and a residence time (seconds) in the pyrolysis section in the range of about 0.02-1, 0.02-0.08, 0.02-0.5, 0.1-1, 0.1-0.5, 0.2-0.5, 0.2-1, or 0.5-1.

In certain embodiments, cracked gas from the gas oil steam cracking zone furnaces is quenched in transfer line exchangers by producing, for instance, 1800 psig steam. Quenched gases are stripped with steam in a primary fractionator. Lighter gases are recovered as the overhead product; a side-draw stream contains pyrolysis fuel oil. The primary fractionator bottoms product is pyrolysis tar, which is cooled and sent to product storage. Pyrolysis fuel oil from the primary fractionator is stripped with steam in the pyrolysis fuel oil stripper, which separates pyrolysis gasoline as the overhead and pyrolysis fuel oil as the bottoms product. Gasoline in the primary fractionator overhead is condensed and combined with gasoline from the pyrolysis fuel oil stripper before being sent to a gasoline stabilizer. The gasoline stabilizer removes light products in the overhead, while the stabilizer bottoms are sent to the py-gas hydrotreater. C4 and lighter gases in the primary fractionator overhead are compressed, for instance, in two stages of compression, before entering an absorber, depropanizer and debutanizer.

In certain embodiments, cracked gas from one or more furnaces of both a gas oil steam cracking zone and a steam cracking zone that is part of the reaction/separation zone 1220 are subjected to common steps for quenching, recovery of pyrolysis gasoline, recovery of pyrolysis oil, and recovery of C4 and lighter gases. For instance, in one embodiment, the cracked gas from the furnaces of both steam cracking zones are combined and cooled in transfer line exchangers (quench coolers), for example, producing 1800 psig steam suitable as dilution steam. Quenched cracked gas enters a primary fractionator for removal of pyrolysis fuel oil bottoms from lighter components. The primary fractionator enables efficient recovery of pyrolysis fuel oil. Pyrolysis fuel oil is stripped with steam in a fuel oil stripper to control product vapor pressure and cooled. In addition, secondary quench can be carried out by direct injection of pyrolysis fuel oil as quench oil into liquid furnace effluents. The stripped and cooled pyrolysis fuel oil can be sent to a fuel oil pool or product storage. The primary fractionator overhead is sent to a quench water tower; condensed dilution steam for process water treating, and raw pyrolysis gasoline, are recovered. Quench water tower overhead can be sent to the olefin recovery zone 1230, particularly the first compression stage. Raw pyrolysis gasoline is sent to a gasoline stabilizer to remove any light ends and to control vapor pressure in downstream pyrolysis gasoline processing. A closed-loop dilution steam/process water system is enabled, in which dilution steam is generated using heat recovery from the primary fractionator quench pumparound loops. The primary fractionator enables efficient recovery of pyrolysis fuel oil due to energy integration and pyrolysis fuel oil content in the light fraction stream.

In embodiments that utilize FCC as the reaction/separation zone 1220 or as a unit within the reaction/separation zone 1220 (including the embodiments of FIG. 4A, FIG. 4B and FIG. 4C), the petrochemical production FCC reaction zone operates as a high severity or a low severity FCC process and converts the feedstock(s) including the hydrogenated middle distillate stream 1222 from the DHG zone 1200 and other feeds as described herein into a mixed product stream containing mixed C1-C4 paraffins and olefins, FCC naphtha and cycle oil. Other feeds to petrochemical production FCC operations, as disclosed herein, include straight-run liquids from the crude unit such as straight run naphtha, hydrogenated naphtha obtained from straight run naphtha, wild naphtha, hydrogenated naphtha obtained from wild naphtha, and various other recycle streams from chemical production and recovery areas within the integrated process and system.

Figure 6B:
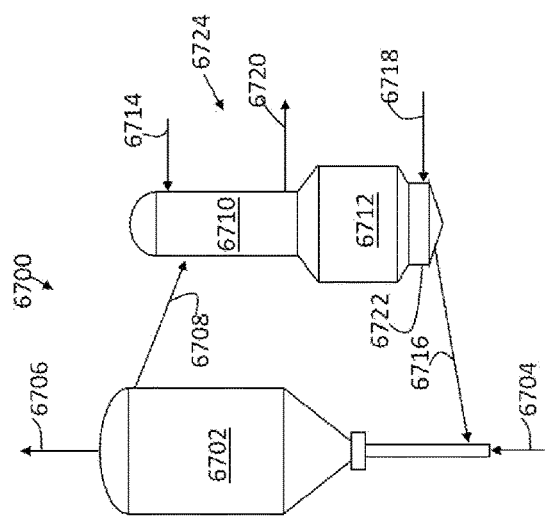
FIGS. 6A and 6B schematically depict FCC operations suitable for petrochemicals production in embodiments herein.
Figure 6A:
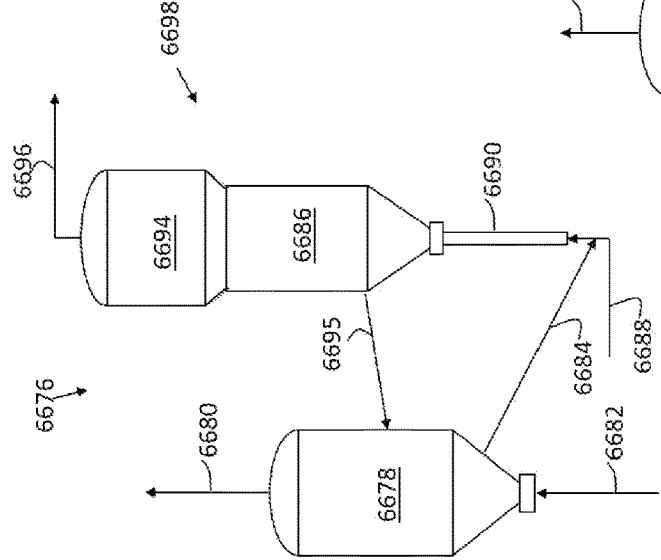

FIG. 6A and FIG. 6B are schematic diagrams of examples of FCC reactors of the petrochemical production FCC unit, which can serve as the reaction/separation zone 1220, or as a petrochemical production FCC unit within the reaction/separation zone 1220. In certain embodiments plural reactors can be implemented to maximize propylene yield and selectivity. There are many commercially available systems, including those for maximizing the propylene production utilizing a fluid catalytic cracking unit. Suitable FCC zones can include, but is not limited to, systems based on technology commercially available from Axens, IFP Group Technologies, FR; Honeywell UOP, US; CN Petroleum & Chemical Corporation (Sinopec), CN; KBR, Inc, US; or Chicago Bridge & Iron Company N.V. (CB&I), NL.

In certain embodiments, an FCC unit configured with a riser reactor is provided that operates under conditions that promote formation of light olefins, particularly propylene, and that minimize light olefin-consuming reactions including hydrogen-transfer reactions. A riser reactor is schematically depicted in FIG. 6A, which can represent a petrochemical production FCC unit that can serve as the reaction/separation zone 1220, or as a petrochemical production FCC unit within the reaction/separation zone 1220.

The riser FCC unit 6676 includes a reactor/separator 6698 having a riser portion 6690, a reaction zone 6686 and a separation zone 6694; and a regeneration vessel 6678 for regenerating spent catalyst. A charge 6688 is introduced to the reaction zone, in certain embodiments accompanied by steam or other suitable gas for atomization of the feed (not shown). The charge 6688, which is as described herein with respect to the petrochemical production complex 1215, is admixed and intimately contacted with an effective quantity of heated fresh or regenerated solid cracking catalyst particles which are conveyed via a conduit 6684 from the regeneration vessel 6678. The feed mixture and the cracking catalyst are contacted under conditions to form a suspension that is introduced into the riser 6690. In a continuous process, the mixture of cracking catalyst and hydrocarbon feedstock proceed upward through the riser 6690 into the reaction zone 6686. In the riser 6690 and reaction zone 6686, the hot cracking catalyst particles catalytically crack relatively large hydrocarbon molecules by carbon-carbon bond cleavage.

During the reaction, as is typical in FCC operations, the cracking catalysts become coked and hence access to the active catalytic sites is limited or nonexistent. Reaction products are separated from the coked catalyst using any suitable configuration known in FCC units, generally referred to as the separation zone 6694 in an FCC unit 6676, for instance, located at the top of the reactor 6698 above the reaction zone 6686. The separation zone can include any suitable apparatus known to those of ordinary skill in the art such as, for example, cyclones. The reaction product is withdrawn through conduit 6696. Catalyst particles containing coke deposits from fluid cracking of the hydrocarbon feedstock pass through a conduit 6695 to the regeneration zone 6678.

In the regeneration zone 6678, the coked catalyst comes into contact with a stream of oxygen-containing gas, such as pure oxygen or air, which enters the regeneration zone 6678 via a conduit 6682. The regeneration zone 6678 is operated in a configuration and under conditions that are known in typical FCC operations. For instance, the regeneration zone 6678 can operate as a fluidized bed to produce regeneration off-gas comprising combustion products which is discharged through a conduit 6680. The hot regenerated catalyst is transferred from the regeneration zone 6678 through the conduit 6684 to the bottom portion of the riser 6690 for admixture with the hydrocarbon feedstock and noted above.

In one embodiment, the operating conditions for the reactor of a suitable riser FCC unit 6676 include:

a reaction temperature (° C.) of from about 480-650, 480-620, 480-600, 500-650, 500-620, or 500-600;

a reaction pressure (barg) of from about 1-20, 1-10, or 1-3;

a contact time (in the reactor, seconds) of from about 0.5-10, 0.5-5, 0.5-2, 1-10, 1-5, or 1-2; and a catalyst-to-feed ratio of about 1:1 to 15:1, 1:1 to 10:1, 1:1 to 20:1, 8:1 to 20:1, 8:1 to 15:1, or 8:1 to 10:1.

In certain embodiments, an FCC unit configured with a downflow reactor is provided that operates under conditions that promote formation of light olefins, particularly propylene, and that minimize light olefin-consuming reactions including hydrogen-transfer reactions. A downflow reactor is schematically depicted in FIG. 6B, which can represent a petrochemical production FCC unit that can serve as the reaction/separation zone 1220, or as a petrochemical production FCC unit within the reaction/separation zone 1220.

A downflow FCC unit 6700 includes a reactor/separator 6724 having a reaction zone 6710 and a separation zone 6712; and a regeneration zone 6702 for regenerating spent catalyst. In particular, a charge 6714, which is as described herein with respect to the petrochemical production complex 1215, is introduced to the reaction zone, in certain embodiments accompanied by steam or other suitable gas for atomization of the feed (not shown). An effective quantity of heated fresh or hot regenerated solid cracking catalyst particles from the regeneration zone 6702 are conveyed to the top of the reaction zone 6710 also transferred, for instance, through a downwardly directed conduit or pipe 6708, commonly referred to as a transfer line or standpipe, to a withdrawal well or hopper (not shown) at the top of reaction zone 6710. Hot catalyst flow is typically allowed to stabilize in order to be uniformly directed into the mix zone or the feed injection portion of the reaction zone 6710. The charge 6714 is injected into a mixing zone through feed injection nozzles typically situated proximate to the point of introduction of the regenerated catalyst into reaction zone 6710. These multiple injection nozzles result in the thorough and uniform mixing of the hot catalyst and the charge 6714, in the integrated process herein hydrotreated gas oil, optionally in combination with atmospheric gas oil such as heavy atmospheric gas oil. Once the charge contacts the hot catalyst, cracking reactions occur.

The reaction vapor of hydrocarbon cracked products, unreacted feed and catalyst mixture quickly flows through the remainder of the reaction zone 6710 and into the rapid separation zone 6712 at the bottom portion of the reactor/separator 6724. Cracked and uncracked hydrocarbons are directed through a conduit or pipe 6720 to a conventional product recovery section known in the art to yield as fluid catalytic cracking products light olefins, gasoline and cycle oil, with a maximized propylene yield. If necessary, for temperature control, a quench injection can be provided near the bottom of the reaction zone 6710 immediately before the separation zone 6712. This quench injection quickly reduces or stops the cracking reactions and can be utilized for controlling cracking severity to achieve the product slate.

The reaction temperature, for instance, the outlet temperature of the downflow reactor, can be controlled by opening and closing a catalyst slide valve (not shown) that controls the flow of hot regenerated catalyst from the regeneration zone 6702 into the top of the reaction zone 6710. The heat required for the endothermic cracking reaction is supplied by the regenerated catalyst.

By changing the flow rate of the hot regenerated catalyst, the operating severity or cracking conditions can be controlled to produce the desired product slate. A stripper 6722 is also provided for separating oil from the catalyst, which is transferred to the regeneration zone 6702. The catalyst from the separation zone 6712 flows to the lower section of the stripper 6722 that includes a catalyst stripping section into which a suitable stripping gas, such as steam, is introduced through streamline 6718. The stripping section is typically provided with several baffles or structured packing (not shown) over which the downwardly flowing catalyst 6716 passes counter-currently to the flowing stripping gas. The upwardly flowing stripping gas, which is typically steam, is used to "strip" or remove any additional hydrocarbons that remain in the catalyst pores or between catalyst particles. The stripped and spent catalyst is transported by lift forces from the combustion air stream 6704 through a lift riser of the regeneration zone 6712. This spent catalyst, which can also be contacted with additional combustion air, undergoes controlled combustion of any accumulated coke. Flue gases are removed from the regenerator via conduit 6706. In the regenerator, the heat produced from the combustion of the by-product coke is transferred to the catalyst raising the temperature required to provide heat for the endothermic cracking reaction in the reaction zone 6710.

In one embodiment, the operating conditions for a suitable FCC unit 6700, for instance for propylene production in a downflow FCC unit, include:

a reaction temperature (° C.) of from about 550-650, 550-630, 550-620, 580-650, 580-630, 580-620, 590-650, 590-630, 590-620;

a reaction pressure (barg) of from about 1-20, 1-10, or 1-3;

a contact time (in the reactor, seconds) of from about 0.1-30, 0.1-10, 0.1-0.7, 0.2-30, 0.2-10, or 0.2-0.7; and a catalyst-to-feed ratio of about 1:1 to 40:1, 1:1 to 30:1, 10:1 to 30:1, or 10:1 to 30:1.

The FCC catalysts used in the process described herein can be conventionally known or future developed catalysts used in FCC processes, such as zeolites, silica-alumina, carbon monoxide burning promoter additives, bottoms cracking additives, light olefin-producing additives and any other catalyst additives routinely used in the fluid catalytic cracking process. In certain embodiments, suitable cracking zeolites in the FCC process include zeolites Y, REY, USY, and RE-USY. For enhanced naphtha cracking potential, a preferred shaped selective catalyst additive can be employed, such as those used in fluid catalytic cracking processes to produce light olefins and increase fluid catalytic cracking gasoline octane is ZSM-5 zeolite crystal or other pentasil type catalyst structure. This shaped selective catalyst additive such as ZSM-5 or other pentasil type catalyst structure can be mixed with the cracking catalyst zeolites and matrix structures in conventional fluid catalytic cracking catalyst and is particularly suitable to maximize and optimize the cracking of the crude oil fractions in the downflow reaction zones. In certain embodiments for olefins production the shaped selective catalyst additive is provided in an amount of about 5-50, 5-25, 10-50 or 10-25 wt % based on the mass of the total catalyst mixture.

Referring to FIG. 7A, FIG. 7B and FIG. 7C, the coking reaction and separation zones integrated herein, and variations thereto apparent to a person having ordinary skill in the art, are effective for thermal cracking of a coker feed. The coking zone can operate in accordance with known cokers used in oil refineries, including more commonly delayed coker units, and in certain arrangements a fluid coking process. In general, coking operations are carbon rejection processes that are used to convert lower value atmospheric or vacuum distillation residue streams to lighter products, thermally cracked hydrocarbon products. Typically, these thermally cracked hydrocarbon products can be hydrotreated and/or subjected to other known treatment processes to produce transportation fuels such as gasoline and diesel, and increments of light products which can be further desulfurized, treated, and/or concentrated to produce petrochemicals Coking of residuum from heavy high sulfur, or sour, crude oils is typically carried out to convert part of the material to more valuable liquid and gas products. Typical coking processes include delayed coking and fluid coking. The treatment of coke varies depending on the type of coking process and the quality of the coke. In certain embodiments, for instance with delayed coking units, resulting coke is removed from drums, and is generally treated as a low value by-product or recovered for various uses depending upon its quality. In a fluid coking unit, coke is removed as particles and a portion is recycled to provide hot surfaces for thermal cracking.

A delayed coking unit and its general process description is shown and schematically illustrated below. The coker feedstream is mixed with steam and the mixture rapidly heated in a coking furnace to a coking temperature, and then fed to a coking drum. The hot mixed coker feedstream is maintained in the coke drum at coking conditions of temperature and pressure where the feed decomposes or cracks to form coke and volatile components. The volatile components are recovered as vapor and transferred to a coking product fractionator. One or more heavy fractions of the coke drum vapors can be condensed, for example by quenching or heat exchange. In certain embodiments the coke drum vapors are contacted with heavy gas oil in the coking unit product fractionator, and heavy fractions form all or part of a recycle oil stream having condensed coking unit product vapors and heavy gas oil. In certain embodiments, heavy gas oil from the coking feed fractionator is added to a flash zone of the fractionator to condense the heaviest components from the coking unit product vapors. Delayed coking units are typically configured with two or more parallel drums and operated in an alternating swing mode if there are two drums, or in a sequentially cyclic operating mode if there are three or more drums. Parallel coking drum trains, with two or more drums per train, are also possible. When the coke drum is full of coke, the feed is switched to another drum, and the full drum is cooled. Liquid and gas streams from the coke drum are passed to a coking product fractionator for recovery. Any hydrocarbon vapors remaining in the coke drum are removed, for instance by steam injection. The coke remaining in the drum is typically cooled with water and then removed from the coke drum by conventional methods, such as by hydraulic and/or mechanical techniques to remove green coke from the drum walls for recovery.

Referring to FIG. 7A, an embodiment of a coking reaction and separation zone 4310, including a coking zone operating as a delayed coker and an associated fractioning zone. In certain embodiments, the products are light gases 7330, coker naphtha 7332, light coker gas oil 7334, heavy coker gas oil 7336 and petroleum coke 7338.

The coking reaction and separation zone 7310 includes a coking furnace 7314, a coking reaction zone 7320 (shown as parallel coking drum 7322 and 7324) and a coking product fractionator 7328. An optional coker feed 7312 and/or a heavy coker gas oil recycle stream 7336 are in fluid communication with an inlet of the coking furnace 7314. A heated feedstream from an outlet of the coking furnace 7314 is in fluid communication with an inlet of the coking reaction zone 7320, and a coker liquid and gas stream 7326 is discharged from an outlet of the coking reaction zone 7320. The outlet discharging the coker liquid and gas stream 7326 is in fluid communication with an inlet of the coking product fractionator 7328. The fractionating zone 7328 includes as inlets one or more feed inlets in fluid communication the coker liquid and gas stream 7326, and one or more outlets discharging naphtha, light olefins products and gas oil range coker products. The coking zone 7310 also includes associated apparatus for removing coke 7338.

The coker feed is charged to the coking furnace 7314 where the contents are rapidly heated to a coking temperature and then fed to the coking drum 7322 or 7324. The coking unit 7310 can be configured with two or more parallel drums 7322 and 7324 and can be operated in a swing mode, such that when one of the drums is filled with coke, the feed is transferred to the empty parallel drum so that accumulated coke 7338 can be recovered from the filled drum.

The coker liquid and gas stream 7326 from the coker drum 7322 or 7324 is passed to the coking product fractionator 7328, which produces light gases 7330, coker naphtha 7332, light coker gas oil 7334, and heavy coker gas oil 7336. In certain embodiments the coker feed stream 7312 is also charged to the coking product fractionator 7328. The gas oil range coker products can be further separated into light coker gas oil and heavy coker gas oil (not shown). The heavy coker gas oil 7336 can be recycled as all or a portion of the coker furnace stream 7314. Any hydrocarbon vapors remaining in the coke drum are removed by steam injection. The coke is cooled with water and then removed from the coke drum using hydraulic and/or mechanical means.

In operation of the delayed coker, the coker feed stream 7312, and heavy coker gas recycle oil steam 7336, are introduced as combined stream 7313 into the coking furnace 7314 for heating to a predetermined temperature or temperature range that is similar to the coking temperature in delayed coking configurations. In typical operations the temperature of the heated coker feedstream is closely monitored and controlled in the furnace utilizing appropriately positioned thermocouples, or other suitable temperature-indicating sensors to avoid or minimize the undesirable formation of coke in the tubes of the furnace. The sensors and control of the heat source, such as open flame heaters, can be automated as is known to those of skill of the art. For example, in known delayed cokers, a fired furnace or heater with horizontal tubes is used to reach thermal cracking temperatures, for instance, in the range of about 425-650, 425-530, 425-510, 425-505, 425-500, 450-650, 450-530, 450-510, 450-505, 450-500, 480-650, 480-530, 480-510, 480-505 or 480-500° C. With a short residence time in the furnace tubes of the coking furnace 7314, and with the addition of steam, coking of the feed material on the furnace tubes is minimized or obviated, and coking is thereby "delayed" until it is discharged into relatively larger coking drums in the coking reaction zone 7320 downstream of the heater. In addition, the necessary heat for coking is provided in the coking furnace 7314.

The flow of the heated coker feedstream from the coking furnace 7314 is directed into one of the coking drums 7322 or 7324 via a feed line by adjustment of an inlet control valve, for instance, a three-way valve. The coking unit process can be conducted as a semi-continuous process by providing at least two vertical coking drums that are operated in swing mode. This allows the flow through the tube furnace to be continuous. The feedstream is switched from one to another of the at least two drums. In a coking unit with two drums, one drum is on-line filling with coke while the other drum is being steam-stripped, cooled, decoked, pressure checked and warmed up. The overhead vapors from the coke drums flow from the drum used for thermal cracking to the fractionating zone in a continuous manner.

The coke drum is maintained at coking conditions of temperature and pressure where the feed decomposes or cracks to form coke and volatile components. The hydrocracker bottom stream, which is rich in hydrogen due to its highly paraffinic and naphthenic nature, serves as a hydrogen donor during these cracking reactions, and advantageously stabilizes radicals during thermal cracking and as a result minimizes coke formation.

The volatile components are recovered as vapor and transferred to the coking unit product fractionator. In certain embodiments, heavy gas oil from the fractionator is added to the flash zone of the fractionator to condense the heaviest components from the coking unit product vapors. The heaviest fraction of the coke drum vapors can be condensed by other techniques, such as heat exchange. In certain embodiments, as in commercial operations, incoming vapors can be contacted with heavy gas oil in the coking unit product fractionator. Conventional heavy recycle oil includes condensed coking unit product vapors and unflashed heavy gas oil.

When a drum 7322 or 7324 contains the predetermined maximum amount of coke, the inlet control valve is adjusted to direct the heated coker feedstream into the other drum

7324 or 7322. Substantially at the same time, a coking drum outlet valve is adjusted so that the liquid and gas products are discharged through the appropriate line as the coker liquid and gas stream 7326 that is passed to the fractionating zone 7328. Any hydrocarbon vapors remaining in the coke drum are typically removed by steam injection. Typically, the coking zone 7310 includes associated apparatus, for instance, hydraulic and/or mechanical cutters, whereby coke is cooled with water and then removed from the coke drum using hydraulic and/or mechanical cutters while that coking drum is temporarily decommissioned. Coke that is subsequently removed from a drum when it is out of service is schematically represented as lines 7338.

The operating temperature (° C.) in the coking drums 7320 can range from about 425-650, 425-510, 425-505, 425-500, 450-650, 450-510, 450-505, 450-500, 485-650, 485-510, 485-505, 485-500, 470-650, 470-510, 470-505 or 470-500. The operating pressure (bars) in the coking drum can be in the range of about 1-20, 1-10, or 1-3, and in certain embodiments is mildly super-atmospheric. In certain embodiments of the process, steam is introduced or injected with the heated residue into the coking furnace, for instance with a steam introduction rate of about 0.1-3, 0.5-3 or 1-3 wt % relative to the heated residue, to increase the velocity in the tube furnace, and to reduce the partial pressure of the feedstock oil in the drum. The steam also serves to increase the amount of gas oil removed from the coke drums. Steam also assists in decoking of the tubes in the event of a brief interruption of the feed flow. The coking in each drum can occur in cycles, for instance, in the range of about 10-30, 10-24, 10-18, 12-30, 12-24, 12-18, 16-30, 16-24 or 16-18 hours.

In certain embodiments, a fluid coking process is used, wherein circulated coke particles contact the feed and in which coking occurs on the surface of the coke particles, for instance similar to a Flexicoking™ process commercially available from ExxonMobil. Referring to FIG. 7B, an embodiment of a coking reaction and separation zone 8340, including a coking zone operating as a fluid coker and an associated fractioning zone, is shown. In certain embodiments, the products are light gases 8330, coker naphtha 8332, light coker gas oil 8334, heavy coker gas oil 8336 and coke 8338.

The coking reaction and separation zone 8340 includes a coking furnace 8344, a coking reaction zone 8346 and a coking product fractionator 8328. In addition, suitable systems are provided to facilitate circulation of coke particles including a coke combusting zone 8350 and a fines separation zone 8354. An option coker feed 8342 and/or heavy coker gas oil 8336 are in fluid communication, as combined stream 8313 with an inlet of the coking furnace 8344. A heated feedstream from an outlet of the coking furnace 8344 is in fluid communication with an inlet of the coking reaction zone 8346, and a coker liquid and gas stream 8356 is discharged from an outlet of the coking reaction zone 8346. The outlet discharging the coker liquid and gas stream 8356 is in fluid communication with an inlet of the coking product fractionator 8328. Light gases 8330, coker naphtha 8332, light coker gas oil 8334, and heavy coker gas oil 8336 are discharged from outlets of the coking product fractionator 8358. In some embodiments, the heavy coker gas oil 8336 can be recycled to before the furnace as all or a portion of combined stream 8313.

The coker feed is charged to a coking furnace 8344 where the contents are rapidly heated to a coking temperature and then fed to a coking drum 8346. The coking reaction zone 8346 includes a reactor having one or more inlets that receive a heated feedstream by spraying or other suitable means of injection. A portion of the coke effluent 8348, in particle form, is discharged via one or more outlets, and is in fluid or particulate communication with the coke combusting zone 8356. Heated coke 8352 is discharged from one or more outlets of the coke combusting zone 8350, and is in fluid or particulate communication with one or more inlets of the coking drum 8346. The coker liquid and gas products are recovered as the coker liquid and gas stream 8356 from one or more outlets of the coking drum 8346, generally through a fines separation zone 8354 for recovery of fine coke particles. The coker liquid and gas stream 8356 is passed to the coking product fractionator 8328.

In operation of the fluid coking unit, the coker feedstream(s) and steam are introduced into the coking furnace 8344 for heating to a predetermined temperature or temperature range, for instance, typically at about the coking temperature. For example, a fired furnace or heater with horizontal tubes is used to reach temperature levels that are at or below thermal cracking temperatures, for instance, in the range (° C.) of about 425-650, 425-570, 425-525, 450-650, 450-570, 450-525, 485-650, 485-570 or 485-525. With a short residence time in the furnace tubes of the coking furnace 8344, and with the addition of steam, coking of the feed material on the furnace tubes is minimized or obviated. In the fluid coking unit, coking occurs on coke particles in the coker reactor 8346. Further, additional heat for coking is provided by recirculating combusted heated coke particles 8352 in the coking drum 8346.

All or a portion of the coke product 8338 is burned to provide additional heat for coking reactions to the feed into gases, distillate liquids, and coke. Coking occurs on the surface of circulating coke particles of coke. Coke is heated by burning the surface layers of accumulated coke in the coke combustion zone 8350, by partial combustion of coke produced. The products of coking are sent to the fractionating zone after recovery of fine coke particles in the separation zone 8354. Steam can also be added at the bottom of the reactor (not shown), for instance, in a scrubber to add fluidization and to strip heavy liquids sticking to the surface of coke particles before they are sent to the burner. Coke is deposited in layers on the fluidized coke particles in the reactor. Air is injected into the burner for combustion to burn a portion of the coke produced in the reactor. A portion of the combusted particles are returned to the reactor, heated coke 8352, and the remainder is drawn out as coke 8338.

The operating temperature (° C.) in the coking drum 8346 can range from about 450-760, 450-650, 450-570, 470-760, 470-650, 470-570, 510-760, 510-650 or 510-570. The operating pressure (bars) can be in the range of about 1-20, 1-10 or 1-3, and in certain embodiments is mildly super-atmospheric. In certain embodiments of the process, steam is introduced or injected with the heated residue into the coking furnace, for instance in an amount of about 0.1-3, 0.5-3 or 1-3 wt %.

In certain embodiments, a coking and separation zone is provided with units similar to those shown in FIG. 7A or FIG. 7B, with additional material to assist in the process. Referring to FIG. 7C, a coking and separation zone 9370 is shown operating as a delayed coker or a fluid coker. The coking and separation zone 9370 generally includes a coking drum or vessel 9380 that discharges a coker liquid and gas stream 9382 and coke 9338, for instance removed as in the above descriptions from a delayed coker or as fluidized particles; a coking fractionator 9328 that discharges light gases 9330, coker naphtha 9332, and light coker gas oil 9334, and heavy coker gas oil 9336; and a coking furnace

9376 that receives the an optional initial feedstream 9372 and/or heavy coker gas oil stream 9336, as combined stream 9313. A source of additional material 9374 is provided in fluid or particulate communication with the coking drum 9380 inlet, for instance, via the initial feedstream. While schematically shown upstream of the coking furnace 9376, the additional material 9374 can be added downstream of the coking furnace. In embodiments in which there is a coker recycle stream from the coking fractionator 9328 to the coking drum or vessel 9380, the source of additional material can be integrated in the fractionator so that the coker recycle stream contains catalyst material. The additional material 9374 can be added to the coker feed, or admixed with use of a separate mixing zone, such as an in-line mixing apparatus or a separate mixing apparatus (not shown). In certain embodiments (not shown), additional material 9374 can be metered or otherwise charged directly to the coking drum or vessel 9380.

In embodiments in which additional material is catalyst material, suitable catalysts include those having functionality to stabilize the free radicals formed by thermal cracking and to thereby enhance thermal cracking reactions. The catalyst material can be in homogeneous oil-soluble form, heterogeneous supported catalysts, or a combination thereof.

In certain embodiments, the additional material 9374 is a heterogeneous catalyst material that can be added to the fractionator bottoms prior coking. Suitable heterogeneous catalyst materials include active metals deposited or otherwise incorporated on a support material. The heterogeneous catalyst materials used in embodiments herein are generally granular in nature, and the support material can be selected from the group consisting of silica, alumina, silica-alumina, titania-silica, molecular sieves, silica gel, activated carbon, activated alumina, silica-alumina gel, zinc oxide, clays (for instance, attapulgus clay), fresh catalyst materials (including zeolitic catalytic materials), used catalyst materials (including zeolitic catalytic materials), regenerated catalyst materials (including zeolitic catalytic materials) and combinations thereof. The active metals of the heterogeneous catalyst material include one or more active metal components of metals or metal compounds (oxides or sulfides) selected from the Periodic Table of the Elements IUPAC Groups 4, 5, 6, 7, 8, 9 and 10. In certain embodiments, the active metal component can be one or more metals or metal compounds (oxides or sulfides) including Mo, V, W, Cr or Fe. In certain embodiments the active metal component can be selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethyl hexanoate, molybdenum di-thiocarboxylate, nickel naphthenate and iron naphthenate. In certain embodiments, Mo and Mo compounds are used as the active metal component of a heterogenous catalyst material. The heterogeneous catalyst material is provided in particulate form of suitable dimension, such as granules, extrudates, tablets, or pellets, and may be formed into various shapes such as spheres, cylinders, trilobes, quadrilobes or natural shapes, possess average particle diameters (mm) of about 0.01-4.0, 0.1-4.0, or 0.2-4.0, pore sizes (nm) of about 1-5,000 or 5-5,000, possess pore volumes (cc/g) of about 0.08-1.2, 0.3-1.2 or 0.5-1.2, in certain embodiments at least 1.0, and possess a surface area of at least about 100 m$^2$/g.

In embodiments in which additional material 9374 is heterogeneous catalyst material, it can be added upstream of the coking furnace, or in an optional embodiment, downstream of the furnace. A mixing zone can be used to mix the catalyst and coker feed. In addition, as catalyst material can be metered or otherwise charged directly to the coking drum or vessel 9380, or metered or otherwise charged directly to the fractionating zone 9384, as noted herein. In embodiments in which heterogeneous catalyst is used, the amount (ppmw) can be about 1-20,000, 10-20,000, 100-20,000, 1-10,000, 10-10,000, 100-10,000, 1-5,000, 10-5,000, 100-5,000, 1-1,000, 10-1,000 or 100-1,000 relative to the weight of the total coker feedstream (stream 9372), and can be determined as is known in the art, for instance based upon factors including the characteristics of the crude oil and its residue, the type of catalyst used and the coking unit operating conditions.

In certain embodiments, a homogenous catalyst is used. For instance, effective homogeneous catalysts include those that are oil-soluble and contain one or more active metal components of metals or metal compounds (oxides, sulfides, or salts of organo-metal complexes) selected from the Periodic Table of the Elements IUPAC Groups 4, 5, 6, 7, 8, 9 and 10. In certain embodiments, homogeneous catalysts are or contain as an active metal component a transition metal-based compound derived from an organic acid salt or an organo-metal compound containing Mo, V, W, Cr or Fe. In certain embodiments homogeneous catalysts can be, or contain an active metal compound, that is selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethyl hexanoate, molybdenum di-thiocarboxylate, nickel naphthenate and iron naphthenate. In certain embodiments, Mo and Mo compounds are used as homogenous catalyst material. The total concentration (ppmw, based on the total feedstock weight) of the catalyst material can be in the range of 100-20,000, 300-20,000, 500-20,000, 1,000-20,000, 100-5,000, 300-5,000, 500-5,000, 1,000-5,000, 100-1,500, 300-1,500, 500-1,500, 1,000-1,500, 100-1,200, 300-1,200 or 500-1,200.

The homogeneous catalyst can be added upstream of the coking furnace, or in an optional embodiment, downstream of the furnace. Since the catalyst is homogeneous and oil-soluble, it can be added directly to the coking zone or in certain embodiments to the fractionator. If the homogeneous catalyst is prepared from metal oxides or conditioned before use, a separate step is carried for catalyst preparation as is known in the art. The amount of catalyst material (ppmw) can range from 1-10,000, 10-10,000, 100-10,000, 1-5,000, 10-5,000, 100-5,000, 1-1,000, 10-1,000, 100-1,000, 1-100 or 10-100 relative to the weight of the total coker feedstream (stream 9372), and can be determined as is known in the art, for instance based upon factors including the characteristics of the crude oil and its residue, the type of catalyst used and the coking unit operating conditions.

In certain embodiments, the additional material used, alone or in combination with one or more types of catalyst materials, comprises adsorbent material. In this regard, the disclosure of commonly owned U.S. Pat. Nos. 9,023,192 and 9,234,146 are relevant and are incorporated by reference herein in their entireties. For example, adsorbent material is admixed with the coker feedstream(s) in a mixing zone, such as an in-line mixing apparatus or a mixer, to form a slurry of the coker feedstream(s) and adsorbent material. In certain optional embodiments, a source of catalyst material is provided along with the adsorbent material in fluid or solid communication with the coking drum or vessel 9380 inlet. The optional catalyst material can be admixed in the same manner as the adsorbent material, or in a different manner. In embodiments in which optional catalyst material is used, the types and quantities of catalyst described herein for use in coking operations are applicable.

The adsorbent material and/or heterogeneous catalyst material can be admixed with the coker feedstream(s) with or without a dedicated mixing zone. Other embodiments that are not shown are also possible. The adsorbent material and/or heterogeneous catalyst material can be metered or otherwise charged separately to the coking drum or vessel 9380, whereby a source of material is provided in particulate communication or fluid communication (in which the material is formed in a slurry) with the coking drum or vessel 9380 inlet. In further embodiments, the fractionating zone is configured for handling of adsorbent material and/or heterogeneous catalyst material, whereby a source of material is provided in particulate communication or fluid communication (in which the adsorbent material is formed in a slurry) with the fractionating zone 9328. The adsorbent material and/or heterogeneous catalyst material is metered or otherwise charged directly to the fractionating zone 9328 so that a coker recycle stream contains the adsorbent material and/or heterogeneous catalyst material, for instance similar to the process that is disclosed in commonly owned U.S. Pat. No. 9,023,192B2, which is incorporated by reference herein in its entirety. Coke 9338, which contains adsorbent material that has adsorbed undesirable contaminants and/or heterogeneous catalyst material, is recovered from the coking drum or vessel 9380.

The use of adsorbent material increases the quality of the thermally cracked distillates by removing some of the undesirable contaminants, for instance by selectively adsorbing sulfur- and/or nitrogen-containing compounds. Handling of adsorbent material that has adsorbed undesirable contaminants, and/or heterogeneous catalyst material, largely depends on the type of coker unit deployed. For instance, in delayed coker units, the adsorbent material and/or heterogeneous catalyst material is deposited with the coke on the inside surface of the coking drum(s). In a fluid coking process, the adsorbent material and/or heterogeneous catalyst material can pass with the coke particles that are discharged.

Effective adsorbent materials are selected from the group consisting of silica, alumina, silica-alumina, titania-silica, molecular sieves, silica gel, activated carbon, activated alumina, silica-alumina gel, zinc oxide, clays (for instance, attapulgus clay), fresh catalyst materials (including zeolitic catalytic materials), spent catalyst materials (including zeolitic catalytic materials), regenerated catalyst materials (including zeolitic catalytic materials), and combinations thereof. In certain embodiments adsorbent material comprises activated carbon, clays, or mixtures thereof, The material is provided in particulate form of suitable dimension, such as granules, extrudates, tablets, or pellets, and may be formed into various shapes such as spheres, cylinders, trilobes, quadrilobes or natural shapes, possess average particle diameters (mm) of about 0.01-4.0, 0.1-4.0, or 0.2-4.0, pore sizes (nm) of about 1-5,000 or 5-5,000, possess pore volumes (cc/g) of about 0.08-1.2, 0.3-1.2 or 0.5-1.2, in certain embodiments at least 1.0, and possess a surface area of at least about 100 $m^2/g$. The quantity (weight basis, hydrocarbon to adsorbent) of the solid adsorbent material used in the embodiments herein is about 1000:1-3:1, 200:1-3-1, 100:1-3:1, 50:1-3:1, 20:1-3:1, 1000:1-3:1, 200:1-8:1, 100:1-8:1, 50:1-8:1, 20:1-8:1, 1000:1-3:1, 200:1-10:1, 100:1-10:1, 50:1-10:1 or 20:1-10:1.

The fractionating zone, such as 7328, 8328 or 9328 described herein, includes design features to enable separation of cracker products from the coking drums/vessels, including the a coker distillate stream, the coker gas oil stream, and in certain embodiments a coker recycle stream. Components of the fractionating zone that are not shown but which are well-known can include feed/product and pump-around heat exchangers, charge heater(s), product strippers, cooling systems, hot and cold overhead drum systems including re-contactors and off-gas compressors, and units for water washing of overhead condensing systems. Steam is typically injected to prevent cracking of heated feed. In certain embodiments, one or more flash vessels can be used as the fractionating zone. For instance, a first flash vessel can separate gases, and in certain embodiments all or a portion of a coker distillate stream, and a second flash vessel to separate a coker gas oil stream and the hydroprocessing feed and the coker recycle stream. In certain embodiments, in which a source of additional material is used and is integrated in the fractionator so that the coker recycle stream contains the additional material, the fractionator includes appropriate design features.

The feeds to the fractionating zone, the coker liquid and gas stream 7326, 8356 or 9382, can be introduced at different locations in the columns as is known. The effluents shown in the figures include the coker naphtha streams 7332, 9332 or 9332, light gases stream 7330, 8330 or 6330, light gas oil range coker products 7334, 8334, or 9334, and heavy gas oil range coker products 7336, 8336 or 9336.

With reference back to FIG. 1 and FIG. 2, mixed gases 1224 from the reaction/separation zone 1220 (and in certain embodiments mixed gases from an optional gas oil cracking zone) are routed to the olefin recovery zone 1230. For instance, light products from the quenching step, C4-, H2 and H2S, are contained in the mixed product stream that is routed to the olefin recovery zone 1230. Products include: fuel gas 1234 that is passed to a fuel gas system; ethane 1242; ethylene 1236 that is recovered as product; a mixed C3 stream 1238 that is passed to a methyl acetylene/propadiene saturation and propylene recovery zone 1244; and a mixed C4 stream 1240 that is passed to a butadiene extraction zone 1250. In embodiments using steam cracking for petrochemical production, a hydrogen stream 1232 is separately recovered, which can be used for recycle and/or passed to users within the integrated system. In embodiments using FCC for petrochemical production, hydrogen in the reaction effluents is typically passed with fuel gas. In embodiments integrating steam cracking, ethane 1242 can be recycled as additional feed.

The olefin recovery zone 1230 operates to produce on-specification light olefin (ethylene and propylene) products from the mixed product stream. For instance, cooled gas intermediate products from the reaction/separation zone 1220 is fed to a cracked gas compressor, caustic wash zone, and one or more separation trains for separating products by distillation. In certain embodiments two trains are provided. The distillation train includes a cold distillation section, wherein lighter products such as methane, hydrogen, ethylene, and ethane are separated in a cryogenic distillation/separation operation. A mixed C2 stream from the reaction/separation zone 1220 contains acetylenes that are hydrogenated to produce ethylene in an acetylene selective hydrogenation unit. This system can also include ethylene, propane and/or propylene refrigeration facilities to enable cryogenic distillation.

In one embodiment, the mixed gas product stream 1224 from the reaction/separation zone 1220 is passed through three to five stages of compression. Acid gases are removed with caustic in a caustic wash tower. After an additional stage of compression and drying, light cracked gases are chilled and routed to a depropanizer. In certain embodiments light cracked gases are chilled with a cascaded two-level refrigeration system (propylene, mixed binary refrigerant) for cryogenic separation. A front-end depropanizer optimizes the chilling train and demethanizer loading. The depropanizer separates C3 and lighter cracked gases as an overhead stream, with C4s and heavier hydrocarbons as the bottoms stream. The depropanizer bottoms are routed to the debutanizer, which recovers a crude C4s stream 1240 and any trace light liquid hydrocarbons, for instance via a knock-out vessel.

The depropanizer overhead passes through a series of acetylene conversion reactors, and is then fed to the demethanizer chilling train, which separates a hydrogen-rich product via a hydrogen purification system, such as pressure swing adsorption. Front-end acetylene hydrogenation is implemented to optimize temperature control, minimize green oil formation and simplify ethylene product recovery by eliminating a C2 splitter pasteurization section that is otherwise typically included in product recovery. In addition, hydrogen purification via pressure swing adsorption eliminates the need for a methanation reactor that is otherwise typically included in product recovery.

The demethanizer recovers methane in the overhead for fuel gas, and C2 and heavier gases in the demethanizer bottoms are routed to the deethanizer. The deethanizer separates ethane and ethylene overhead which feeds a C2 splitter. The C2 splitter recovers ethylene product 1236, in certain embodiments polymer-grade ethylene product, in the overhead. Ethane 1242 from the C2 splitter bottoms can be recycled to the reaction/separation zone 1220 in embodiments in which steam cracking is used. can be recycled to the reaction/separation zone 1220 in embodiments in which steam cracking is used. Deethanizer bottoms contain C3s from which propylene product 1248, in certain embodiments polymer-grade propylene product, is recovered as the overhead of a C3 splitter, and propane 1246 from the C3 splitter bottoms can be recycled to the reaction/separation zone 1220 in embodiments in which steam cracking is used.

A methyl acetylene/propadiene (MAPD) saturation and propylene recovery zone 1244 is provided for selective hydrogenation to convert methyl acetylene/propadiene, and to recover propylene from a mixed C3 stream 1238 from the olefin recovery zone 1230. The mixed C3 stream 1238 from the olefin recovery zone 1230 contains a sizeable quantity of propadiene and propylene. The methyl acetylene/propadiene saturation and propylene recovery zone 1244 enables production of propylene 1248, which can be polymer-grade propylene in certain embodiments.

The methyl acetylene/propadiene saturation and propylene recovery zone 1244 receives hydrogen and mixed C3 1238 from the olefin recovery zone 1230. Products from the methyl acetylene/propadiene saturation and propylene recovery zone 1244 are propylene 1248 which is recovered, and the recycle C3 stream 1246 that can be recycled to the reaction/separation zone 1220 in embodiments in which steam cracking is used. In certain embodiments, hydrogen used to saturate methyl acetylene and propadiene is derived from hydrogen 1232 obtained from the olefin recovery zone 1230.

A stream 1240 containing a mixture of C4s, known as crude C4s, from the olefin recovery zone 1230, is routed to a butadiene extraction zone 1250 to recover a high purity 1,3-butadiene product 1252 from the mixed crude C4s. In certain embodiments (not shown), a step of hydrogenation of the mixed C4 before the butadiene extraction zone 1250 can be integrated to remove acetylenic compounds, for instance, with a suitable catalytic hydrogenation process using a fixed bed reactor. 1,3-butadiene 1252 is recovered from the hydrogenated mixed C4 stream by extractive distillation using, for instance, n-methyl-pyrrolidone (NMP) or dimethylformamide (DMF) as solvent. The butadiene extraction zone 1250 also produces a raffinate stream 1254 containing butane/butene, which is passed to the MTBE zone 1256.

In one embodiment, in operation of the butadiene extraction zone 1250, the stream 1240 is preheated and vaporized into a first extractive distillation column, for instance having two sections. NMP or DMF solvent separates the 1,3-butadiene from the other C4 components contained in stream 1254. Rich solvent is flashed with vapor to a second extractive distillation column that produces a high purity 1,3-butadiene stream as an overhead product. Liquid solvent from the flash and the second distillation column bottoms are routed to a primary solvent recovery column. Bottoms liquid is circulated back to the extractor and overhead liquid is passed to a secondary solvent recovery or solvent polishing column. Vapor overhead from the recovery columns combines with recycle butadiene product into the bottom of the extractor to increase concentration of 1,3-butadiene. The 1,3-butadiene product 1252 can be water washed to remove any trace solvent. In certain embodiments, the product purity (wt %) is 97-99.8, 97.5-99.7 or 98-99.6 of 1,3-butadiene; and 94-99, 94.5-98.5 or 95-98 of the 1,3-butadiene content (wt %) of the feed is recovered. In addition to the solvent such as DMF, additive chemicals are blended with the solvent to enhance butadiene recovery. In addition, the extractive distillation column and primary solvent recovery columns are reboiled using high pressure steam (for instance, 600 psig) and circulating hot oil from another source as heat exchange fluid.

The MTBE zone 1256 can be integrated to produce methyl tertiary butyl ether 1262 and a second C4 raffinate 1260 from the first C4 raffinate stream 1254. In certain embodiments C4 Raffinate 1254 is subjected to selective hydrogenation to selectively hydrogenate any remaining dienes and prior to reacting isobutenes with methanol to produce methyl tertiary butyl ether.

Purity specifications for recovery of a 1-butene product stream 1268 necessitate that the level of isobutylene in the second C4 raffinate 1260 be reduced. In general, the first C4 raffinate stream 1254 containing mixed butanes and butenes, and including isobutylene, is passed to the MTBE zone 1256. Methanol 1258 is also added, which reacts with isobutylene and produces methyl tertiary butyl ether 1262. For instance, methyl tertiary butyl ether product and methanol are separated in a series of fractionators, and routed to a second reaction stage. Methanol is removed with water wash and a final fractionation stage. Recovered methanol is recycled to the fixed bed downflow dehydrogenation reactors. In certain embodiments, additional isobutylene can be introduced to the MTBE zone 1256, for instance, derived from a metathesis conversion unit.

In operation of one embodiment of the MTBE zone 1256, the raffinate stream 1254, contains 35-45%, 37-42.5%, 38-41% or 39-40% isobutylene by weight. This component is removed from the C4 raffinate 1260 to attain requisite purity specifications, for instance, greater than or equal to 98 wt % for the 1-butene product stream 1268 from the C4 separation zone 1266. Methanol 1258, in certain embodiments high purity methanol having a purity level of greater than or equal to 98 wt % from outside battery limits, and the isobutylene contained in the raffinate stream 1254 and in certain embodiments isobutylene from an optional metathesis step, react in a primary reactor. In certain embodiments the primary reactor is a fixed bed downflow dehydrogenation reactor and operates for isobutylene conversion in the range of about 70-95%, 75-95%, 85-95% or 90-95% on a weight basis. Effluent from the primary reactor is routed to a reaction column where reactions are completed. In certain embodiments, exothermic heat of the reaction column and the primary reactor can optionally be used to supplement the column reboiler along with provided steam. The reaction column bottoms stream contains methyl tertiary butyl ether, trace amounts, for instance, less than 2%, of unreacted methanol, and heavy products produced in the primary reactor and reaction column. Reaction column overhead contains unreacted methanol and non-reactive C4 raffinate. This stream is water washed to remove unreacted methanol and is passed to the C4 separation zone 1266 as the C4 raffinate 1260. Recovered methanol is removed from the wash water in a methanol recovery column and recycled to the primary reactor.

The C4 raffinate stream 1260 from the MTBE zone 1256 is passed to the C4 separation zone 1266 for butene-1 recovery. In certain embodiments, upstream of the MTBE zone 1256, or between the MTBE zone 1256 and the C4 separation zone 1266 for butene-1 recovery, a selective hydrogenation zone can also be included (not shown). For instance, in certain embodiments, raffinate from the MTBE zone 1256 is selectively hydrogenated in a selective hydrogenation unit to produce butene-1. Other co-monomers and paraffins are also co-produced. The selective hydrogenation zone operates in the presence of an effective amount of hydrogen obtained from recycle within the selective hydrogenation zone and make-up hydrogen. In certain modes of operation including steam cracking, hydrogen that is recovered from petrochemical production complex 1215, such as a hydrogen stream 1232 from the olefin recovery train 1230, or hydrogen from another integrated steam cracking unit (not shown), can provide all or a portion of the make-up hydrogen for the selective hydrogenation zone to produce butene-1.

For selective recovery of a 1-butene product stream 1268, and to recover a recycle stream 1264 that can be recycled to the reaction/separation zone 1220 in embodiments in which steam cracking is used, and/or in certain embodiments described herein routed to a metathesis zone, one or more separation steps are used. For example, 1-butene can be recovered using two separation columns, where the first column recovers olefins from the paraffins and the second column separates 1-butene from the mixture including 2-butene, which is blended with the paraffins from the first column as stream 1264.

In certain embodiments, the C4 raffinate stream 1260 from the MTBE zone 1256 is passed to a first splitter, from which isobutane, 1-butene, and n-butane are separated from heavier C4 components. Isobutane, 1-butene, and n-butane are recovered as overhead, condensed in an air cooler and sent to a second splitter. Bottoms from the first splitter, which contains primarily cis- and trans-2-butene can be added to the recycle stream 1264, or in certain embodiments described herein passed to a metathesis unit. In certain arrangements, the first splitter overhead enters the mid-point of the second splitter. Isobutane product can optionally be recovered in an overhead stream, 1-butene product 1268 is recovered as a sidecut, and n-butane is recovered as the bottoms stream. Bottoms from both splitters are recovered as all or a portion of recycle stream 1264.

All or a portion of the light liquid hydrocarbon stream 1226 and optionally all or a portion of the intermediate liquid hydrocarbon stream 1227 (pyrolysis gasoline or pyrolysis gasoline and light pyrolysis oil, and/or FCC naphtha or FCC naphtha and light cycle oil) can be subjected to treatment to form gasoline blending components. Optionally the liquid hydrocarbon stream(s) 1226 and/or 1227 can be subjected to hydrotreating and aromatics extraction for recovery of aromatics, as disclosed in commonly owned US Patent Publication Numbers US20180223197A1 and US20180155642A1, and U.S. Pat. Nos. 10,472,579B2, 10,472,580B2, 10,487,276B2, 10,487,275B2, 10,407,630B2, 10,472,574B2 and 10,619,112B2, which are incorporated by reference herein. In further embodiments, all or a portion of the light liquid hydrocarbon stream 1226 (pyrolysis gasoline and/or FCC naphtha) can be subjected to naphtha hydrogenation in the naphtha hydrogenation zone 1204. In certain embodiments, all or a portion of the intermediate liquid hydrocarbon stream 1227 (light pyrolysis oil and/or light cycle oil) can be used as feedstock for the DHG zone 1200.

For example, as shown in dashed lines as optional, all, a substantial portion or a significant portion of the light liquid hydrocarbon stream 1226 is routed to a hydrotreatment and recovery center 1270/1272. In certain embodiments, select hydrocarbons having 5-12 carbons are recovered from an untreated light liquid hydrocarbon stream 1226 and the remainder is subsequently hydrotreated for aromatics recovery. Hydrotreating of the light liquid hydrocarbon stream 1226 removes heteroatoms including organosulfur and organonitrogen compounds, and also saturates diolefins and olefins in the stream. The light liquid hydrocarbon stream 1226 (in certain embodiments having C5s removed can be recycled to the reaction/separation zone 1220, instead of or in conjunction with C5s from the aromatics extraction zone 1272) is routed to the aromatics extraction zone 1272. The hydrotreating zone 1270 and the aromatics extraction zone 1272 are shown for simplicity in a single schematic block in the figures herein.

The aromatics extraction zone 1272 includes, for instance, one or more extractive distillation units, and operates to separate the hydrotreated light liquid hydrocarbon stream 1226 into an aromatics stream 1274 containing high-purity benzene, toluene, xylenes and C9 aromatics, which are recovered for chemical markets. C5 raffinate 1282 and non-aromatics 1280 (for instance, C6-C9) are can be recycled to the reaction/separation zone 1220. A heavy aromatics stream 1278 (for instance, C10-C12) can be used as an aromatic solvent, an octane boosting additive or as a cutter stock into a fuel oil pool, as a feed to the DHT zone 1150, as a feed to the VGOHP zone 1160/1170, feed to the VRC zone 1180, or as a feed to the coking zone 1300. In certain embodiments ethylbenzene 1276 can be recovered.

A heavy liquid hydrocarbon stream 1228 (pyrolysis oil or heavy pyrolysis oil, and/or cycle oil or heavy cycle oil) can be blended into a fuel oil pool as a low sulfur component, used as a feed to the coking zone 1300, and/or used as carbon black feedstock. In certain embodiments, all or a portion of the pyrolysis oil or cycle oil can be fractioned into light and heavy fractions (light pyrolysis oil/heavy pyrolysis oil or light cycle oil/heavy cycle oil). For instance, light fractions can be blended with one or more of the middle distillate streams, so that 0-100% of the light fractions derived from the heavy liquid hydrocarbon stream 1228 is processed in the DHT zone 1150, and/or the VGOHP zone 1160/1170. Heavy fractions can be blended into the fuel oil pool as a low sulfur component, and/or used as a carbon black feedstock. In further embodiments, 0-100% of light fractions and/or 0-100% of heavy fractions derived from the light fractions derived from the heavy liquid hydrocarbon stream 1228 can be processed in the optional VRC zone 1180. In certain embodiments, all, a substantial portion, a significant portion or a major portion of light fractions can be passed to the VRC zone 1180; any remainder can be routed to the DHT zone 1150 and/or the VGOHP zone 1160/1170 and/or the fuel oil pool. In further embodiments, all or a portion of light fractions, such as light cycle oil and/or light pyrolysis oil, can be subjected to further treatment including partial hydrocracking. Such fractions can contain up to 80 wt % of aromatics with two or more rings, for example diaromatics, and a suitable partial hydrocracking process operable to hydrogenated and cracked one ring of the diaromatics and leaving monoaromatic hydrocarbon molecules. In certain embodiments, all or a portion of the heavy liquid hydrocarbon stream 1228, all or a portion of heavy pyrolysis oil and/or all or a portion of heavy cycle oil can be passed to an integrated gasification zone 1440.

In certain embodiments of the processes herein that all or a portion of light cycle oil or light pyrolysis oil from the reaction/separation zone 1220 is passed to the DHG zone 1200. If necessary, all or a portion of the light cycle oil or light pyrolysis oil from the reaction/separation zone 1220 can be subjected to treatment to remove sulfur, nitrogen and/or other heteroatoms prior to deep hydrogenation; the additional treatment of light cycle oil can comprise a dedicated treatment unit or step, or one or more of the units or steps within the integrated process and system such as the VGOHP zone 1160/1170 or the DHT zone 1150. In certain embodiments, since the feed to the DHG zone 1200 is hydrotreated, the charge to the reaction/separation zone 1220 has a sufficiently low content of sulfur, nitrogen and/or other heteroatoms, and accordingly light cycle oil or light pyrolysis oil from the reaction/separation zone 1220 can be recycled to the DHG zone 1200 without hydrotreating.

In certain embodiments compression of C4 and lighter gases from the one or more units within the reaction/separation zone 1220 (including a steam cracking zone that is part of the reaction/separation zone 1220 in embodiments in which steam cracking is used alone or in combination with an FCC unit, and an optional gas oil steam reaction zone) can be carried out in a common step. Such common processing reduces capital and operating costs associated with compression, thereby increasing efficiencies in the integrated process herein. In further embodiments in which an FCC unit is integrated as part of the petrochemical production complex, C4 and lighter gas streams from the FCC reaction zone can be treated together with C4 and lighter gas streams from one or both of the steam cracking zones, for instance in a common olefin recovery zone such as the olefin recovery zone 1230. In certain embodiments, an unsaturated gas plant can also be integrated.

As disclosed herein, a solvent deasphalting zone 1410 can be integrated, alone or in combination with other optional units herein for processing residue fractions. Solvent deasphalting is a physical separation process wherein the components of the feed are recovered in their original state (without promotion of reactions to convert the feed). Typically, a paraffinic solvent with carbon number ranging 3-8 is used to separate the components in the heavy crude oil fractions. Solvent deasphalting is a flexible process typically utilized to separate atmospheric and vacuum heavy residues into two products, deasphalted oil ("DAO") and asphalt. The solvent composition, operating temperature and solvent-to-oil ratio are selected to achieve the desired split between the lighter DAO and heavy asphaltenes products. As the molecular weight of the solvent increases, so does the solubility of the charge. For example solvents most often used for production of lube oil bright stock are propane or a blend of propane and iso-butane. For applications where the DAO is sent to conversion processes such as fluid catalytic cracking, the solvent with higher carbon number such as butane or pentane, or mixtures thereof is selected. Typical uses for DAO include lube bright stock, lube hydrocracker feed, fuels hydrocracker feed, fluid catalytic cracker feed or fuel oil blending. Depending on the operation, the asphalt product may be suitable for use as a blending component for various grades of asphalt, as a fuel oil blending component, or as feedstock to a heavy oil conversion unit such as a coker or ebullated bed residue hydrocracker or gasification. Conventional solvent deasphalting is carried out with no catalyst or adsorbent. Commonly owned U.S. Pat. No. 7,566,394B2, entitled "Enhanced Solvent Deasphalting Process for Heavy Hydrocarbon Feedstocks Utilizing Solid Adsorbent," which is incorporated by reference herein in its entirety, employs solid adsorbents to increase the quality of DAO by separating poly-nuclear aromatics from DAO during the process. In embodiments in which adsorbent material is used to enhance deasphalting, similar to the process and system described in U.S. Pat. No. 7,566,394B2, adsorbent material is added to the feed or to a first separation zone, wherein a primary asphalt phase that forms all or part of the asphalt stream 1414 contains the adsorbent material; in these embodiments all or a portion of the asphalt stream 1414 can be passed to the gasification zone 1414, in particular using membrane wall type gasifiers. In other embodiments, adsorbent material can be added to the DAO product after a second separation zone, and spent adsorbent material can be passed to the gasification zone 1414 using membrane wall type gasifiers.

Two stage solvent deasphalting operations are well-known processes in which suitable solvent is used to precipitate asphaltenes from the feed. In general, in a solvent deasphalting zone, a feed is mixed with solvent so that the deasphalted oil is solubilized in the solvent. The insoluble pitch precipitates out of the mixed solution. Separation of the DAO phase (solvent-DAO mixture) and the asphalt/pitch phase typically occurs in one or more vessels or extractors designed to efficiently separate the two phases and minimize contaminant entrainment in the DAO phase. The DAO phase is then heated to conditions at which the solvent becomes supercritical. In typical solvent deasphalting processed, separation of the solvent and DAO is facilitated in a DAO separator. Any entrained solvent in the DAO phase and the pitch phase is stripped out, typically with a low pressure steam stripping apparatus. Recovered solvent is condensed and combined with solvent recovered under high pressure from the DAO separator. The solvent is then recycled back to be mixed with the feed. According to the process herein, steps associated with separation of the solvent and the DAO can be reduced or in certain embodiments eliminated.

Solvent deasphalting is typically carried-out in liquid phase thus the temperature and pressure are set accordingly. There are generally two stages for phase separation in solvent deasphalting. In a first separation stage, the temperature is maintained at a lower level than the temperature in the second stage to separate the bulk of the asphaltenes. The second stage temperature is carefully selected to control the final deasphalted oil quality and quantity. Excessive temperature levels will result in a decrease in deasphalted oil yield, but the deasphalted oil will be lighter, less viscous, and contain less metals, asphaltenes, sulfur, and nitrogen. Insufficient temperature levels have the opposite effect such that the deasphalted yield increases but the product quality is reduced. Operating conditions for solvent deasphalting units are generally based on a specific solvent and charge stock to produce a deasphalted oil of a specified yield and quality. Therefore, the extraction temperature is essentially fixed for a given solvent, and only small adjustments are typically made to maintain the deasphalted oil quality. The composition of the solvent is also an important process variable. Solvents used in typical solvent deasphalting processes include C3-C7 paraffinic hydrocarbons. The solubility of the solvent increases with increasing critical temperature, such that C3<iC4<nC4<iC5, that is, the solubility of iC5 is greater than that of nC4, which is greater than that of iC4, is greater than that of C3. An increase in critical temperature of the solvent increases the deasphalted oil yield. However, solvents having higher critical temperatures afford less selectivity resulting in lower deasphalted oil quality. Solvent deasphalting units are operated at pressures that are high enough to maintain the solvent in the liquid phase, and are generally fixed and vary with solvent composition. The volumetric ratio of the solvent to the solvent deasphalting unit charge is also important in its impact on selectivity, and to a lesser degree, on the deasphalted oil yield. The major effect of the solvent-to-oil ratio is that a higher ratio results in a higher quality of the deasphalted oil for a fixed deasphalted yield. A high solvent-to-oil ratio is preferred because of better selectivity, but increased operating costs conventionally dictate that ratios be limited to a relatively narrow range. Selection of the solvent is also a factor in establishing operational solvent-to-oil ratios. The necessary solvent-to-oil ratio decreases as the critical solvent temperature increases. The solvent-to-oil ratio is, therefore, a function of desired selectivity, operation costs and solvent selection.

The asphalt phase contains a majority of the process reject materials from the charge, for example metals, asphaltenes, Conradson carbon, and is also rich in aromatic compounds and asphaltenes. In addition to the solvent deasphalting operations described herein, other solvent deasphalting operations, although less common, are suitable. For instance, a three-product unit, in which resin, DAO and pitch can be recovered, can be used, where a range of bitumens can be manufactured from various resin/pitch blends.

The first phase separation zone includes one or more inlets in fluid communication with sources of feed and optionally adsorbent material. The first phase separation zone is in fluid communication with a source of solvent. The first phase separation zone includes, for example, one or more primary settler vessels suitable to accommodate the mixture of feed and solvent. In certain embodiments the first phase separation zone includes necessary components to operate at suitable temperature that maintained is sufficiently low to maximize recovery of the deasphalted oil from the feedstock and pressure conditions to promote solvent-flocculation of solid asphaltenes, such as below the critical temperature and pressure of the solvent, in certain embodiments between the boiling and critical temperature of the solvent, and below the critical pressure. The first phase separation zone also includes one or more outlets for discharging a primary asphalt phase (in certain embodiments also containing adsorbent material), and one or more outlets for discharging a primary deasphalted oil phase. In general, components with a higher degree of solubility in the non-polar solvent will pass with the primary deasphalted oil phase. In certain embodiments the outlet for discharging the primary asphalt phase is in fluid communication with a solvent-asphalt separation zone. In further embodiments the primary asphalt phase is in fluid communication with the gasification zone 1440.

The second phase separation zone includes one or more inlets in fluid communication with the reduced asphalt content phase outlet from the first phase separation zone, and includes, for example, one or more secondary settler vessels suitable to accommodate the feed. In certain embodiments the second phase separation zone includes necessary components to operate at temperature and pressure conditions below that of the solvent. The second phase separation zone includes one or more outlets for discharging a secondary asphalt phase. An asphalt phase separates and forms at the bottom of the secondary settler that, due to increased temperature, is approaching the critical temperature of the solvent. In certain embodiments the outlet for discharging the secondary asphalt phase is in fluid communication with gasification zone 1440, a solvent-asphalt separation zone, the first phase separation zone, or any combination thereof. The second phase separation zone also includes one or more outlets for discharging a reduced asphalt content phase stream, which is the secondary deasphalted oil phase. The rejected asphalt from the secondary settler contains a relatively small amount of solvent and deasphalted oil.

Various low-value material streams are produced in the integrated system 1100 including for example residue fractions, unconverted oil fractions, and/or asphalt. All or any portion of these rejected streams can be passed to the gasification zone 1440, which can be any known gasification operation. In general, the gasification zone 1440 produces raw synthesis gas stream 1442 and steam 1444, which can be used as-is or subjected to further processing as is known. For example, synthesis gas can be used as-is as a fuel gas for one or more furnaces in the integrated system and process, including for steam cracking and/or other heating furnaces throughout the refinery.

Gasification is well known in the art and it is practiced worldwide with application to solid and heavy liquid fossil fuels, including refinery bottoms. The gasification process uses partial oxidation to convert carbonaceous materials, such as coal, petroleum, biofuel, or biomass with oxygen at high temperature, for instance, greater than 800° C., into synthesis gas 1442 and steam 1444, for example which can be used to produce electricity. The synthesis gas stream containing carbon monoxide and hydrogen can be burned directly in internal combustion engines. In certain embodiments synthesis gas can be used in the manufacture of various chemicals, such as methanol via known synthesis processes and synthetic fuels via the Fischer-Tropsch process. For example the synthesis gas can be subjected to a water-gas shift reaction to increase the total hydrogen produced. In certain embodiments, the integrated process and system herein includes gasification of one or more of the low-value material streams in which and includes preparing a flowable slurry of the low-value material streams; introducing the slurry as a pressurized feedstock into a gasification reactor with a predetermined amount of oxygen and steam that is based on the carbon content of the feedstock; operating the gasification reactor at a temperature effective for partial oxidation to produce hydrogen, carbon monoxide and a slag material.

In certain embodiments of the present integrated systems and processes using the gasification zone 1440, the gasification process provides a source of hydrogen that can be routed to one or more of the hydroprocessing zones. In addition, it produces electricity and steam can be produced for refinery use or for export and sale; it can take advantage of efficient power generation technology. Furthermore, the gasification process provides a local solution for the heavy residues where they are produced, thus avoiding transportation off-site or storage; it also provides the potential for disposal of other refinery waste streams, including hazardous materials; and a potential carbon management tool, that is, a carbon dioxide capture option is provided if required by the local regulatory system.

Three principal types of gasifier technologies are moving bed, fluidized bed and entrained-flow systems. Each of the three types can be used with solid fuels, and the entrained-flow reactor has been demonstrated to process liquid fuels. In an entrained-flow reactor, the fuel, oxygen and steam are injected at the top of the gasifier through a co-annular burner. The gasification usually takes place in a refractory-lined vessel which operates at a pressure of about 40 bars to 60 bars and a temperature in the range of from 1300° C. to 1700° C.

There are two types of gasifier wall construction: refractory and membrane. The gasifier conventionally uses refractory liners to protect the reactor vessel from corrosive slag, thermal cycling, and elevated temperatures that range from about 1400-1700° C. The refractory material is subjected to the penetration of corrosive components from the generation of the synthesis gas and slag and thus subsequent reactions in which the reactants undergo significant volume changes that result in degradation of the strength of the refractory materials. Typically, parallel refractory gasifier units are installed to provide the necessary continuous operating capability. Membrane wall gasifier technology uses a cooling screen protected by a layer of refractory material to provide a surface on which the molten slag solidifies and flows downwardly to the quench zone at the bottom of the reactor. In a membrane wall gasifier, the build-up of a layer of solidified mineral ash slag on the wall acts as an additional protective surface and insulator to minimize or reduce refractory degradation and heat losses through the wall. Thus the water-cooled reactor design avoids what is termed "hot wall" gasifier operation, which requires the construction of thick multiple-layers of expensive refractories which will remain subject to degradation. In the membrane wall reactor, the slag layer is renewed continuously with the deposit of solids on the relatively cool surface. Advantages relative to the refractory type reactor include short start-up/shut down times, and the capability of gasifying feedstocks with high ash content, thereby providing greater flexibility in treating a wider range of coals, petcoke, coal/petcoke blends, biomass co-feed, and liquid feedstocks.

There are two principal types of membrane wall reactor designs that are adapted to process solid feedstocks. One such reactor uses vertical tubes in an up-flow process equipped with several burners for solid fuels, e.g., petcoke. A second solid feedstock reactor uses spiral tubes and downflow processing for all fuels. For solid fuels, a single burner having a thermal output of about 500 MWt has been developed for commercial use. In both of these reactors, the flow of pressurized cooling water in the tubes is controlled to cool the refractory and ensure the downward flow of the molten slag. Both systems have demonstrated high utility with solid fuels.

For production of liquid fuels and petrochemicals, a key parameter is the ratio of hydrogen-to-carbon monoxide in the dry synthesis gas. This ratio is usually between 0.85:1 and 1.2:1, depending upon the feedstock characteristics. Thus, additional treatment of the synthesis gas is needed to increase this ratio up to 2:1 for Fischer-Tropsch applications or to convert carbon monoxide to hydrogen through the water-gas shift reaction represented by $CO+H_2O \rightarrow CO_2+H_2$. In some cases, part of the synthesis gas is burned together with some off gases in a combined cycle to produce electricity and steam. The overall efficiency of this process is between 44% and 48%.

The gasification zone 1440 can be any known gasification operation. In certain embodiments, a gasification system as disclosed in commonly owned U.S. Pat. Nos. 10,422,046B2, 9,234,146B2, 9,056,771B2 and/or 9,359,917B2, which are incorporated herein by reference, can be integrated. In one embodiment, an example of a gasification zone 1440 operates in a manner similar to that disclosed in commonly owned U.S. Pat. No. 8,721,927B2, which is incorporated by reference herein in its entirety. Such a gasification zone includes a gasification reactor in which a flowable slurry of one or more of the low-value material streams are partially oxidized to produce hydrogen and carbon monoxide as a hot raw synthesis gas, and slag.

A gasification reactor, in certain embodiments a membrane wall gasification reactor, includes one or more inlets in fluid communication with a source of a flowable slurry of one or more of the low-value material streams from the process herein, a source of pressurized oxygen or an oxygen-containing gas, and a source of steam. The gasification reactor also includes one or more outlets for discharging slag, and one or more outlets for discharging hot raw synthesis gas. In certain embodiments hot raw synthesis gas is discharged for use in other downstream processes.

A heat exchanger that can be used includes one or more inlets in fluid communication with the hot raw synthesis gas outlet, one or more outlets for discharging produced steam, and one or more outlets for discharging cooled synthesis gas. In certain embodiments, a portion of the cooled synthesis gas is discharged. In further embodiments, the cooled synthesis gas is conveyed to the water-gas shift reaction vessel. Turbine includes an inlet in fluid communication with the produced steam outlet and an outlet for discharging electricity. Water-gas shift reaction vessel includes one or more inlets in fluid communication with cooled synthesis gas stream and a source of steam, and one or more outlets for discharging a shifted synthesis gas product.

A flowable slurry is prepared including one or more low-value material streams produced in the asphaltene reduction operations herein. The flowable slurry is prepared, for example, fluidizing with nitrogen gas when the solvent deasphalting process bottoms are dry, that is, free of solvent and oil, or by diluting them with light or residual oils, such as cycle oils from fluid catalytic cracking or similar fractions, when the solvent deasphalting process bottoms are wet. The one or more low-value material streams and in certain embodiments diluent can be mixed in a mixing vessel with a stirrer or a circulation system before they are fed to the gasification reactor (not shown). For an entrained-flow gasification reactor, the slurry to the reactor can contain solid adsorbent material (weight percent) in the range of from 2-50, 2-20 or 2-10. The slurry is introduced as a pressurized feedstock with a predetermined amount of oxygen or an oxygen-containing gas and steam into the gasification reactor. The feed is partially oxidized in the membrane wall gasification reactor to produce hydrogen, carbon monoxide and slag. The slag material, which is the final waste product resulting from the formation of ash, in certain embodiments from spent solid adsorbent material and its condensation on the water-cooled membrane walls of gasification reactor, are discharged and recovered for final disposal or for further uses, depending upon its quality and characteristics.

Hydrogen and carbon monoxide are discharged from the gasification reactor as hot raw synthesis gas. In certain embodiments all or any portion of the hot raw synthesis gas can optionally be withdrawn for use in other downstream processes. In certain embodiments, all or any portion of the hot raw synthesis gas can be passed to heat exchanger to cool the hot gas. Cooled synthesis gas is discharged. In certain embodiments all or any portion of the cooled synthesis gas is withdrawn for use in other downstream processes. Steam discharged from the heat exchanger can be withdrawn and/or be passed to turbine to produce electricity that is transmitted via electrical conductor.

In certain embodiments, all or any portion of the cooled synthesis gas, and steam, are conveyed the water-gas shift reaction vessel. Carbon monoxide is converted to hydrogen in the presence of steam by the water-gas shift reaction represented by $CO+H_2O \rightarrow CO_2+H_2$. A mixture of hydrogen, carbon dioxide, unreacted carbon monoxide and other impurities is discharged as shifted synthesis gas. The increase in hydrogen content in the shifted synthesis gas is a function of the operating temperature and catalyst(s) used in the water-gas shift process. High purity hydrogen gas is optionally recovered by pressure swing absorption, membrane or liquid absorption, e.g., as described in commonly owned U.S. Pat. No. 6,740,226B2, which is incorporated by reference herein.

In certain embodiments, the petrochemicals production complex 1215 integrated in the embodiments of FIG. 1 and FIG. 2 includes one or more units for cracking of the combination of the naphtha range feeds and the middle distillate range feeds. Products from the reaction/separation zone 1220 include a quenched cracked gas stream 1224 containing mixed C1-C4 paraffins and olefins that is routed to the olefin recovery zone 1230, an FCC naphtha stream 1226, and a cycle oil stream 1228 (optionally with an intermediate liquid hydrocarbon stream as a light cycle oil stream 1227), which can be handled as described in conjunction with FIG. 1 and FIG. 2, or as otherwise known.

Advantageously, process dynamics of the configurations and the integration of units and streams attain a very high level of integration of utility streams between the petrochemical production complex and other process units, result in increased efficiencies and reduced overall operating costs.

For instance, in embodiment in which steam cracking is used, the produced hydrogen can be tightly integrated so that the net hydrogen demand from outside of the battery limits is reduced, for instance in the deep hydrogenation zone 1200. Furthermore, the integrated process described herein offers useful outlets for the off-gases and light ends from the hydroprocessing units. For instance, the stream 1134 that is passed to the saturated gas plant 1130 of the crude complex 1105 can contain off-gases and light ends from the hydroprocessing units, such as the deep hydrogenation zone 1200, the diesel hydrotreating zone 1150, the gas oil hydroprocessing zone 1160/1170 and/or from the optional residue treatment zone 1180. In other embodiments, in combination with or as an alternative to the passing these off-gases and light ends to stream 1134, all or a portion can be routed to the steam cracking zone 1220. For instance, C2s can be separated from the mixture of methane, hydrogen and C2s using a cold distillation section ("cold box") including cryogenic distillation/separation operations, which can be integrated with any or all of the steam cracking zone 1220, the saturated gas plant 1130 and/or the olefin recovery zone 1230. Methane and hydrogen can be passed to a fuel gas system or to an appropriate section of the olefin recovery zone 1230, such as the hydrogen purification system. In still further embodiments, in combination with or as an alternative to the passing these off-gases and light ends to stream 1134 and/or routing them to the steam cracking zone 1220, all or a portion can be routed to an appropriate section of the olefin recovery zone 1230, such as the depropanizer, or combining the gases with the depropanizer overheads.

The unique configurations presented herein set forth a level of integration, of streams and units that allows the use of coking units and petrochemical production complexes in an economically efficient manner. The configurations support and enhance chemical conversion using integrated processes with crude oil as a feed. Accordingly, despite the use of crude oil as the feed, the processes herein are comparable to other options currently common in the industry such as ethane crackers that benefit from availability of ethane as a feed.

Embodiments described herein provide the ability to achieve a crude to chemical conversion ratio in the range of, for instance, up to 90, 80, 50 or 45 wt %, and in certain embodiments in the range of about 39-45 wt %. It should be appreciated that this crude to chemicals conversion ratio can vary depending on criteria such as feed, selected technology, catalyst selection and operating conditions for the individual unit operations.

In some embodiments, individual unit operations can include a controller to monitor and adjust the product slate as desired. A controller can direct parameters within any of the individual unit operations of the apparatus depending upon the desired operating conditions, which may, for example, be based on customer demand and/or market value. A controller can adjust or regulate valves, feeders or pumps associated with one or more unit operations based upon one or more signals generated by operator data input and/or automatically retrieved data. Furthermore, according to embodiments herein in which both steam cracking and FCC operations are used, for instance as described with respect to FIG. 4A, paraffinic or naphthenic content of the feed can be a determining factor that is used to direct a controller to pass feed to stream cracking or FCC operations.

Such controllers provide a versatile unit having multiple modes of operation, which can respond to multiple inputs to increase the flexibility of the recovered product. The controller can be implemented using one or more computer systems which can be, for example, a general-purpose computer. Alternatively, the computer system can include specially-programmed, special-purpose hardware, for example, an application-specific integrated circuit (ASIC) or controllers intended for a particular unit operation within a refinery.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory can be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code can be written in any of a plurality of programming languages or combinations thereof.

Components of the computer system can be coupled by one or more interconnection mechanisms, which can include one or more busses, for instance, between components that are integrated within a same device, and/or a network, for instance, between components that reside on separate discrete devices. The interconnection mechanism typically enables communications, for instance, data and instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system can contain one or more interfaces that can connect the computer system to a communication network, in addition or as an alternative to the network that can be formed by one or more of the components of the system.

According to one or more embodiments of the processes described herein, the one or more input devices can include sensors and/or flow meters for measuring any one or more parameters of the apparatus and/or unit operations thereof. Alternatively, one or more of the sensors, flow meters, pumps, or other components of the apparatus can be connected to a communication network that is operatively coupled to the computer system. Any one or more of the above can be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms can be affected by utilizing any suitable technique including but not limited to those utilizing wired networks and/or wireless networks and protocols.

Although the computer system is described above by way of example as one type of computer system upon which various aspects of the processes herein can be practiced, it should be appreciated that the invention is not limited to being implemented in software, or on the computer system as exemplarily described. Indeed, rather than implemented on, for example, a general purpose computer system, the controller, or components or subsections thereof, can alternatively be implemented as a dedicated system or as a dedicated programmable logic controller (PLC) or in a distributed control system. Further, it should be appreciated that one or more features or aspects of the processes can be implemented in software, hardware or firmware, or any combination thereof. For example, one or more segments of an algorithm executable by a controller can be performed in separate computers, which in turn, can be in communication through one or more networks.

In some embodiments, one or more sensors and/or flow meters can be included at locations throughout the process, which are in communication with a manual operator or an automated control system to implement a suitable process modification in a programmable logic controlled process. In one embodiment, a process includes a controller which can be any suitably programmed or dedicated computer system, PLC, or distributed control system. The flow rates of certain product streams can be measured, and flow can be redirected as necessary to meet the requisite product slate.

Factors that can result in various adjustments or controls include customer demand of the various hydrocarbon products, market value of the various hydrocarbon products, feedstock properties such as API gravity or heteroatom content, and product quality (for instance, gasoline and middle distillate indicative properties such as octane number for gasoline and cetane number for middle distillates).

The disclosed processes and systems create new outlets for direct conversion of crude oil. Additionally, the disclosed processes and systems offer novel configurations that, compared to known processes and systems, requires lower capital expenditure relative to conventional approaches of chemical production from fuels or refinery by-products and that utilize refining units and an integrated chemicals complex. The disclosed processes and systems substantially increase the proportion of crude oil that is converted to high purity chemicals that traditionally command high market prices. Complications resulting from advancing the threshold of commercially proven process capacities are minimized or eliminated using the processes and systems described herein.

In certain embodiments, feedstock to the reactor(s) within one or more of the hydrocracking, hydrotreating or other hydroprocessing zones described herein (a single reactor with one bed, a single reactor with multiple beds, or multiple reactors) is mixed with an excess of hydrogen gas in a mixing zone. A portion of the hydrogen gas is mixed with the feedstock to produce a hydrogen-enriched liquid hydrocarbon feedstock. This hydrogen-enriched liquid hydrocarbon feedstock and undissolved hydrogen can be supplied to a flashing zone in which at least a portion of undissolved hydrogen is flashed, and the hydrogen is recovered and recycled. The hydrogen-enriched liquid hydrocarbon feedstock from the flashing zone is supplied as a feed stream to the reactor. The liquid product stream that is recovered from the reactor is further processed and/or recovered as provided here.

Each of the processing units are operated at conditions typical for such units, with conditions which can be varied based on the type of feed to maximize, within the capability of the unit's design, the desired products. Desired products can include fractions suitable as feedstock to the petrochemicals production complex, or fractions suitable for use as fuel products. Likewise, processing units employ appropriate catalyst(s) depending upon the feed characteristics and the desired products. Certain embodiments of these operating conditions and catalysts are described herein, although it shall be appreciated that variations are well known in the art and are within the capabilities of those skilled in the art.

For the purpose of the simplified schematic illustrations and descriptions herein, accompanying components that are conventional in crude centers, such as the numerous valves, temperature sensors, preheater(s), desalting operation(s), and the like are not shown or described. In addition, accompanying components that are in conventional hydroprocessing units such as, for example, hydrogen recycle sub-systems, bleed streams, spent catalyst discharge sub-systems, and catalyst replacement sub-systems the like are not shown or described. Further, the numerous valves, temperature sensors, electronic controllers and the like that are conventional in fluid catalyst cracking are not included. Further, accompanying components that are in conventional fluid catalyst cracking systems such as, for example, air supplies, catalyst hoppers, flue gas handling the like are also not shown. Further, accompanying components that are in conventional thermal cracking systems such as steam supplies, coke removal sub-systems, pyrolysis sections, convection sections and the like are not shown or described.

The methods and systems of the present invention have been described above and in the attached drawings; however, modifications will be apparent to those of ordinary skill in the art and the scope of protection for the invention is to be defined by the claims that follow.

The invention claimed is:

1. A process for petrochemical production comprising:
   providing a heavy oil feedstock;
   coking the feedstock to produce at least light coker gas oil;
   subjecting the light coker gas oil to hydrogenation to hydrogenate aromatics contained in the light coker gas oil and produce hydrogenated middle distillates, wherein hydrogenation occurs in the presence of hydrogenation catalyst that contains one or more active metal components selected from Pt, Pd, Re and a combination comprising at least two of Pt, Pd or Re, and includes a catalyst support comprising non-acidic amorphous alumina and about 0.1-15 wt % of a modified USY zeolite having one or more of Ti, Zr and/or Hf substituting aluminum atoms constituting the zeolite framework thereof; and
   processing the hydrogenated middle distillates in a petrochemicals production complex to produce light olefins.

2. The process as in claim 1, wherein the heavy oil feedstock is selected from the group consisting of atmospheric residue, deasphalted oil, demetallized oil, coker gas oil, gas oil obtained from a visbreaking process, and combinations comprising at least one of the foregoing heavy oils.

3. The process as in claim 1, further comprising hydrotreating the light coker gas oil to produce hydrotreated light coker gas oil, and subjecting the hydrotreated light coker gas oil to hydrogenation.

4. The process as in claim 1, wherein the petrochemicals production complex further produces light liquid hydrocarbon products, the process further comprising separating light liquid hydrocarbon products into a raffinate and an extract, wherein the extract is used for recovery of aromatic products.

5. The process as in claim 4, further comprising hydrotreating the light liquid hydrocarbon products prior to separation into the raffinate and the extract.

6. The process as in claim 4, further comprising recycling raffinate from separating of light liquid hydrocarbon products to the petrochemicals production complex.

7. The process as in claim 4, wherein coking produces coker naphtha, and wherein coker naphtha is separated together with light liquid hydrocarbon products from the petrochemicals production complex into the raffinate and the extract.

8. The process as in claim 4, wherein coking produces coker naphtha, the process further comprising hydrotreating coker naphtha produced by coking, and wherein hydrotreated coker naphtha is separated together with light liquid hydrocarbon products.

9. The process as in claim 1, wherein coking is with a
   delayed coker operating with a temperature in a coking drum of about 425-650° C., a pressure of about 1-20 bars and a steam introduction rate of about 0.1-3 wt % relative to the feedstock, or
   a fluid coker operating with a temperature in a coking drum of about 450-760° C., a pressure of about 1-20 bars and a steam introduction rate of about 0.1-3 wt % relative to the feedstock.

10. The process as in claim 9, wherein a heterogeneous catalyst is added to the coking zone, the heterogeneous catalyst including one or more active metal components of metals or metal compounds selected from the Periodic Table of the Elements IUPAC Groups 4, 5, 6, 7, 8, 9 and 10.

11. The process as in claim 9, wherein homogeneous catalyst is added to the coking zone, the homogeneous catalyst being oil-soluble and containing one or more active metal components of metals or metal compounds selected from the Periodic Table of the Elements IUPAC Groups 4, 5, 6, 7, 8, 9 and 10.

12. The process as in claim 9, wherein adsorbent material is added to the coking zone, and wherein adsorbent material is selected from the group consisting of silica, alumina, silica-alumina, titania-silica, molecular sieves, silica gel, activated carbon, activated alumina, silica-alumina gel, zinc oxide, clays, fresh catalyst materials, spent catalyst materials, regenerated catalyst materials, and combinations thereof.

13. The process as in claim 1, wherein hydrogenation of middle distillates occurs at a hydrogen partial pressure of about 50-150 barg;
   at a reaction temperature of about 250-400° C.;
   at a liquid hourly space velocity values, on a fresh feed basis relative to the hydrogenation catalysts, of about 0.1-5 $h^{-1}$; and
   at a hydrogen to oil feed ratio of up to about 1500 SLt/Lt.

14. The process as in claim 1, wherein the petrochemicals production complex comprises a steam cracking unit that produces mixed gases from which light olefins are obtained, pyrolysis gasoline and pyrolysis oil.

15. The process as in claim 14, wherein pyrolysis oil produced in the steam cracking unit comprises light pyrolysis oil, and wherein all or a portion of light pyrolysis oil from the stream cracking unit is subjected to hydrogenation with middle distillates.

16. The process as in claim 1, wherein the petrochemicals production complex comprises a petrochemical production FCC zone that produces mixed gases from which light olefins are obtained, FCC naphtha and cycle oil.

17. The process as in claim 16, wherein cycle oil produced in the FCC zone comprises light cycle oil, and wherein all or a portion of light cycle oil from the FCC zone is subjected to hydrogenation with middle distillates.

18. The process as in claim 1, wherein the petrochemicals production complex comprises a steam cracking unit that produces mixed gases from which light olefins are obtained, pyrolysis gasoline and pyrolysis oil, and a petrochemical production FCC zone that produces mixed gases from which light olefins are obtained, fluidized catalytic cracking naphtha and cycle oil, wherein the steam cracking unit is used when the hydrogenated middle distillates are rich in paraffins, and wherein the petrochemical production FCC zone is used when the hydrogenated middle distillates are rich in naphthenes.

19. The process as in claim 1, wherein the petrochemicals production complex comprises a steam cracking unit that produces mixed gases from which light olefins are obtained, pyrolysis gasoline and pyrolysis oil, and a petrochemical production FCC zone that produces mixed gases from which light olefins are obtained, fluidized catalytic cracking naphtha and cycle oil, wherein the petrochemicals production complex includes a mode of operation in which ethylene production is favored and wherein the hydrogenated middle distillates are directed to the steam cracking unit, and wherein the petrochemicals production complex includes a mode of operation in which propylene production is favored and wherein the hydrogenated middle distillates are directed to the petrochemical production FCC zone.

20. The process as in claim 1, wherein the light coker gas oil contains at least about 10 wt % aromatics, and wherein the hydrogenated middle distillates contain less than about 1 wt % aromatics.

21. A system for petrochemical production comprising:
   a source of heavy oil feedstock;
   a coking zone operable to thermally crack heavy oil from the source of heavy oil feedstock and to produce at least light coker gas oil;
   a fixed-bed hydrogenation zone operable to produce hydrogenated middle distillates from the light coker gas oil containing an effective quantity of a hydrogenation catalyst, the hydrogenation catalyst
      containing one or more active metal components selected from Pt, Pd, Re and a combination comprising at least two of Pt, Pd or Re, and
      including a catalyst support comprising non-acidic amorphous alumina and about 0.1-15 wt% of a modified USY zeolite having one or more of Ti, Zr and/or Hf substituting aluminum atoms constituting the zeolite framework thereof; and
   a petrochemicals production complex operable to receive the hydrogenated middle distillates from the deep hydrogenation zone and to produce light olefins.

* * * * *